United States Patent
Fujimoto

(10) Patent No.: US 7,988,222 B2
(45) Date of Patent: Aug. 2, 2011

(54) VEHICLE BODY PANEL STRUCTURE

(75) Inventor: Toshio Fujimoto, Kobe (JP)

(73) Assignee: Kobe Steel, Ltd., Kobe-shi (JP)

( * ) Notice: Subject to any disclaimer, the term of this patent is extended or adjusted under 35 U.S.C. 154(b) by 890 days.

(21) Appl. No.: 11/720,805

(22) PCT Filed: Dec. 2, 2005

(86) PCT No.: PCT/JP2005/022202
§ 371 (c)(1),
(2), (4) Date: Jun. 4, 2007

(87) PCT Pub. No.: WO2006/059724
PCT Pub. Date: Jun. 8, 2006

(65) Prior Publication Data
US 2010/0019540 A1    Jan. 28, 2010

(30) Foreign Application Priority Data

Dec. 2, 2004  (JP) ................................. 2004-350506

(51) Int. Cl.
*B62D 25/10* (2006.01)
(52) U.S. Cl. ............... 296/187.04; 296/191; 296/193.11
(58) Field of Classification Search ............ 296/187.04, 296/187.09, 187.03, 191, 193.11; 180/69.2, 180/69.21
See application file for complete search history.

(56) References Cited

U.S. PATENT DOCUMENTS

| 5,124,191 | A | 6/1992 | Seksaria |
| 6,179,364 | B1 | 1/2001 | Takahashi |
| 7,090,289 | B2 * | 8/2006 | Koura ...................... 296/193.11 |
| 7,150,496 | B2 | 12/2006 | Fujimoto |

(Continued)

FOREIGN PATENT DOCUMENTS

EP    0 992 418 A2    4/2000
(Continued)

OTHER PUBLICATIONS

Machine translation of Japanese Patent Publication 2003-261070 printed Jun. 21, 2010.*

*Primary Examiner* — Jason S Morrow
(74) *Attorney, Agent, or Firm* — Oblon, Spivak, McClelland, Maier & Neustadt, L.L.P.

(57) ABSTRACT

A vehicle body panel structure, wherein an inner panel is disposed on the inner surface of an outer panel and a reinforcing inner panel is disposed on the inner surface of the inner panel. A plurality of recesses and projections forming a wave shape in cross section are formed on the inner panel and the reinforcing inner panel in the longitudinal direction of a vehicle body. These panels are joined to each other so that a closed cross section is formed of the inner panel and the reinforcing inner panel at the lower part of a joined part between the outer panel and the inner panel and a closed cross section is formed of the outer panel and the inner panel at the upper part of a joined part between the inner panel and the reinforcing inner panel. Accordingly, even if a head part moving distance is small, an HIC value can be lowered and uniformized at those portions other than an impact portion. Thus, even an Al alloy hood can sufficiently reduce the HIC value to contribute to a reduction in the weight of the vehicle body.

5 Claims, 63 Drawing Sheets

U.S. PATENT DOCUMENTS

| | | | |
|---|---|---|---|
| 7,467,680 B2 * | 12/2008 | Mason | 180/69.2 |
| 7,488,031 B2 * | 2/2009 | Ishitobi | 296/193.11 |
| 7,578,548 B2 * | 8/2009 | Behr et al. | 296/193.11 |
| 7,635,157 B2 * | 12/2009 | Wang et al. | 296/193.11 |
| 7,735,908 B2 * | 6/2010 | Wang et al. | 296/193.11 |
| 2008/0088154 A1 * | 4/2008 | Rocheblave et al. | 296/187.04 |
| 2008/0122261 A1 * | 5/2008 | Seo | 296/193.11 |
| 2008/0272618 A1 * | 11/2008 | Ikeda et al. | 296/187.03 |
| 2009/0195031 A1 * | 8/2009 | Ishitobi | 296/193.11 |
| 2010/0140979 A1 * | 6/2010 | Seksaria et al. | 296/193.11 |

FOREIGN PATENT DOCUMENTS

| | | |
|---|---|---|
| EP | 1 357 018 A1 | 10/2003 |
| EP | 1 516 803 A2 | 3/2005 |
| JP | 61 249878 | 11/1986 |
| JP | 64 5876 | 1/1989 |
| JP | 5 139338 | 6/1993 |
| JP | 6 81407 | 3/1994 |
| JP | 6 298014 | 10/1994 |
| JP | 7 165120 | 6/1995 |
| JP | 7 285466 | 10/1995 |
| JP | 8 301024 | 11/1996 |
| JP | 2000 56777 | 2/2000 |
| JP | 2000 168622 | 6/2000 |
| JP | 2000 276178 | 10/2000 |
| JP | 2001 122050 | 5/2001 |
| JP | 2001 199287 | 7/2001 |
| JP | 2003 50586 | 2/2003 |
| JP | 2003 205866 | 7/2003 |
| JP | 2003 226264 | 8/2003 |
| JP | 2003 252246 | 9/2003 |
| JP | 2003 261070 | 9/2003 |
| JP | 2004 26120 | 1/2004 |
| JP | 2004 58973 | 2/2004 |

* cited by examiner (a)

(b)

(c)

(d)

h1c : Wave hight in child head impact range
h1a : Wave hight in adult head impact range

Fig.74

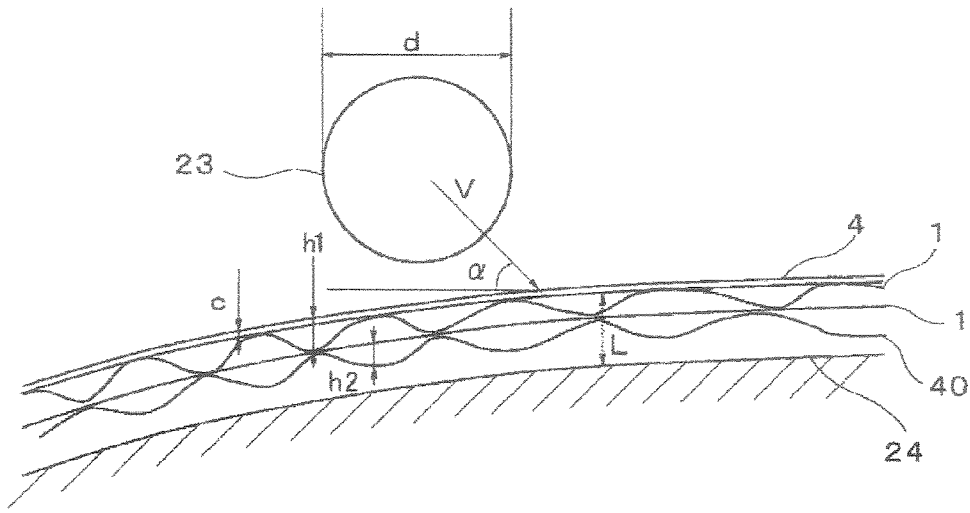

Fig.75

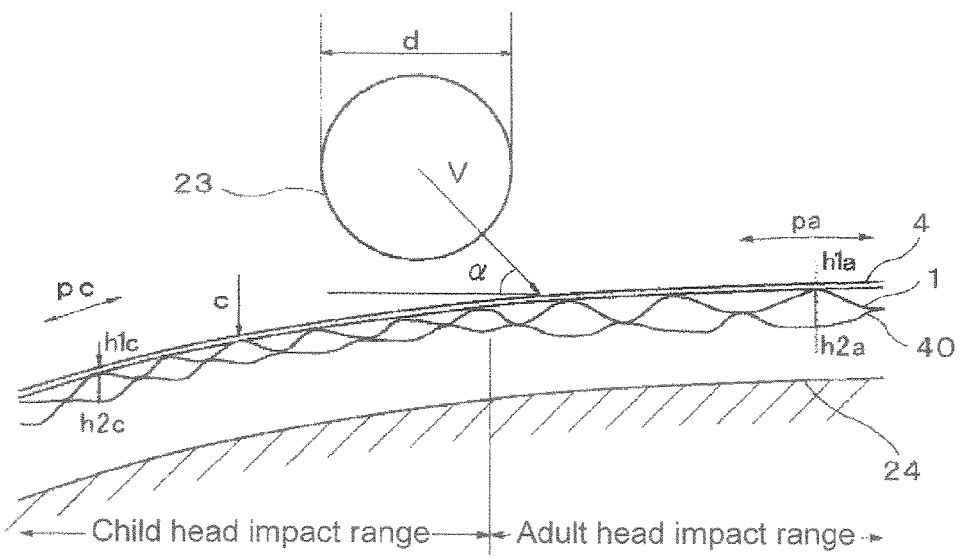

- Child head impact range - Adult head impact range - h1c: Wave hight of inner panel in child head impact range
h2c: Wave hight of reinforcing inner panel in child head impact range
pc : Wave length in child head impact range h1a: Wave hight of inner panel in adult head impact range
h2a: Wave hight of reinforcing inner panel in adult head impact range
pa : Wave length in adult head impact range (a)

(b)

(c)

(d)

(e)

Effect of head impact direction and corrugation direction on HIC value (rectangular plate shape (1M×1M), clearance 50mm, thickness of outer 1mm, thicness of inner 0.8mm, wave length 165mm, wave hight 26mm)

Angle between head impact direction and corrugated direction (degrees)

Top-bottom direction is longitudinal direction of vehicle body

Top-bottom direction is longitudinal
direction of vehicle body

Top-bottom direction is longitudinal
direction of vehicle body

Top-bottom direction is longitudinal
direction of vehicle body

VEHICLE BODY PANEL STRUCTURE

TECHNICAL FIELD

The present invention relates to a vehicle body panel structure having excellent head impact-proof properties in terms of pedestrian protection, and employed as a panel of for example the vehicle hood, roof, door or trunk lid of an automobile, and particularly relates to a vehicle body panel structure made of metal such as aluminum alloy or steel of excellent rigidity including bending rigidity and tensile rigidity.

BACKGROUND ART

Conventionally, as a panel structure of a vehicle body member in for example an automobile there has been employed a structure comprising an outer panel (called an external panel or outside sheet) and an inner panel (internal panel or inside sheet) which are combined to have a closed cross-sectional structure separated by a space.

Particularly, in a panel structure employed as for example the hood, roof or door of an automobile, the outer panel and inner panel, which is provided on the side of the outer panel facing the interior of the vehicle in order to reinforce this outer panel, are mechanically joined or are joined by welding or using for example an adhesive such as resin.

In a panel structure for a vehicle comprising such an inner panel and outer panel, in addition to or instead of the steel members that were conventionally employed, in order to achieve weight reduction, aluminum alloy sheet of high strength and high moldability such as 3000 grade, 5000 grade, 6000 grade or 7000 grade aluminum "aluminum" will hereinbelow be abbreviated as Al) alloy sheet as specified by AA or JIS has started to be used.

Recently, with a view to protection of pedestrians, there is a trend to mandate safety on head impact as a design requirement in relation to hoods. Various techniques have been proposed in relation to beam type hood structures (Laid-open Japanese Patent Application No. 7-165120, Laid-open Japanese Patent Application No. H. 7-285466, and Laid-open Japanese Patent Application No. H. 5-139338). Also, regarding impact-proof properties in relation to adults' heads and children's heads, the EEVC (European Enhanced Vehicle-Safety Committee) has laid down an HIC value of no more than 1000 as a requirement in respect of hoods (EEVC Working Group 17 Report, Improved test methods to evaluate pedestrian protection afforded by passenger cars, December 1998).

The present inventors have already applied for a patent (Laid-open Japanese Patent Application No. 2003-205866) in respect of a corrugated inner panels both in the case where the corrugated cross-section is regular and the case of an irregular spline type inner panel. Such a corrugated inner panel is a more preferred construction for pedestrian protection than a beam type inner panel or cone type inner panel in that, even though the clearance from the outer panel to rigid bodies such as the engine is smaller, it makes possible a further lowering of the HIC value. Specifically, with the invention according to the previous application using such a corrugated inner panel, the desired object was achieved of a vehicle body panel structure offering excellent protection for pedestrians. However, for further pedestrian protection, further reduction in the HIC value is desired.

On the other hand, many techniques have been disclosed relating to perforated-sheet sound absorbing panels, based on the Helmholtz resonance principle. The basic principles are indicated in acoustics textbooks. A resonant frequency is determined by simple expressions from for example the sheet thickness, hole diameter, aperture ratio, and thickness of the back air layer. A prescribed sound absorption performance can be obtained by determining these dimensions in accordance with the frequencies to be absorbed. The following provisional formula is indicated for a perforated-sheet sound absorption structure in Laid-open Japanese Patent Application No. H. 6-298014.

$$f = c/2\pi \times \sqrt{(\beta/(t+1.6b)d)}$$ [math 1]

Where, f is the frequency, c is the speed of sound, $\beta$ is the aperture ratio, t is the sheet thickness, b is the aperture radius (radius of the holes) and d is the thickness of the back air layer.

It has been discovered that the sound absorption characteristic improves as the holes are made smaller and a high sound absorption performance is obtained due to viscous attenuation at hole diameters of 1 mm or less (H V Fuchs and X Zha: The application of micro-perforated sheets as sound absorbers with inherent damping, Acustica, 81, 107-116, 1995). As an example, in Patent document 1 (Laid-open Japanese Patent Application No. 2001-199287), it is stated in claim 4 that the hole diameter is 0.1 mm to 3 mm.

Although, in Patent document 2 (Laid-open Japanese Patent Application No. 2003-50586), Ueda, Tanaka and Uzuno et al specify that a suitable hole diameter is no more than 3 mm, with an aperture ratio of no more than 3%. This can easily be found assuming that the absorption frequency range is no more than 1000 Hz, as specified in Laid-open Japanese Patent Application No. 2001-122050. A perforated sound absorption structure is proposed therein wherein an external panel and internal panel are formed arranged facing each other, and the frequency bandwidth for which the noise absorption effect provides a noise absorption rate of at least 0.3 is set at 10% or more of the resonant frequency. In a range of panel thickness of the internal panel of 0.3 mm to 1 mm a range of aperture ratio of 1% to 5%, and a range of hole diameter of 0.5 mm to 3 mm, the effect on absorption rate of these parameters is investigated. In this case, it appears that, if the aperture ratio is no more than 3% and the hole diameter is no more than 3 mm, in particular if the hole diameter is no more than 1 mm, a fully satisfactory noise absorption effect is obtained i.e. the prescribed effect appears to be obtained. In the above publication, there is further proposed a perforated sound absorption body structure wherein at least two internal panels are provided, with an intervening air layer. However, a vehicle body hood structure that satisfies the requirements of both a sound absorption structure and a pedestrian protective structure has not as yet been developed.

In Patent document 3 (Laid-open Japanese Patent Application No. H. 6-298041), Patent document 4 (Laid-open Japanese Patent Application No. H. 6-81407) and Patent document 5 (Laid-open Japanese Patent Application No. 2000-276178), it is disclosed that wide-band sound absorption properties can be obtained by superimposing a plurality of flat sheets and perforated sheets of curved surface shape or perforated sheets of flat sheet shape, and providing a plurality of back air layers of varying cross-sectional shape. This is because, with such a structure, a wide range of resonant frequencies exist due to the changes in thickness of the back air layers, and, as a result, a sound absorption characteristic having a peak which appears in the case of only a single perforated sheet, is eliminated, and a substantially uniform wide-band sound absorption characteristic can be obtained over a wide frequency range.

Regarding a vehicle body hood structure that satisfies the requirements of both a sound absorption structure and a pedestrian protective structure, there are Patent document 6

(Laid-open Japanese Patent Application No. 2003-226264), Patent document 7 (Laid-open Japanese Patent Application No. 2003-252246) and Patent document 8 (Laid-open Japanese Patent Application No. 2003-261070).

In general, impact-resistance in respect of the head is evaluated using the HIC value described below (head performance criterion) (Automobile Technology Handbook Part 3, Test Evaluation Edition, Second Edition, 15 Jun., 1992, compiled by the Automobile Technology Association).

$$HIC=[1/(t2-t1)\int t1^{t2} a dt]^{2.5}(t2-t1)$$ [math 2]

Where, a is the triaxial resultant acceleration (units: G) at the center of gravity of the head, t1 and t2 are time-points such that 0<t1<t2, and the action time (t2−1) is specified as no more than 15 msec at the time where the HIC value is a maximum.

In the EEVC Working Group 17 Report, as the condition to be satisfied in respect of the hood, an HIC value of no more than 1000 is respectively laid down for impact-resistance in respect of adults' heads and children's heads. The head impact speed that is therein specified in the case of a head impact test is 40 km/hour, an adult head being specified as of weight 4.8 kg, external diameter 165 mm, impact angle 65°, and a child's head being specified as weight 2.5 kg, external diameter 130 mm, impact angle 50°.

In the case of head impact, the head of a pedestrian collides first with the outer panel. Next, as deformation proceeds, reaction force is transmitted through the inner panel to rigid components such as the engine in the engine room, resulting in excessive impact force being generated at the head. The acceleration acting on the head comprises a first acceleration wave generated mainly by impact with the outer panel (generated during the 5 msec from the start of the impact) and a second acceleration wave (generated about 5 msec later than the start of the impact) generated on impact of the inner panel with a rigid object. The magnitude of the first acceleration wave is determined mainly by the elasticity and rigidity of the outer panel and the magnitude of the second acceleration wave is determined mainly by the elasticity and rigidity of the inner panel. The kinetic energy of the head is absorbed by deformation energy of this outer panel and inner panel. However, if the distance of movement of the head exceeds the clearance of the outer panel and the rigid object such as the engine, the head directly receives the reaction force from the rigid object and so receives an excessive impact force greatly exceeding the limiting value of 1000 of the HIC value, resulting in fatal damage.

Accordingly, it is necessary that it should be possible to decrease the HIC value even if the distance of movement of the head is small (problem 1). First of all, it is true that the larger the clearance between the outer panel and the rigid body such as the engine, the larger can be made the distance moved by the head, and this is beneficial in terms of reducing the HIC value. On the design of the hood, the clearance between the outer panel and the rigid body such as the engine has a limit itself. So a hood construction is sought that makes possible reduction in the HIC value even with a small clearance and small distance of head movement.

In particular in the case of head impact of an adult, the impact conditions are more severe than in the case of head impact of a child. So it is necessary to provide an excessively large clearance exceeding the allowed design range with regard to clearance from the outer panel to the surface of a rigid body, and this presents a problem (EEVC Working Group Report p 17).

Furthermore, it is considered to be a problem that it is very difficult to satisfy an HIC value of 1000 in respect of both children and adults, which have different impact characteristics on the WAD1500 line (line at the leading end of the vehicle from the road surface to the hood impact position with a distance of 1500 mm from the contour line) on which impact with either a child's head or an adult's head is possible. In particular, in the case of the hoods of large sedans, the WAD1500 line is directly above the engine where the clearance between the outer panel and rigid body surface is small, so effective counter-measures are desired regarding improvement of impact-resistance (EEVC Working Group 17 Report).

Next, it is necessary that the HIC value should be uniform irrespective of impact location (problem 2). Regarding the position of head impact, the HIC value is large at a position directly above the frame in the case of a beam type hood construction and at the position of the cone vertex section in the case of a cone type hood construction. This is because these locations have high local rigidity and little deformation when colliding with the rigid body portion and receive high reaction force from the rigid body. Consequently, from the point of view safety, a hood construction is desired in which a roughly uniform HIC value is obtained irrespective of the location of impact.

In addition, it is necessary that it should be possible to employ Al alloy material, which makes it possible to reduce vehicle weight (Problem 3). Excellent head impact-resistance is necessary even if Al alloy material is employed as the hood material for purposes of weight reduction. Al alloy material is frequently employed for purposes of hood weight reduction, but, in this case, compared with the use of iron-based material, is considered to be generally disadvantageous from the point of view of pedestrian protection. This is caused by the fact that the elasticity coefficient and specific gravity of Al alloy material are both about one-third of those of steel material, so the sheet rigidity and the weight of a hood made of Al alloy as a panel structure are insufficient, compared with a hood made of steel, for the kinetic energy of the head to be absorbed by the hood.

The bending rigidity of a sheet member is proportional to $ET^3$ (where E is the Young's modulus and T is the sheet thickness) and the sheet rigidity is proportional to ET. When an iron-based material (Young's modulus Es, sheet thickness Ts and specific gravity γs) is substituted by an Al alloy material (Young's modulus Ea, sheet thickness Ta, specific gravity γa) usually, the sheet thickness is determined such that the bending rigidity is the same. In this case, $EaTa^3=EsTs^3$, Ea/Es=⅓, and $Ta/Ts=3^{1/3}=1.44$. The sheet rigidity ratio of a hood made of aluminum alloy and a hood made of steel is (EaTa)/EsTs=1.44/3=0.48, and the specific gravity ratio is likewise (Taγa)/(Tsγs)=1.44/3=0.48, so the sheet rigidity and weight of an aluminum hood are only 0.48 times those of a steel hood. As a result, in the problem of impact of the head and hood, the distance moved by the head is increased, making impact with a rigid body more likely, and decreasing the energy absorption of the outer panel in the first acceleration wave, while increasing the second acceleration wave; as a result, the HIC value, with a conventional hood construction, is increased, making it extremely difficult to satisfy the limiting value in respect of the HIC value.

Of course, if Ta is made three times Ts, the sheet rigidity ratio and weight ratio will both be equivalent to those of a steel hoods but costs will be excessively increased so that such a design cannot be adopted.

Thus it is fairly difficult to satisfy the limiting conditions under head impact with these conditions if aluminum alloy material is employed for the hood. Of course, if a hood construction could be found whereby these conditions were satisfied with aluminum material, such a construction would make possible even further reduction of the HIC value in the case of a steel hood adopting this construction.

Patent document 1: Laid-open Japanese Patent Application No. 2001-193287

Patent document 2: Laid-open Japanese Patent Application No. 2003-50586

Patent document 3: Laid-open Japanese Patent Application No. H. 6-298014

Patent document 4: Laid-open Japanese Patent Application No. H. 6-81407

Patent document 5. Laid-open Japanese Patent Application No. 2000-276178

Patent document 6: Laid-open Japanese Patent Application No. 2003-225264

Patent document 7: Laid-open Japanese Patent Application No. 2003-252246

Patent document 8: Laid-open Japanese Patent Application No. 2003-261070

DISCLOSURE OF THE INVENTION

Problems to be Solved by the Invention

As explained above, the problems to be solved in respect of a hood construction in order to protect pedestrians include:
  making it possible to reduce the HIC value even if the head movement distance is small;
  making the HIC value roughly uniform irrespective of the location of impact with the hood; and
  making it possible to achieve a fully sufficient reduction in the HIC value even in the case of a hood made of Al alloy.

On the other hand, the provision of wide bandwidth sound absorption performance is sought (problem 4). There are problems regarding recycling of the insulator that plays the role of suppressing noise leakage to outside the vehicle from within the engine room. It is therefore desirable from the point of view of the global environment that the noise problem should be solved by the use of aluminum material, which has excellent recycling properties, if the hood itself can be given sound absorption characteristics. A hood construction that makes it possible to give the hood itself sound absorption characteristics is therefore desired.

Attempts to give the hood sound absorption performance have previously been disclosed. As the engine noise is diverse with a wide frequency range, a hood construction having wide bandwidth sound absorption properties effective in respect of such a noise characteristic is therefore desired. In particular, it is said that the frequency range of below 2000 Hz is predominant (Laid-open Japanese Patent Application No. H. 8-301024). A "pedestrian protective sound absorption hood" will therefore be defined herein as such a lightweight hood construction of excellent pedestrian protecting characteristics and with wide band sound absorption characteristics. A pedestrian protective sound absorption chord of excellent safety, light weight and excellent recycling characteristics is disclosed below.

The present invention was made in view of the above problems, its object being to provide a vehicle body panel structure wherein: the HIC value can be reduced even if the head movement distance is small; the HIC value can be made more uniform irrespective of the location of impact with the hood; and furthermore, even in the case of a hood made of Al alloy, a fully sufficient reduction in the HIC value can be achieved and which also contributes to reduction in weight of the vehicle body. A further object of the present invention is to provide a vehicle body panel structure wherein excellent sound absorption characteristics can be achieved even without providing insulator.

Means to Solve the Problems

A vehicle body panel structure according to the first invention of the present application comprises an outer panel, an inner panel arranged on the inside face of this outer panel, and a reinforcing inner panel further arranged on the inside face of this inner panel,
  wherein the inner panel and reinforcing inner panel respectively have a plurality of concavities/convexities having a corrugated shape in cross-section in the longitudinal direction of the vehicle body, and
  wherein the panels are joined so as to provide a closed cross-section formed by the inner panel and reinforcing inner panel below a joint of the outer panel and inner panel and so as to provide a closed cross-section formed by the outer panel and inner panel above a joint of the inner panel and reinforcing inner panel.

Preferably, in the first invention of the present application the structure is assembled with the vehicle body such that the direction in which the cross-section of the concavities/convexities of the inner panel and reinforcing inner panel has a corrugated shape coincides with the width direction or longitudinal direction of the vehicle body.

Preferably, in the first invention of the present application the structure is assembled with the vehicle body such that the direction in which the cross-section of the concavities/convexities of the inner panel and reinforcing inner panel has a corrugated shape is inclined with respect to the longitudinal direction of the vehicle body.

A vehicle body panel structure according to the second invention of the present application comprises an outer panel, an inner panel arranged on the inside face of this outer panel, and a reinforcing inner panel further arranged on the inside face of this inner panel,
  wherein the inner panel and reinforcing inner panel respectively have, on their entire surfaces, a plurality of first concavities/convexities formed so as to have a corrugated shape in cross-section in a first direction and a plurality of second concavities/convexities formed so as to have a corrugated shape in cross-section in a second direction intersecting with the first direction, and
  wherein the panels are joined so as to provide a closed cross-section formed by the inner panel and reinforcing inner panel below a joint of the outer panel and inner panel and provide a closed cross-section formed by the outer panel and inner panel above a joint of the inner panel and reinforcing inner panel.

A vehicle body panel structure according to the third invention of the present application comprises an outer panel, an inner panel arranged on the inside face of this outer panel, and a reinforcing inner panel further arranged on the inside face of this inner panel,
  wherein the inner panel and reinforcing inner panel have, on their entire surface, a plurality of concavities/convexities concentrically formed so as a corrugated shape in cross-section, and
  wherein the panels are joined so as to provide a closed cross-section formed by the inner panel and reinforcing inner panel below a joint of the outer panel and inner panel and so as to provide a closed cross-section formed by the outer panel and inner panel above a joint of the inner panel and reinforcing inner panel.

A vehicle body panel structure according to the fourth invention of the present application comprises an outer panel, an inner panel arranged on the inside face of this outer panel, and a reinforcing inner panel further arranged on the inside face of this inner panel, wherein the inner panel and reinforcing inner panel have, on their entire surfaces, double corrugations formed by a plurality of concavities/convexities having a corrugated shape in cross-section over the entire surface in the longitudinal direction of the panel structure, and a plurality of concavities/convexities having a corrugated shape in cross-section and intersecting with these concavities/convexities, and wherein the panels are joined so as to provide a closed cross-section formed by the inner panel and reinforcing inner panel below a joint of the outer panel and inner panel and so as to provide a closed cross-section formed by the outer panel and inner panel above a joint of the inner panel and reinforcing inner panel.

Preferably, in the fourth invention of the present application, the double corrugations are formed by corrugations in which the direction of the cross-sectional corrugated shape of the concavities/convexities is parallel to the longitudinal direction of the panel structure and corrugations that are orthogonal to the corrugations.

Preferably, in the fourth invention of the present application, the double corrugations are double corrugations formed by corrugations in which the direction of the cross-sectional corrugated shape of the concavities/convexities in a direction that is inclined with respect to the longitudinal direction of the panel structure and corrugations that intersect with these corrugations with a prescribed angle.

A vehicle body panel structure according to the fifth invention of the present application comprises an outer panel, an inner panel arranged on the inside face of this outer panel, and a reinforcing inner panel further arranged on the inside face of this inner panel, wherein the inner panel and reinforcing inner panel respectively have a plurality of concavities/convexities having a corrugated shape in cross-section on the entire surface, wherein the concavities/convexities are respectively a combination of at least two types of concavities/convexities among:

concavities/convexities in which the direction of the cross-sectional corrugated shape coincides with the width direction or longitudinal direction of the vehicle body;

concavities/convexities in which the shape of the cross-sectional corrugations is inclined with respect to the longitudinal direction of the vehicle body;

concavities/convexities comprising a plurality of first concavities/convexities formed such that the cross-sectional shape in a first direction is corrugated and a plurality of a second concavities/convexities formed such that the cross-sectional shape in a second direction intersecting with the first direction is corrugated;

concavities/convexities concentrically formed so as to have a corrugated shape in cross-section; and concavities/convexities of double corrugations formed by a plurality of concavities/convexities having a corrugated shape in cross-section and a plurality of concavities/convexities having a corrugated shape in cross-section and intersecting with these concavities/convexities; and wherein the panels are joined so as to provide a closed cross-section formed by the inner panel and reinforcing inner panel below a joint of the outer panel and inner panel and so as to provide a closed cross-section formed by the outer panel and inner panel above a joint of the inner panel and reinforcing inner panel.

By the adoption of a double corrugated hood structure employing an inner panel and reinforcing inner panel of corrugated cross-section as in the first to fifth inventions of the present application, even if the outer and inner panels are thin, the tensile rigidity of the hood structure can be very considerably raised. Also, fully sufficient rigidity is obtained in respect of both bending rigidity and torsional rigidity. As a result, deformation of the hood with respect to external load can be suppressed. In addition, regarding pedestrian protection, impact-resistance in impacts of head and hood can be raised, improving safety, thereby for example:

making it possible to reduce the HIC value even if the head movement distance is small;

making the HIC value roughly uniform irrespective of the location of impact with the hood, and making it possible to achieve a fully sufficient reduction in the HIC value even in the case of a hood made of Al alloy.

Also, since a vehicle body panel structure according to the present invention has a straightforward construction wherein the inner panel is made as a corrugated inner panel as described above, increased tensile rigidity and bending rigidity can be achieved without needing to increase the sheet thickness of the inner panel as conventionally, and weight reduction can also be achieved. Press forming to a corrugated inner panel as described above from a flat sheet-shaped panel can easily be performed, so the inner panel itself can easily be manufactured.

In the first to the fifth inventions of the present application, it is desirable that the cross-sectional shape of the concavities/convexities should be spline-shaped.

In the first to the fifth inventions of the present application, the cross-sectional shape of the concavities/convexities may be trapezoidal.

Also, in the first to the fifth inventions of the present application, the cross-sectional shape of the concavities/convexities may be a shape in which a corrugated shape of wave height or wavelength smaller than the wave height or wavelength of the corrugated shape is superimposed on this corrugated shape.

Also, in the first to the fifth inventions of the present application, with a view to improvement in impact-resistance in terms of passenger protection in a head impact, preferably the cross-sectional corrugated shape of the inner panel or reinforcing inner panel is such as to satisfy $0.5 < p/d < 2.8$, where the wavelength of the corrugations is p and the outer diameter of a pedestrian's head is d. If p/d is in this range, the benefit of a reduction in the HIC value is obtained. Such a construction can be applied to the inner panel and reinforcing inner panel, and can be applied whether the cross-sectional shape is trapezoidal or spline-shaped.

Also, in the first to the fifth inventions of the present application, with a view to improvement in impact-resistance in terms of passenger protection in a head impact, preferably the cross-sectional corrugated shape of the inner panel or reinforcing inner panel is such as to satisfy $0.05 < (h1+h2)/d < 0.35$, where the wave height of the inner panel is h1, the wave height of the reinforcing inner panel is h2, and the outer diameter of a pedestrian's head is d. If h1+h2 is in this range, the benefit is obtained of a reduction in the HIC value. Such a construction can be applied to the inner panel and reinforcing inner panel, and can be applied whether the cross-sectional shape is trapezoidal or spline-shaped. It should be noted that when the wave height of the reinforcing inner panel is zero i.e. the inner panel is a flat sheet, $0.05 < h1/d < 0.35$.

Also, in the first to the fifth inventions of the present application, preferably one of the outer panel, inner panel and reinforcing inner panel is made of aluminum alloy or steel.

Also, in the first to the fifth inventions of the present application, preferably the inner panel and outer panel are joined by a flexible coupling, and preferably flexible coupling section is arranged in zigzag fashion or in dispersed fashion. In this way, in regard to pedestrian protection, rattling vibration of the outer panel and inner panel is not impaired in the event of a head impact, thereby disrupting the head acceleration and so making it possible to lower the HIC value.

Also, in the first to the fifth inventions of the present application, preferably a plurality of through-holes having a sound absorption effect of aperture ratio no more than 3% and hole diameter no more than 3 mm are formed in the inner panel and/or reinforcing inner panel. Regarding the sound absorption effect, a better hood sound absorption effect should be manifested if fine holes are formed in the inner panel of a corrugated hood featuring a closed cross-sectional construction than in the case of a conventional perforated sound absorption panel as in Laid-open Japanese Patent Application No. S. 61-249878, Laid-open Japanese Patent Application No. 2000-56777, or Laid-open Japanese Patent Application No. 2003-20586, in accordance with Helmholtz's resonance principle. Regarding hole diameter, according to Uzuno, a sound absorption effect of about 0.5 is obtained in a frequency region of 1 kHz or less, with an aperture ratio of 1% and hole diameter of 0.5 mm with steel sheet of thickness 0.5 mm. Likewise, a similar effect is obtained with an aperture ratio of 2%, hole diameter 2 mm, with steel sheet of thickness 0.8mm. Also, according to Laid-open Japanese Patent Application No. 2003-20586, preferably the aperture ratio is no more than 3% and the hole diameter is no more than 3 mm.

According to the present invention, by providing two air layers, namely, between the outer panel and inner panel and between the inner panel and reinforcing inner panel, in the hood, and by providing fine holes in the inner panel and outer panel, a considerable sound absorption effect can be anticipated. Incidentally, while this is common knowledge in manufacturing regarding the size of the fine holes, fine holes of about the same thickness as the sheet or less are fairly difficult to form by punching. Where mass-production is a precondition, the hole diameter may thus be restricted to a range of about 0.5 mm to 3 mm in the case of a sheet thickness of 0.5 mm, or 0.8 to about 3 mm in the case of a sheet thickness of 0.8 mm.

In the first to the fifth inventions of the present application, in order to improve sound absorption, preferably the wavelength or wave height of the inner panel and/or reinforcing inner panel is non-uniform in the vehicle body width direction or vehicle body longitudinal direction.

Also, in the first to the fifth inventions of the present application, in order to improve sound absorption, preferably the wavelength or wave height in left and right waveforms in a single wavelength in the cross-sectional corrugated shape of the inner panel and/or reinforcing inner panel is asymmetric to form a deformed waveform cross-section.

Also, in the first to the fifth inventions of the present application, in order to improve sound absorption, preferably a prescribed clearance is partially provided between the outer panel and inner panel or between the inner panel and reinforcing inner panel. Preferably, the clearance is 1 mm to 10 mm.

In the first to the fifth inventions of the present application, in order to improve pedestrian protection performance, preferably the outer panel is made of steel and the inner panel and reinforcing inner panel are made of aluminum alloy. By making the outer panel of steel, the outer panel weight is increased, making it possible to lower the second-wave acceleration and so suppress the HIC value to no more than 1000, by increasing the magnitude of the first-wave acceleration in the event of a head impact to about 200 G.

In the first to the fifth inventions of the present application, in order to improve pedestrian protection, preferably one or more reinforcement sheets made of steel, aluminum alloy or lead are stuck onto the inside face of the outer panel. By increasing the local weight of the outer panel, the magnitude of the first-wave acceleration in the event of a head impact is increased, making the magnitude of the first-wave acceleration about 200 G but thereby lowering the second-wave acceleration and so making it possible to suppress the HIC value to no more than 1000. The location of arrangement of the metal sheet, the number of such sheets, and their thickness are appropriately selected.

A vehicle body panel structure according to the invention of the present application can be applied to the roof, doors or trunk lid of an automobile. Also, a vehicle body structure according to the invention of the present application can be applied to the roof, doors, floor or side walls of a railway vehicle.

In a vehicle body panel structure according to the invention of the present application, a prescribed internal pressure having a head impact energy absorbing effect is preferably applied to the closed space between the outer panel and inner panel or between the inner panel and reinforcing inner panel. The second head acceleration wave is thereby reduced, reducing the HIC value, and improving pedestrian protection performance.

In order to achieve this, preferably an article in the form of a bag is arranged within the closed space between the outer panel and inner panel or within the closed space between the inner panel and reinforcing inner panel and an internal pressure is applied to this article in the form of a bag. Suitably, for example an article made of natural or synthetic resin is employed as this article in the form of a bag.

In a vehicle body panel structure according to the invention of the present application, preferably the closed space between the outer panel and inner panel or the closed space between the inner panel and reinforcing inner panel is filled with energy absorbing material. The energy absorbing effect in the event of a head impact of the hood is thereby increased, improving pedestrian protection performance. For example foamed styrol may be suitably employed as the energy absorbing material.

A vehicle body panel structure according to the sixth invention of the present application comprises a combination of an outer panel and an inner panel arranged on the inside face of this outer panel and having a cross-sectional corrugated shaped bead in a direction parallel with the vehicle width direction, wherein the corrugated shape of said inner panel satisfies $0.5 < p/d < 2.8$, where the wavelength of the corrugations is p and the external diameter of the head of a pedestrian is d, or satisfies $0.05 < h1/d < 0.35$, where the wave height of said inner panel is h1 and the external diameter of the head of a pedestrian is d.

This vehicle body panel structure is of light weight, and has excellent pedestrian protection performance and sound absorption performance.

In a vehicle body panel structure according to the sixth invention of the present application, preferably the wave height $h1c$ of the inner panel in an adult head impact range is larger than the wave height $h1c$ of the inner panel in a child head impact range. In this way, a vehicle body panel structure which is of light weight and excellent pedestrian protection performance and sound absorption performance is obtained.

Also, in a vehicle body panel structure according to the sixth invention of the present application, preferably the cross-sectional corrugated shape of the inner panel comprises a corrugated shape other than the double corrugated shape in the middle of the panel. In this way, a vehicle body panel structure offering excellent pedestrian protection is obtained.

A vehicle body panel structure according to the seventh invention of the present application comprises a combination of an outer panel, an inner panel arranged on the inside face of this outer panel and having a cross-sectional corrugated shaped bead in a direction parallel with the vehicle width direction, and a reinforcing inner panel further arranged on the inside face of this inner panel and having a cross-sectional corrugated shaped bead in a direction parallel with the vehicle width direction, wherein the cross-sectional corrugated shape of the inner panel or reinforcing inner panel satisfies 0.5 <pa/da <2.8, where the wavelength of the inner panel or reinforcing inner panel in an adult head impact range is pa and the external diameter of the head of an adult is da, and satisfies 0.5 <pc/dc <2.8, where the wavelength of the inner panel or reinforcing inner panel in a child head impact range is pc and the external diameter of the head of a child is dc.

In this way, excellent pedestrian protection performance is obtained by optimizing the wavelength in respect of pedestrian protection.

In a vehicle body panel structure according to the seventh invention of the present application, preferably the cross-sectional corrugated shape in the inner panel or reinforcing inner panel satisfies 0.05 <(h1a+h2a)/da <0.35, where the wave height of the inner panel in an adult head impact range is h1a, the wave height of the reinforcing inner panel is h2a and the external diameter of an adult head is da, or satisfies 0.05 <(h1c+h2c)/dc <0.35, where the wave height of the inner panel in a child head impact range is h1c, the wave height of the reinforcing inner panel is h2c and the external diameter of a child head is dc. In this way, an optimum value of the wave height in respect of pedestrian protection is obtained.

Also, in a vehicle body panel structure according to the seventh invention of the present application, preferably the cross-sectional corrugated shape of the inner panel comprises a corrugated shape other than the double corrugated shape in the middle of the panel. In this way, a vehicle body panel structure offering excellent pedestrian protection is obtained.

in a vehicle body panel structure according to the eighth invention of the present application, the inner panel and reinforcing inner panel have a cross-sectional corrugated shape of respectively different wavelength or wave height.

In the first to the fifth and seventh to the eighth inventions of the present application, a second reinforcing inner panel having a cross-sectional corrugated shape that is the same as or different from that of the inner panel or reinforcing inner panel may be further arranged on the inside face of the reinforcing inner panel.

In the first to the fifth and seventh to the eighth inventions of the present application, the inner panel, reinforcing inner panel or second reinforcing inner panel has a divided corrugated cross-sectional shape. Also, in the first to the fifth and seventh to the eighth inventions of the present application, the inner panel, reinforcing inner panel or second reinforcing inner panel may have corrugations that are not divided and corrugations that are partially divided. In this way, a vehicle body panel structure offering excellent pedestrian protection can be obtained.

EFFECT OF THE INVENTION

With the vehicle body panel structure according to the first to the fifth inventions, a vehicle body hood construction can be provided wherein, from the point of view of reducing hood weight, the tensile rigidity of the hood can be very considerably increased, and having fully sufficient rigidity in regard to both torsional rigidity and bending rigidity. Also, from the point of view of pedestrian protection, a pedestrian protective vehicle body hood structure can be provided wherein excellent head impact-resistance can be achieved in that the HIC value can be reduced even if the clearance between the outer panel and rigid bodies is small, the HIC value is roughly uniform irrespective of the location of impact with the hood, and, furthermore, wherein the HIC value can be reduced to a fully sufficient extent even when the hood is made of aluminum. In addition, a soundproof vehicle body hood structure can be provided of excellent pedestrian protection performance having wide-band sound absorption performance, through the use of perforated sheet for the inner panel or reinforcing inner panel.

With a vehicle body panel structure according to the present application, an improvement in head impact-resistance can be achieved while having regard to the complex arrangement of rigid components in the engine room, through the use of a spline type inner panel.

With a vehicle body panel structure of the present application, the hood static rigidity can be raised by means of the substantially trapezoidal shaped inner panel or reinforcing inner panel, and, in regard to pedestrian protection, head acceleration in a head impact can be lowered.

With a vehicle body panel structure according to the present application, the hood static rigidity can be raised by means of the inner panel or reinforcing inner panel wherein a substantially small corrugated shape is superimposed on a substantially corrugated shape and, in regard to pedestrian protection, head acceleration in a head impact can be lowered.

By means of the inner panel or reinforcing inner panel as set out in the present application, the static rigidity of the hood can be raised, and, in regard to pedestrian protection, head acceleration in a head impact can be lowered.

It should be noted that, with the vehicle body panel structure according to the present invention, the suitable range of wavelength and wave height of the double corrugated hood construction is sufficient to provide is a wide range of suitability.

With a vehicle body panel structure according to the present application, the hood may be made of aluminum or steel, but a considerable benefit in terms of weight reduction is obtained if aluminum is used.

With a vehicle body panel structure according to the present application, by making the joint of the outer panel and inner panel a flexible coupling and by arranging the joint section in zigzag fashion, a vehicle body panel structure is obtained offering excellent pedestrian protection. It should be noted that preferably the inner panel and reinforcing inner panel are joined in rigid fashion.

With a vehicle body panel structure according to the present application, through the use of perforated sheet of aperture ratio no more than 3% and hole diameter no more than 3 mm as the inner panel or reinforcing inner panel, a vehicle body hood panel can be implemented having excellent wide band sound absorption characteristics.

With a vehicle body panel structure according to the present application, in a substantially corrugated shape of the inner panel cross-section, by making the wavelength or wave height of the inner panel and/or reinforcing inner panel nonuniform in the vehicle body width direction or vehicle body longitudinal direction, the characteristic vibration modes of the sound field can be made complex, thereby increasing the bandwidth of the sound absorption characteristic and improving sound absorption performance.

With a vehicle body panel structure according to the present application, the wavelength or wave height in left and right waveforms in a single wavelength in the cross-sectional shape formed by the inner panel and/or reinforcing inner panel is asymmetric, and the cross-section is a deformed waveform cross-section, so the characteristic vibration modes of the sound field can be made complex, thereby increasing the bandwidth of the sound absorption characteristic and improving sound absorption performance.

With a vehicle body panel structure according to the present application, a clearance of the order of 1 mm to 10 mm is partially provided between the outer panel and inner panel or between the inner panel and reinforcing inner panel in the substantially corrugated shape of the hood cross-section, so the characteristic vibration modes of the sound field can be made complex, thereby increasing the bandwidth of the sound absorption characteristic and improving sound absorption performance.

With a vehicle body panel structure according to the present application, by making the outer panel of steel and the inner panel and reinforcing inner panel of aluminum or aluminum alloy, the first head acceleration wave is increased to about 200 G, but the second head acceleration wave is decreased, with the result that the HIC value is lowered.

With a vehicle body panel structure according to the present application, by arranging one or more metal reinforcement sheets made of steel, aluminum alloy or lead on the undersurface of the outer panel, the first head acceleration wave is increased to about 200 G, but the second head acceleration wave is decreased, with the result that the HIC value is lowered.

With a vehicle body panel structure according to the present application, this is applied to the roof, doors or trunk lid of a vehicle body or applied to the roof, doors, floor or side walls of a railway vehicle. Impact-resistance of the vehicle body or railway vehicle can thereby be improved and, in addition, the sound absorption effect can be raised.

With a vehicle body panel structure according to the present application, by applying a prescribed internal pressure to the closed space between the outer panel and inner panel or between the inner panel and reinforcing inner panel, the efficiency of absorption of head impact energy is increased, the second head acceleration wave is reduced, thereby reducing the HIC value and improving pedestrian protection performance.

With a vehicle body panel structure according to the present application, the closed space between the outer panel and inner panel or the closed space between the inner panel and reinforcing inner panel is filled with energy absorbing material such as foamed styrol. The efficiency of absorption of head impact energy is thereby increased, improving pedestrian protection performance.

Also, with a vehicle body panel structure according to the sixth invention, this comprises a combination of an outer panel and an inner panel having a bead of substantially corrugated shape substantially parallel with the vehicle width direction, thereby providing a vehicle body panel structure of light weight and excellent pedestrian protection performance and sound absorption performance.

Also, with a vehicle body panel structure according to the present application, the wave height (h1a) of the inner panel in the adult head impact range is larger than the wave height (h1c) of the inner panel in the child head impact range. In this way, a vehicle body panel structure which is of light weight and excellent pedestrian protection performance and sound absorption performance is obtained.

Also, with a vehicle body panel structure according to the present application, a hood offering excellent pedestrian protection can be provided.

Also, with a vehicle body panel structure according to the seventh invention, in a vehicle body panel structure comprising a combination of an outer panel, an inner panel having a cross-sectional corrugated shaped bead substantially parallel with the vehicle width direction, and a reinforcing inner panel, the wavelength (pa) in the adult head impact range satisfies $0.5 < pa/da < 2.8$, or the wavelength (pc) in the child head impact range satisfies $0.5 < pc/dc < 2.8$. In this way, an optimum value of the wavelength is obtained in respect of pedestrian protection.

With a vehicle body panel structure according to the present application, the wave height (h1a) of the inner panel in the adult head impact range and the wave height (h2a) of the reinforcing inner panel satisfy $0.05 < (h1a+h2a)/d < 0.35$, and the wave height (h1c) of the inner panel in the child head impact range and the wave height (h2c) of the reinforcing inner panel satisfy $0.05 < (h1c+h2c)/d < 0.35$. In this way, an optimum value of the wave height is obtained in respect of pedestrian protection.

Also, with a vehicle body panel structure according to the invention, a hood structure offering excellent pedestrian protection can be provided.

With a vehicle body panel structure according to the present application, a hood structure offering excellent pedestrian protection can be provided.

Also, with a vehicle body panel structure according to the present application, a hood structure offering excellent pedestrian protection can be provided in the same way as with the above inventions.

BRIEF DESCRIPTION OF THE DRAWINGS

FIG. 74 is a view showing the cross-sectional shape of a double corrugated vehicle body panel structure having a corrugated inner panel and a corrugated reinforcing inner panel in the vehicle width direction.

FIG. 75 is a view showing the cross-sectional shape of a double corrugated vehicle body panel structure having a corrugated inner panel and a corrugated reinforcing inner panel in the vehicle width direction.

FIG. 120 is a perspective view showing an inner panel of a further transverse corrugated double structure in which undulation is applied to the wavelength.

FIG. 121 is a perspective view showing an inner panel of a transverse corrugated double structure in which the wavelength is made to be left/right asymmetric.

FIG. 122 is a perspective view showing an inner panel of a further transverse corrugated double structure in which the wavelength is made to be left/right asymmetric.

FIG. 123 is a perspective view showing an inner panel of a further transverse corrugated single layer structure in which the wavelength is made to be left/right asymmetric.

EXPLANATION OF THE REFERENCE NUMBERS

| | |
|---|---|
| 1: | inner panel |
| 2: | corrugated bead |
| 3: | panel structure |
| 4: | outer panel |
| 5: | bead convexity |
| 6: | bead concavity |
| 7: | resin layer |
| 8: | hem processed section |
| 9, 10: | inner panel peripheral sections |
| 23: | pedestrian's head |
| 24: | rigid body surface |
| 25: | adhesive such as resin |
| 26: | corrugated inner panel |
| 27: | beam type inner panel |
| 28: | head model |
| 29: | reinforcement section |
| 30: | adhesive section |
| 31: | spline type inner panel |
| 32: | impact position |
| 40: | reinforcing inner panel |
| 41: | crash bead |
| 42: | slit |
| 43: | rivet |
| 44: | bag made of for example rubber or resin |
| 45: | energy absorbing member made of for example foamed styrol |
| 46: | second reinforcing inner panel |
| 47: | divided bead |
| 48: | undivided bead |

BEST MODE FOR CARRYING OUT THE INVENTION

Figure 1:
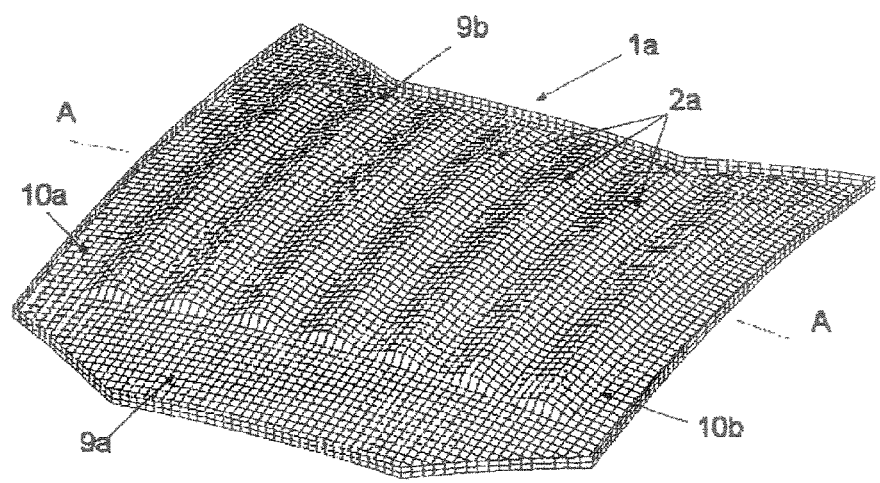
FIG. 1 is a perspective view showing an embodiment of an inner panel according to the present invention.
Figure 2:
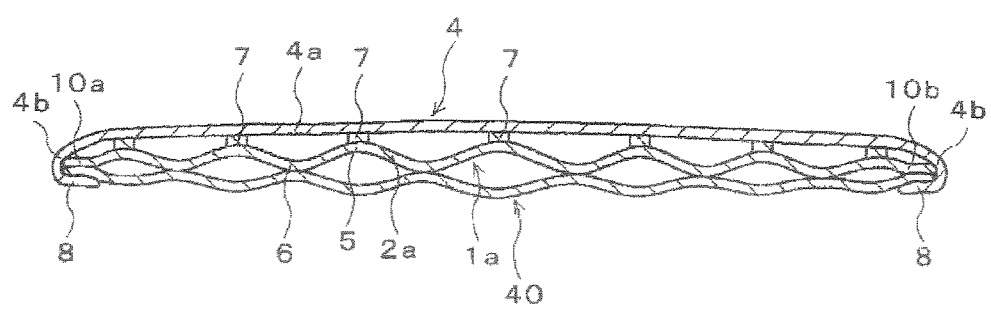
FIG. 2 is a cross-sectional view along the line A-A of FIG. 1.

Embodiments of a vehicle body panel structure according to the present invention are described below with reference to the drawings. FIG. 1 is a perspective view of an inner panel of an embodiment of a vehicle body panel structure according to the present invention. FIG. 2 is a cross-sectional view along the line A-A of FIG. 1. It should be noted that, in FIG. 1, the corrugated shape is cross-hatched to facilitate understanding.

In FIG. 1 and FIG. 2, an inner panel 1a is made of light-weight high tensile metals typified by aluminum alloy or high tensile steel sheet. A plurality of substantially corrugated beads (convex ridges) 2a are provided in substantially mutually parallel fashions along the vehicle body longitudinal directions over the entire surface of the panel, excluding the peripheral sections 9a, 9b (9a: vehicle body leading end side, 9b: driver's seat side) and 10a, 10b (vehicle width side). It should be noted that not merely substantially corrugated beads of linear shape but also, as will be described, corrugated beads of curved shape such as concentric circular or elliptical shape may be formed in mutually substantially parallel fashion.

In FIG. 2, the corrugated beads 2a comprise bead convexities 5 that are of gently arcuate shape in cross-section or that are ridge-shaped in the longitudinal direction and that extend towards the rear face side of the outer panel 4a, and bead concavities 6 that are likewise of gently arcuate shape in cross-section or that are ridge-shaped in the longitudinal direction, and that hollow on the opposite side to these convexities and form corrugations constituted by a continuous curve of sine wave shape in the vehicle width direction. Thus, in FIG. 1 and FIG. 2, seven substantially parallel and mutually independent (i.e. with a gap therebetween) corrugated beads 2a of linear shape are provided at the surface of the inner panel 1a.

The corrugated beads 2a shown in FIG. 1 and FIG. 2, including the bead concavities 6, have roughly the same width along their longitudinal direction. However, the corrugated beads 2a, including the bead concavities 6, do not necessarily need to have the same width along their longitudinal directions. For example, as seen in plan view, they could be of a shape provided with necking or hollowing whereby their width is partially reduced, so as to protect passengers by absorption of impact by constituting starting points for overall deformation of the inner panel in the event of a vehicle body impact, or could be of a shape in which the width is progressively reduced or where the width is progressively increased in accordance with the design of the vehicle body.

It should be noted that there is no particular restriction in this embodiment on conditions such as the cross-sectional shape (widths height, angle of inclination of the inclined face), number or length of these corrugated beads 2a of bead concavities 6. However, taking into consideration the need to exhibit rigidity and ease of forming, preferably the height h of the corrugations of cross-section shape may be selected from the range 10 to 60 mm and the wavelength p may be selected from the range 90 to 300 mm.

For example, the rigidity of the inner panel or panel structure can be increased by making the cross-sectional shape of these substantially corrugated beads, including the bead concavities 6, larger or by increasing the number of the substantially corrugated beads, or by providing these over the entire surface of the panel.

Consequently, the cross-section shape and conditions of these substantially corrugated beads 2a or bead concavities 6 are suitably selected in view of the relationship with for example tensile rigidity, torsional rigidity, bending rigidity required in rigidity design and possibility or ease of forming (formability).

Also, with a view to further reduction in weight of the inner panel, within a range such as not to affect rigidity or strength, in the portions of the substantially corrugated beads 2a or bead concavities 6, there may be provided spaces or cutaway portions by partial trimming of the panel (the shape of these portions is not important and could be for example rectangular).

Furthermore, such measures may be suitably combined with other rigidity reinforcing means such as increasing the bending rigidity of the panel or panel structure with respect to bending load applied to the leading end of the panel or panel structure, by making the sheet thickness at the outer edges (outer peripheral section) of the inner panel thicker than the sheet thickness in the middle thereof by for example using a tailor-blank welding for the inner panel.

The reinforcing inner panel 40 is integrated such that the vertex portion thereof is mutually joined with the inner panel. The joint is formed for example using adhesive or riveting. In this way, the absorption energy in the event of a head impact is increased by such adoption of a double corrugated structures impact-resistance with respect to head impact is improved and, with regard to noise counter-measures, the sound absorption coefficient is also improved.

Figure 4:
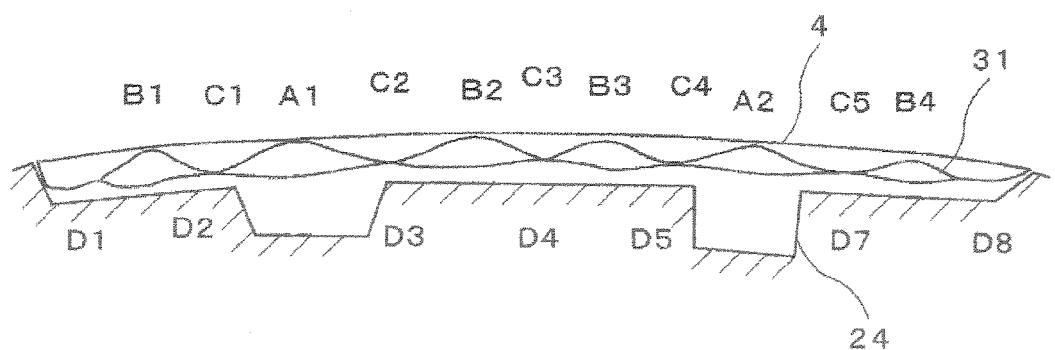
FIG. 4 is a cross-sectional view of a double corrugated vehicle body panel structure having a spline type inner panel according to the present invention.
Figure 5:
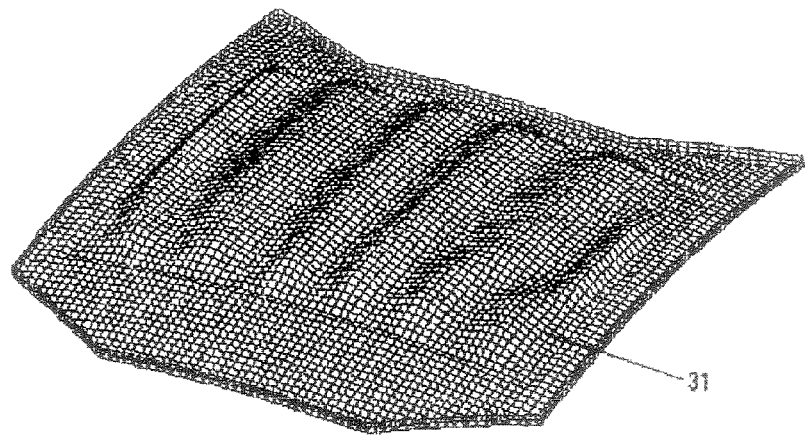
FIG. 5 is a perspective view showing an embodiment of a spline type inner panel according to the present invention.
Figure 6:
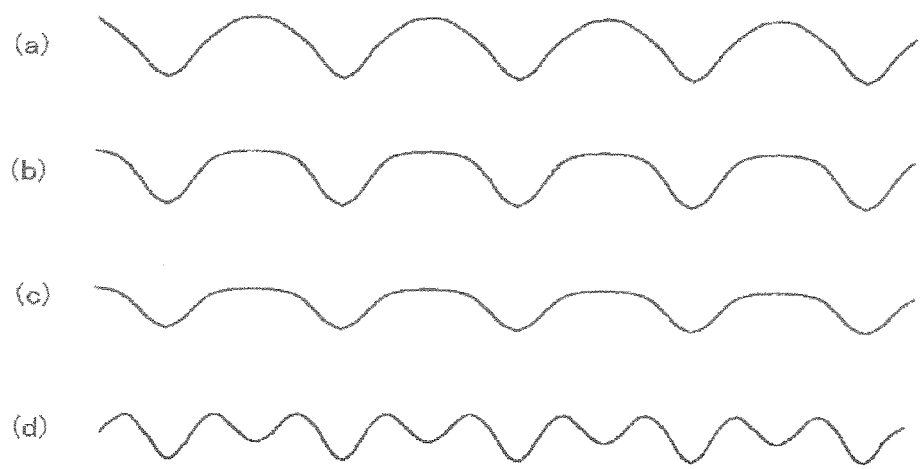
FIG. 6 is a cross-sectional view showing an embodiment of a spline type inner panel according to the present invention.

In this embodiment, basically the cross-sectional shape of the inner panel and reinforcing inner panel is substantially a sine curve corrugated shape, but a spline curve, in which there is a high degree of freedom regarding the curvature, is more practical. FIG. 4 to FIG. 6 show examples in which the cross-sectional shape is a spline curve. FIG. 4 is a view showing a cutaway face in the vehicle width direction in the middle of the hood. As shown in FIG. 4, the arrangement of components in an ordinary engine room is complex. By means of such as spline shape, flexible inner panel shape design can be achieved, taking into account the arrangement of the components. FIG. 5 is a perspective view showing an inner panel of such a spline shape. FIGS. 6(a) to (d) are views showing the cross-sectional shape of an inner panel exhibiting a spline curve. The reinforcing inner panel has the same shape as the inner panel. The combination of cross-sectional shapes of the inner panel and reinforcing inner panel is thus basically a combination of identical shapes. The wave heights being different but the wavelengths being the same. However, a combination of different shapes may also be envisioned.

In general, a spline curve means a curve that is formed by smoothly joining curves of different curvature magnitude. In this embodiment "spline corrugations", with the same implication as a spline curve, are defined as a corrugated waveform wherein a plurality of waves of different magnitude of curvature are superimposed, such as for example a shape in which a substantially corrugated waveform base (including for example a substantially trapezoidal shape) has an embossed shape superimposed thereon. The embossed shape may extend to the entire surface of the inner panel and reinforcing inner panel or may be restricted to local portions thereof, such as radius portions.

Figure 7:
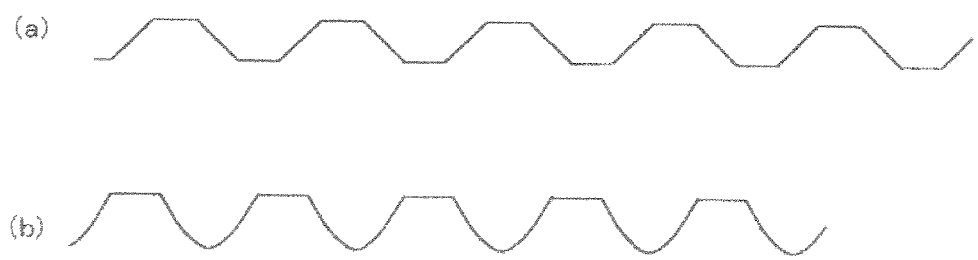
FIG. 7 is a cross-sectional view showing an embodiment of a substantially trapezoidal corrugated inner panel according to the present invention.

The cross-sectional shape of the inner panel and reinforcing inner panel according to the present invention is basically a substantially corrugated shape of sine curve shape, but a cross-sectional shape of substantially trapezoidal shape could also be employed FIG. 7(a) is a diagram of a cross-sectional trapezoidal shape and FIG. 7(b) shows a variation of the cross-sectional trapezoidal shape. FIG. 7(a) shows the case of a trapezoidal shape of both the convexities and concavities and FIG. 7(b) shows the case of convexities of trapezoidal shape, with concavities of arcuate shape. As a rule, in such trapezoidal corrugations, both the inner panel and reinforcing inner panel have the same shape, but it would also be possible for one of the inner panel and reinforcing panel to have a sine curve shape or spline curve shape.

Also, the local rigidity may be adjusted by providing small concavities/convexities or superimposing ripples on the curved surface of the inner panel and reinforcing inner panel. The rigidity in the vehicle body direction may be increased and local head impact-resistance may be improved by providing concavities/convexities by means of small beads extending in the vehicle body and longitudinal direction.

Figure 8:
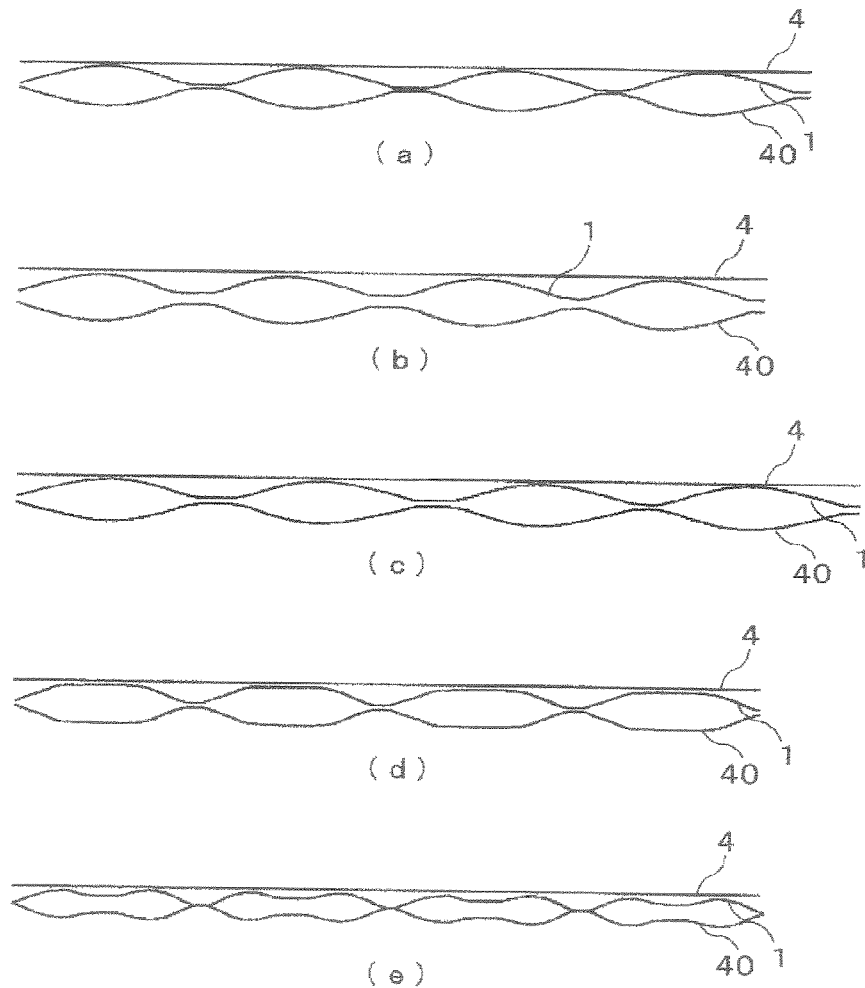
FIG. 8 is a cross-sectional view showing an embodiment of a substantially corrugated inner panel according to the present invention.
Figure 9:
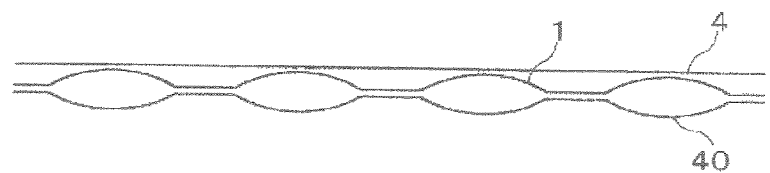
FIG. 9 is a cross-sectional view showing an embodiment of a substantially corrugated inner panel according to the present invention.
Figure 10:
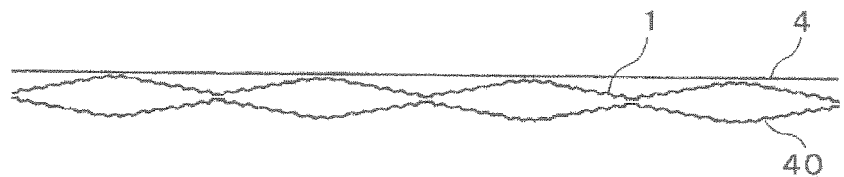
FIG. 10 is a cross-sectional view showing an embodiment of a substantially corrugated inner panel according to the present invention.

FIG. 8 to FIG. 10 are cross-sectional views showing examples of a double corrugated cross-sectional shape in the case where the inner panel and reinforcing inner panel are vertically symmetrical FIG. 8 shows five cases of vertically symmetrical inner panels and reinforcing inner panels. In FIG. 8(a) to (e), a vehicle body panel structure is formed by an outer panel 4 and inner panel 1 and reinforcing inner panel 40 that are vertically symmetrically arranged at the rear face thereof. FIG. 9 is a view showing a single case of vertical symmetry of the inner panel and reinforcing inner panel. The inner panel 1 and reinforcing inner panel 40 of the example of FIG. 9 are provided with a prescribed separation between concavities or between convexities. FIG. 10 shows an example where the inner panel and reinforcing inner panel are vertically symmetrical and where fine concavities/convexities are provided in the cross-sectional curved surface.

Figure 11:
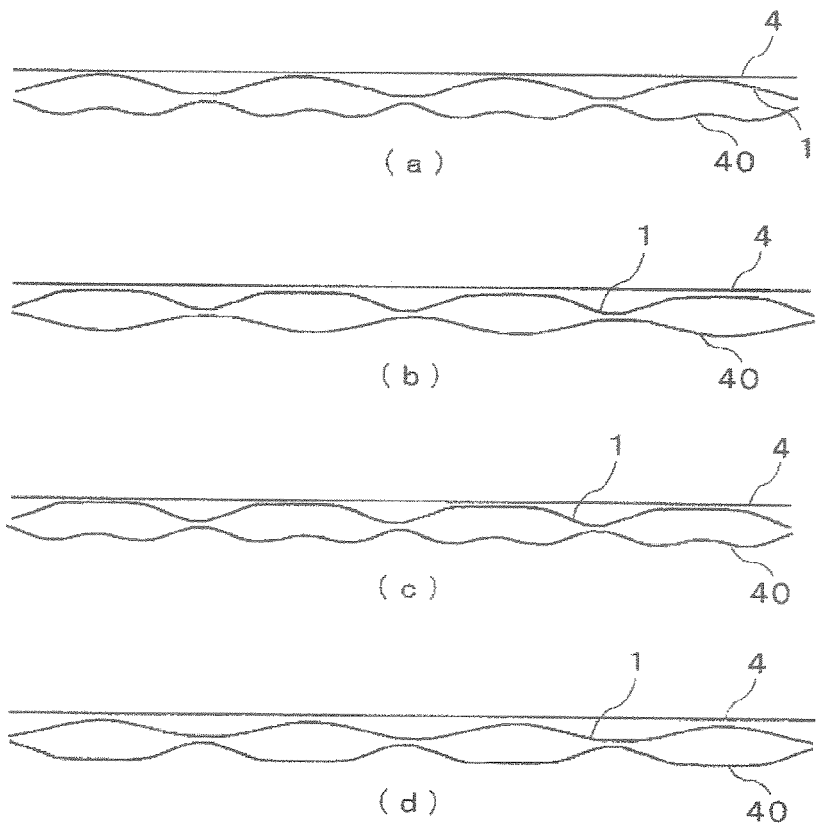
FIG. 11 is a cross-sectional view showing an embodiment of a substantially corrugated inner panel according to the present invention.
Figure 12:
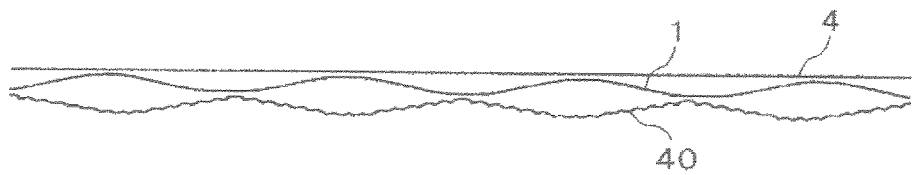
FIG. 12 is a cross-sectional view showing an embodiment of a substantially corrugated inner panel according to the present invention.

Furthermore, FIG. 11(a) to (d) and FIG. 12 are examples of the case of vertical asymmetry. FIG. 11(a) is an example in which small convexities are provided in concavities of the reinforcing inner panel 40. FIG. 11(b) is an example in which some of the convexities of the inner panel 1 are linear FIG. 11(c) is an example in which an inner panel 1 in which some of the convexities are linear is combined with a reinforcing inner panel 40 in which small convexities are provided in the concavities. FIG. 11(d) is an example in which some of the concavities of the reinforcing inner panel 40 are linear. Also FIG. 12 is an example in which fine concavities/convexities are provided in the cross-sectional curved surface of the reinforcing inner panel 40.

Figure 13:
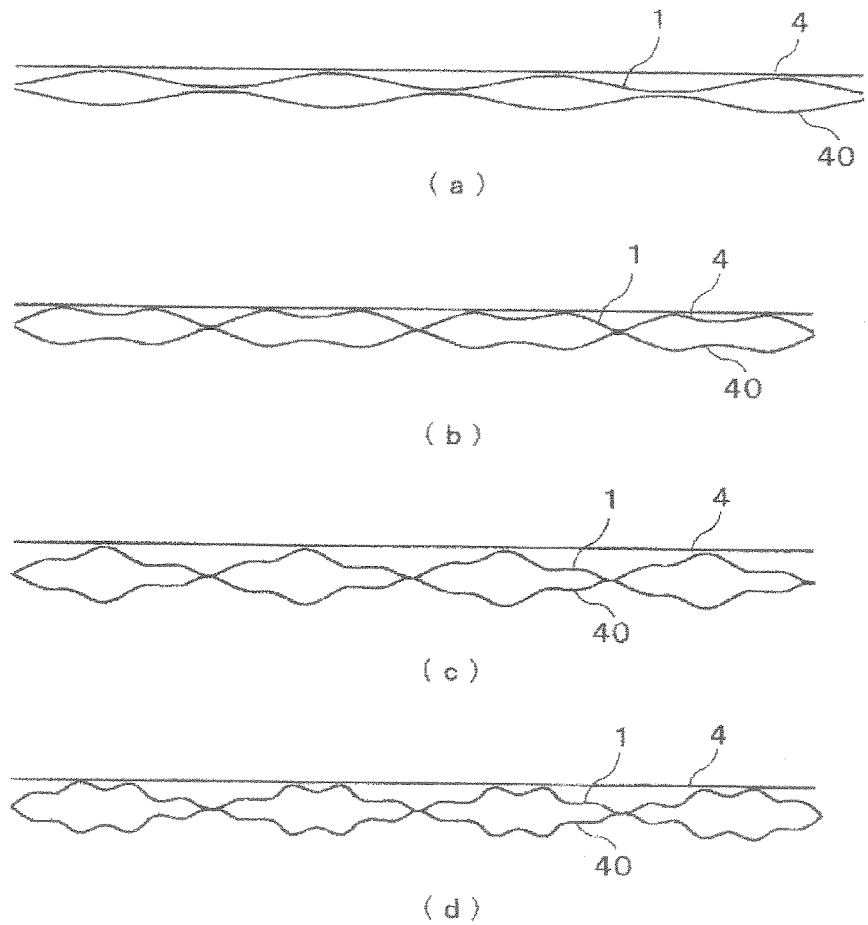
FIG. 13 is a cross-sectional view showing an embodiment of a substantially corrugated inner panel according to the present invention with small corrugations superimposed thereon.

FIG. 13(a) to (d) are views showing a double corrugated cross-sectional shape in the case where the inner panel and the reinforcing inner panel are vertically symmetrical. FIG. 13(b) to (d) are views showing an example in which ripples are superimposed in such a way as to be vertically symmetrical, on the cross-sectional corrugated shape of FIG. 13(a). Specifically, FIG. 13(a) shows the cross-sectional shape of the vehicle body panel structure prior to superimposing the ripples and shows the case where the inner panel 1 and reinforcing inner panel 40 are vertically symmetrical FIG. 13(b) shows a cross-sectional shape in which two ripple corrugations are superimposed in the single wavelength of FIG. 13(a). FIG. 13(c) shows a cross-sectional shape in which three ripple corrugations are superimposed in the single wavelength of FIG. 13(a). FIG. 13(d) shows a cross-sectional shape in which four ripple corrugations are superimposed in the single wavelength of FIG. 13(a).

Figure 73:
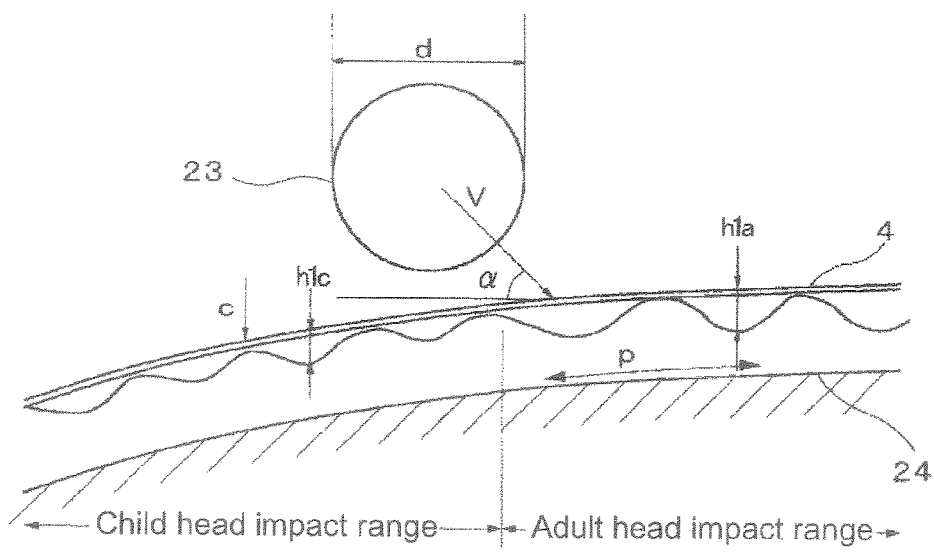
FIG. 73 is a view showing the cross-sectional shape of a corrugated vehicle body panel structure having a corrugated bead in the vehicle width direction and a corrugated bead in the vehicle body longitudinal direction.

In this embodiment, preferably a plurality of substantially corrugated beads are provided in a substantially parallel direction with respect to the vehicle width direction or the longitudinal direction of a panel structure, or in a substantially inclined direction with respect to the longitudinal direction of the panel structure, or in a concentric circular arrangement with respect to substantially the center of the panel structure. Also, the plurality of substantially corrugated beads may comprise a plurality of first concavities/convexities formed such that their cross-sectional shape in a first direction forms corrugations and a plurality of second concavities/convexities formed such that their cross-sectional shape in a second direction intersecting the first direction forms corrugations. A perspective view of an example of arrangement of substantially corrugated beads of the inner panel and reinforcing inner panel is shown in FIG. 14 to FIG. 17 and FIG. 56 and a cross-sectional view thereof is shown in FIG. 73.

Figure 14:
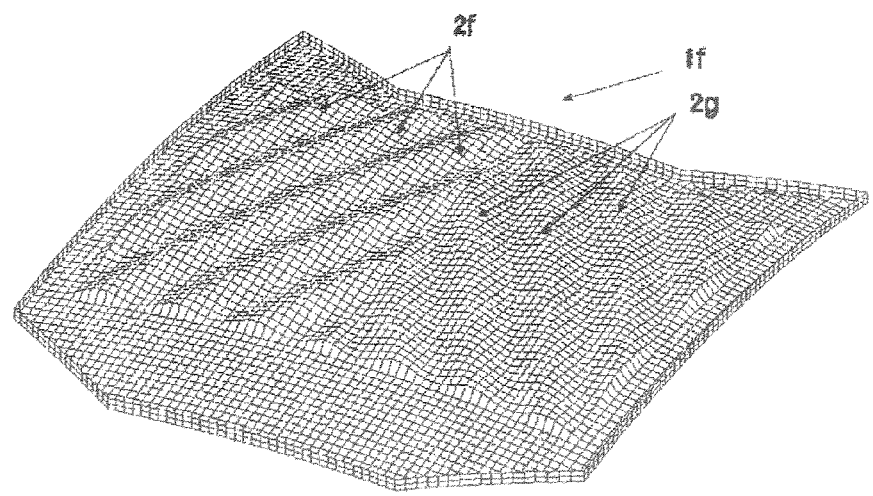
FIG. 14 is a perspective view showing an embodiment of a corrugated inner panel according to the present invention.

In the case of the inner panel 1f of FIG. 14 linear corrugated beads 2f, 2g whose ridge lines extend in inclined fashion with respect to the longitudinal direction of the vehicle body are formed in divided regions on both sides of the vehicle body width direction. The respective ridge lines of the corrugated beads 2f, 2g shown in this FIG. 14 are arranged in the V-shape with respect to the vehicle body direction that meet each other. In the case of the inner panel 1g of FIG. 15, the linear corrugated beads 2f, 2g whose ridge lines extend in inclined fashion with respect to the vehicle body longitudinal direction are likewise formed in divided regions in the vehicle body width direction. The corrugated beads 2f, 2g shown in FIG. 15 have their ridge lines arranged in the inverted V-shape with respect to the vehicle body direction.

Figure 16:
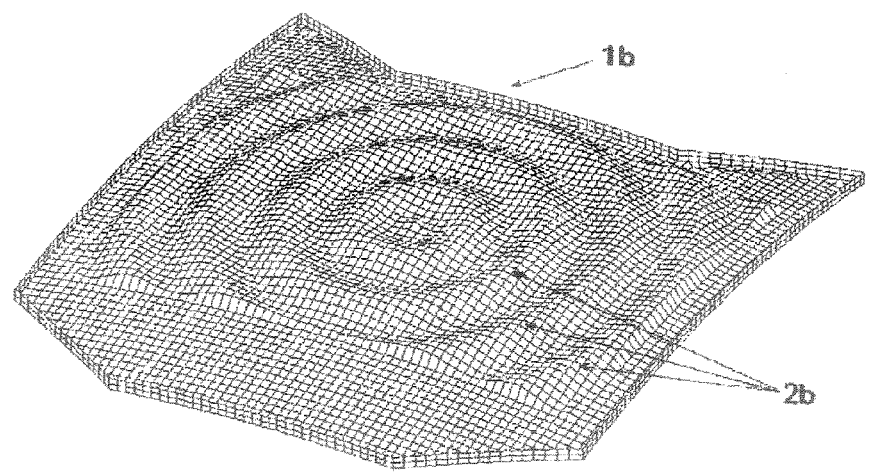
FIG. 16 is a perspective view showing an embodiment of a corrugated inner panel according to the present invention.
Figure 17:
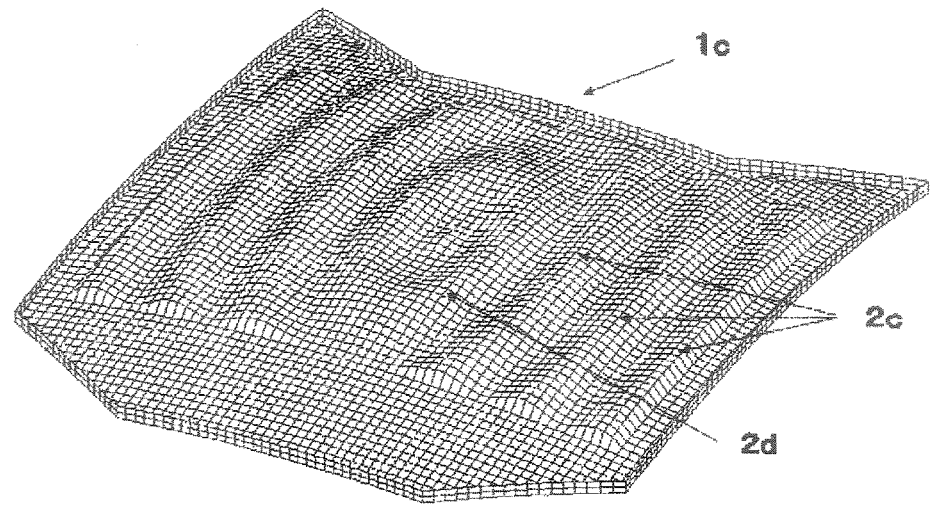
FIG. 17 is a perspective view showing an embodiment of a corrugated inner panel according to the present invention.

In the case of the inner panel 1b of FIG. 16, a plurality of substantially corrugated beads 2b are concentrically provided in a substantially mutually parallel fashion over the entire panel surface. Specifically, the concave/convex shape of the corrugated beads 2b of the inner panel 1b shown in FIG. 16 form concentric circles. Also, in the case of the inner panel 1c of FIG. 17, a plurality of substantially corrugated beads 2c, 2d are provided in substantially mutually parallel elliptical fashion over the entire surface of the panel. Specifically, the inner panel 1c shown in FIG. 17 is provided with corrugated beads 2d of elliptical shape in the middle thereof and linear corrugated beads 2c are formed at both sides thereof.

Figure 18:
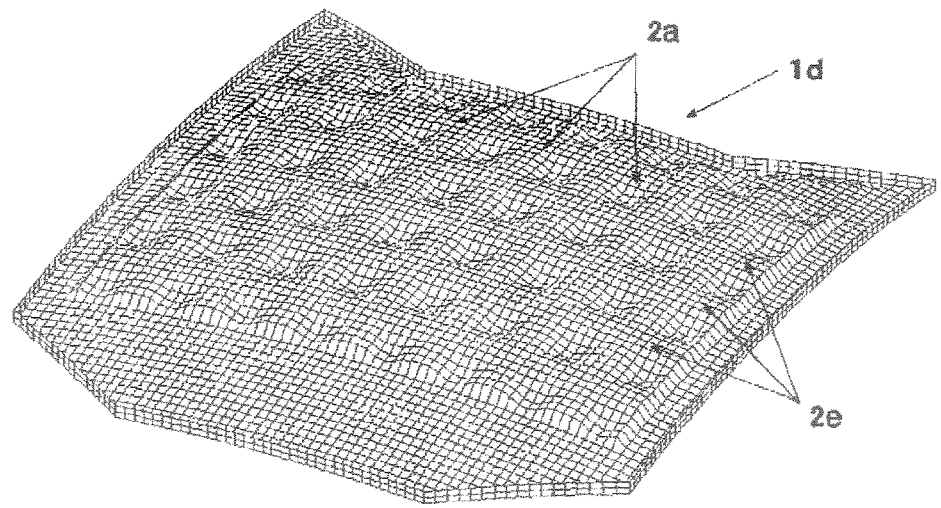
FIG. 18 is a perspective view showing an embodiment of a corrugated inner panel according to the present invention.
Figure 19:
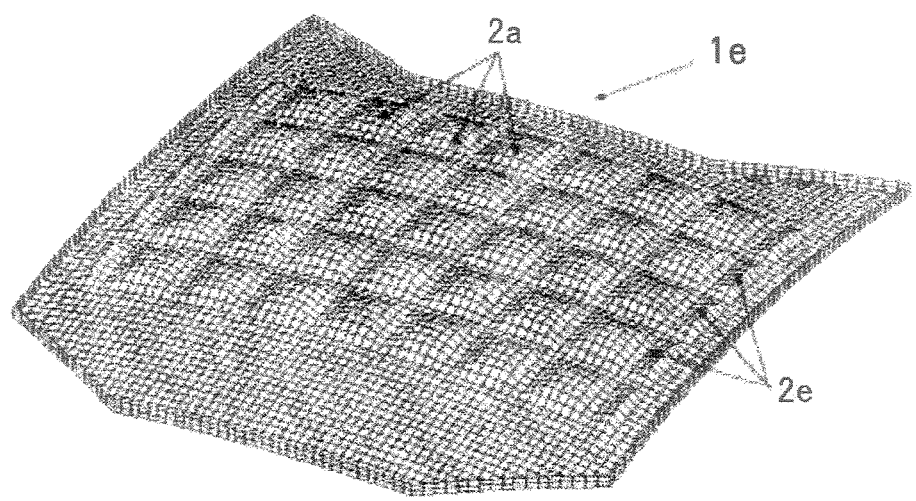
FIG. 19 is a perspective view showing an embodiment of a corrugated inner panel according to the present invention.

Also, in a vehicle body panel structure according to the present invention, it can be arranged for a plurality of substantially corrugated beads to be provided in double corrugated fashion, wherein corrugations that are substantially parallel with respect to the longitudinal direction of the panel structure intersect with corrugations that are substantially orthogonal thereto. FIG. 18 and FIG. 19 are respectively perspective views showing an example of substantially corrugated bead arrangement of an inner panel and reinforcing inner panel.

The inner panel 1d of FIG. 18 is of a form in which a plurality of a substantially corrugated beads 2a, 2e are mutually orthogonal transversely and axially over the entire surface of the panel, thereby increasing the adhesive area of the outer panel and inner panel. Specifically, the inner panel 1d shown in FIG. 18 is formed such that corrugated beads 2a whose ridge lines, just as in the case of FIG. 1, are linear and extend in the vehicle body longitudinal direction and corrugations 2e whose ridge lines are linear and extend in the vehicle body width direction intersect orthogonally.

Likewise, the inner panel if of FIG. 19 is a form in which a plurality of substantially corrugated beads 2a (axial beads) and 2e (transverse beads) are mutually orthogonal in the axial and transverse directions, over the entire surface of the panel, thereby decreasing the adhesive area of the outer panel and inner panel. The corrugated cross-sectional shape of the corrugated beads 2a and 2e shown in FIG. 19 is a sine curve. The inner panel if shown in FIG. 19 is likewise formed such that the corrugated beads 2a whose ridge lines extend in the vehicle body longitudinal direction intersect orthogonally with the corrugated beads 2c whose ridge lines extend in the vehicle body width direction, but the cross-sectional shape of the corrugated beads 2a and 2e is spline-shaped.

Figure 20:
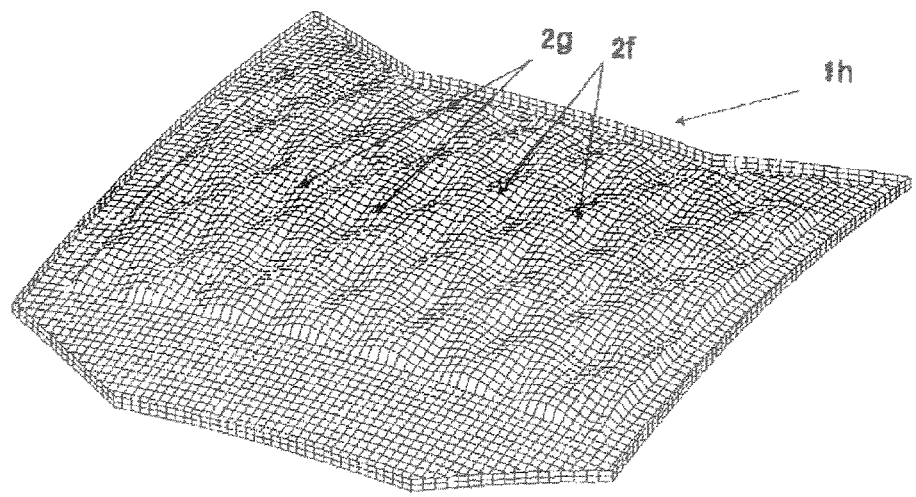
FIG. 20 is a perspective view showing an embodiment of a corrugated inner panel according to the present invention.

In addition, a plurality of substantially corrugated beads according to the present invention may be provided in a double corrugated arrangement wherein, on the corrugations in the inclined direction with respect to the longitudinal direction of the panel structure, corrugations in a further inclined direction intersecting with these are superimposed. The arrangement of the substantially corrugated beads of the inner panel and reinforcing inner panel are shown as a perspective view in FIG. 20. The inner panel 1*h* shown in FIG. 20 has linear corrugated beads 2*f*, 2*g* whose ridge lines extend in inclined fashion with respect to the vehicle body longitudinal direction formed in each case on the entire surface of the vehicle body panel. Consequently, in the embodiment shown, the substantially inclined corrugated beads 2*f* and 2*g* of the FIG. 14 and FIG. 15 mutually intersect. It should be noted that the integration of this inner panel reinforcing inner panel and outer panel is basically performed with the same purpose as in the case of the panel structure described with reference to FIG. 2.

When the substantially corrugated inner panel according to present invention is viewed in plan view, the substantially corrugated beads are arranged mutually parallel such that they constitute double corrugations constituted by corrugations that are parallel or inclined with respect to the hood longitudinal direction or corrugations constituted by concentric circular shapes including for example elliptical shapes or a combination of these arrangements with respect to substantially the center of the substantially corrugated inner panel. Thus the substantially corrugated beads that are arranged therein constitute the cross-sectional shape of the inner panel over the entire surface of the panel. It should be noted that the specific provisions regarding these various arrangements are not strictly specified and for example parallel, trapezoidal and concentric circular shape have an approximate meaning of for example substantial parallelism, substantial trapezoidality and substantially concentric circular shape respectively permitting some degree of variation within a range such as not to impair the benefits in terms of improved rigidity.

Figure 15:
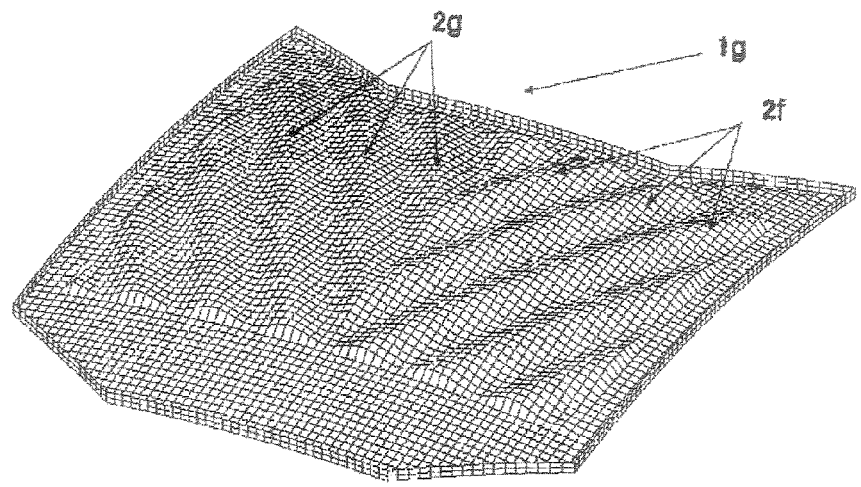
FIG. 15 is a perspective view showing an embodiment of a corrugated inner panel according to the present invention.
Figure 56:
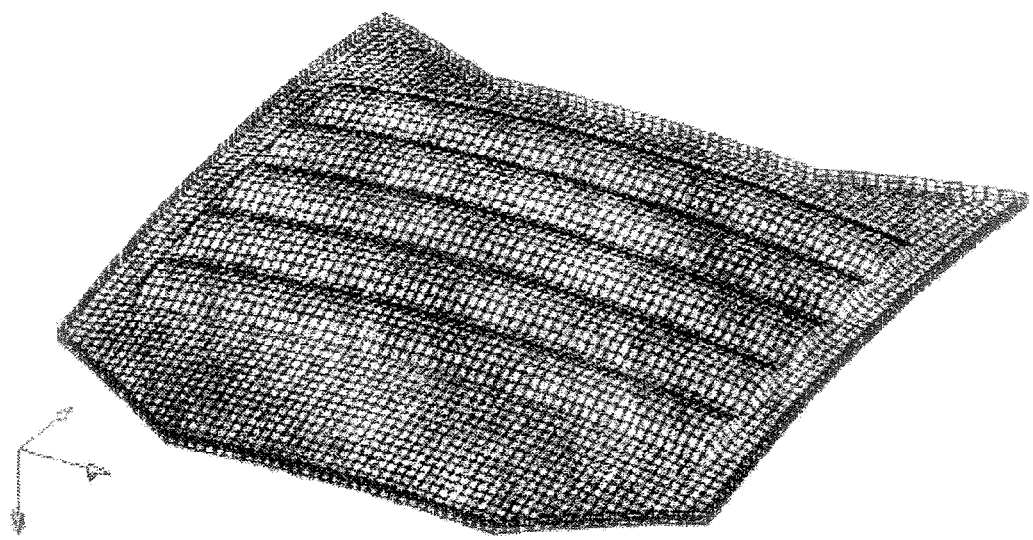
FIG. 56 is a perspective view showing an embodiment of a corrugated inner panel according to the present invention.

The inner panels 1*f*, 1*g* of FIG. 14 and FIG. 15 described above show an embodiment in which the substantially corrugated beads 2*f*, 2*g* are of V-shape (or U-shape) and distributed in substantially parallel fashion. The inner panel of FIG. 56 shows an embodiment in which the substantially corrugated beads are distributed in substantially parallel fashion in the vehicle width direction. In FIG. 56, the substantially corrugated beads are distributed parallel with the vehicle width direction.

Next, a double corrugated hood structure in which a reinforcing inner panel and outer panel are integrated will be described. The hood structure of FIG. 2 shows a condition in which a resin layer 7 is arranged at the top sections of the substantially corrugated beads 2 of the inner panel 1*a* so that flat top sections 5*a* of the substantially corrugated beads 2*a* and the inside face of the outer panel 4*a*, which is formed in gently arcuate shape, are mutually joined by means of this resin layer 7 as an adhesive, to produce an integrated condition with a closed cross-sectional structure enclosing a space.

Integration of the hood structure is achieved by fixing the peripheral sections of the inner panel 1*a* and outer panel 4 with adhesive by hem (bending) processing of the end section 4*b* of the peripheral section of the outer panel 4. It should be noted that it is also possible to confer damping and sound absorption (sound insulation) and impact buffering effects on the resin layer 7 by selection of the properties and type of the resin. In order to improve these effects, it is possible to fill the gap between the inner panel 1*a* and outer panel 4, not just on the top sections 5*a* of the corrugated beads 5, but also for example on the bead concavities 6, with for example a resin layer or cushioning material.

Figure 3:
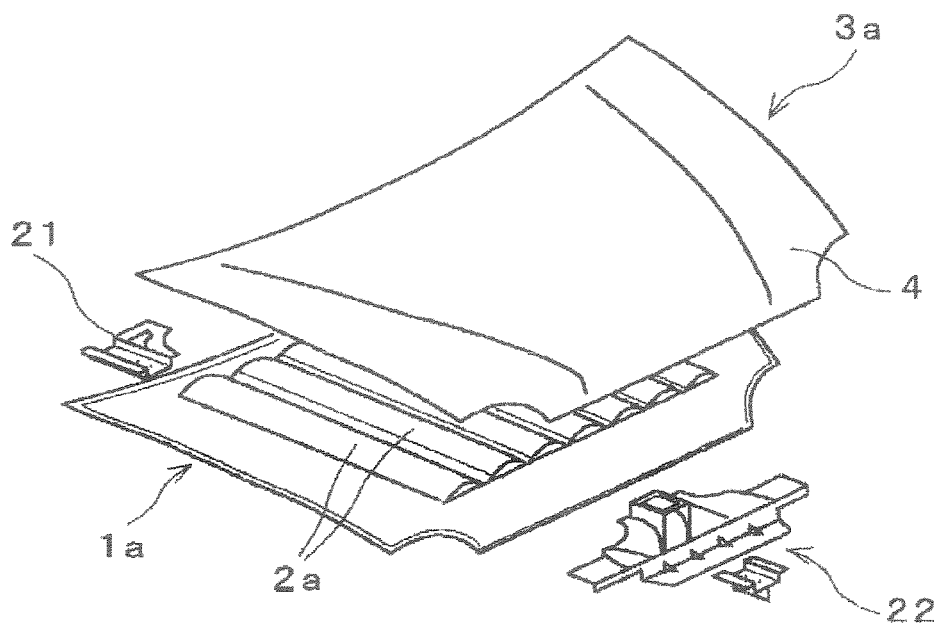
FIG. 3 is a perspective view of a vehicle body panel structure according to the present invention.

Next, in FIG. 3, which is a perspective view of the double corrugated hood structure of FIG. 2, the corrugated structure in which the inner panel 1*a* and outer panel 4 are integrated, like the conventional cone type hood structure or beam type hood structure referred to above, is locally further reinforced by means of a reinforcement member such as a hinge reinforcement 21 or a latch reinforcement 22.

On the other hand, regarding the solution of the problems in regard to pedestrian protection, in impact of a head with the hood, the conventional corrugated inner panel is capable of extremely good absorption of the kinetic energy of the head, making it possible to considerably lower the HIC value.

Specifically:

adopting for the wavelength of the corrugated inner panel a value that is about that of the external diameter of the head produces a construction that in the event of a head impact, the head can be supported roughly by a single corrugation, thereby producing deformation whereby the head is arrested gently and as a result the second-wave acceleration is reduced, reducing the HIC value;

in the event of a head impact, rattling vibration of the outer panel and inner panel is produced thereby disrupting the head acceleration waveform and, as a result, making it possible to greatly decrease the second-wave acceleration reducing the HIC value.

In the double corrugated hood structure according to the present invention, the head impact energy is efficiently absorbed by the further addition of a reinforcing inner panel to the conventional corrugated hood structure, so the HIC value falls even further compared with the conventional corrugated hood structure, thereby improving head impact-resistance.

Also by adopting the method of flexible coupling between the outer panel and the inner panel, by the provision of a local adhesive sections in zigzag or in dispersed fashion at the peaks of the corrugated inner panel, in regard to pedestrian protection, rattle vibration of the outer panel and inner panel in the event of a head impact is unimpaired with the result that the head acceleration waveform is disrupted, making it possible to reduce the HIC value.

In addition, by the use of a spline type inner panel, realistic design can be achieved taking into consideration the arrangement of rigid components such as the engine, batteries and radiator within the engine room.

Since hard components such as the engine, battery and radiator are present in the engine room in the design of the corrugated inner panel design is necessary that takes account of the arrangement of these components. Since the arrangement of these components shows countless variations depending on the automobile, the cross-sectional shape of the corrugated inner panel can thereby be corrected from simple regular corrugations to a corrugated shape in which the wavelength, wave height and waveform changes irregularly. Consequently, preferably the cross-section shape of the corrugations is a shape as for example in FIG. 4 defined by a shape function that expresses an arbitrary three-dimensional shape, such as a spline function. In this embodiment, an inner panel having the corrugated shape of such a spline function is defined as a spline type inner panel, constituting one embodiment of a corrugated inner panel.

FIG. 4 shows an outer panel, spline type inner panel and spline type reinforcing inner panel and rigid body surfaces within the engine room, in cross-sectional shape in a cross-section in the hood longitudinal direction. First of all, the positional relationship of the spline type inner panel and spline type reinforcing inner panel and rigid body surfaces is devised such that, in the event of a head impact, the valley sections of the corrugations are roughly uniformly impacted by the rigid body surfaces and such that reactive force from the rigid body surfaces is transmitted to the entire surface of the corrugated inner panel. A cross-sectional shape is thereby produced such that, at a location B1 where impact between the head and the rigid body is inevitable since the clearance between the outer panel and the surface of the rigid body is small, support is effected in a uniform fashion in the valleys D1, D2 of the spline corrugations (the same applies also to B2, B3 and B4).

Also, at a location A1 where impact with a rigid body does not occur because of sufficient clearance, the cross-sectional shape may be made such that support is effected in a uniform fashion in the valleys D2, D3 of the corrugations by employing a large wavelength. If, in these locations, the wavelength were made short, resulting in the presence of a plurality of corrugations, the displacement in the vertical direction would be increased due to lowering of the bending rigidity of the inner panel in the vehicle width direction, adversely affecting head impact-resistance. Connection between D2 and D3 is therefore effected by a single corrugation (the same applies to A2). That is, there are no problems so long as the provision of corrugations is in an allowable range in which the HIC value is low. It should be noted that, in the event of a head impact in the valley sections of the corrugations C1, C2, C3, C4 or C5, the load is first of all transmitted to the peak sections of the inner panel and is subsequently transmitted to the rigid body faces through the valley sections of the inner panel, so head impact-resistance is roughly the same as in the case of impact with the peak sections. In this way, by using a spline type inner panel, roughly constant head impact-resistance can be implemented irrespective of the arrangement of the rigid bodies within the engine room, which is different for each vehicle. Also, it should be noted that, while the arrangement of rigid bodies within the engine room is extremely complex, a spline type inner panel shape enables the provision of a complex curved surface since the wave height and wavelength of the spline corrugations can be flexibly varied in the vehicle width and vehicle longitudinal direction.

Furthermore, in respect of the locations where clearance is insufficient so that head impact-resistance is insufficient, the local rigidity of the inner panel can be increased by attaching a reinforcing panel to the inner panel, or adding local concavities/convexities (so-called embossing processing) or superimposing ripples in the hood longitudinal direction on the spline type inner panel, and in this way head impact-resistance can be improved.

Also, it was discovered by the present inventors that by attaching a metal sheet made of for example steel or aluminum to the undersurface of the outer panel, the local weight of the outer panel can be increased, making it possible to increase the value of the first-wave acceleration in the event of head impact to about 200 G and thereby to obtain an optimum shape of the head acceleration waveform, lowering the HIC value.

As the metal employed in the outer panel, inner panel and reinforcing inner panel, Al alloy sheet or high tensile steel sheet, for example, such as are ordinarily generally employed, may be suitably used. However, since the resin must be of extreme thickness in order to confer the rigidity that is the object of the present invention with a view to obtaining characteristics such as material strength, ordinary resin is impractical and cannot be employed as a vehicle body panel structure material according to the present invention.

In order to achieve further weight reduction of the vehicle body, preferably Al alloy is employed, but, with a vehicle body panel structure according to the present invention, fully sufficient high rigidity can be achieved even without using high tensile steel sheet or without using specially high-strength Al alloy.

Preferably as the Al alloy itself that is employed for the inner panel or outer panel used in the present invention, a selection may be made from ordinary (standard) Al alloy sheet of comparatively high durability, such as 3000 grade, 5000 grade, 6000 grade or 7000 grade in accordance with AA or JIS standards, that are commonly used in panels of this type. Such Al alloy sheet is manufactured by ordinary methods such as rolling, and is employed after suitable thermal refining.

In order to improve head impact-resistance in pedestrian protection, the effectiveness of a double corrugated hood structure was investigated using a simple analysis model. The case was investigated in which the corrugation cross section has a sine wave shape and the distribution of the corrugations is parallel to the longitudinal direction of the hood.

Figure 21:
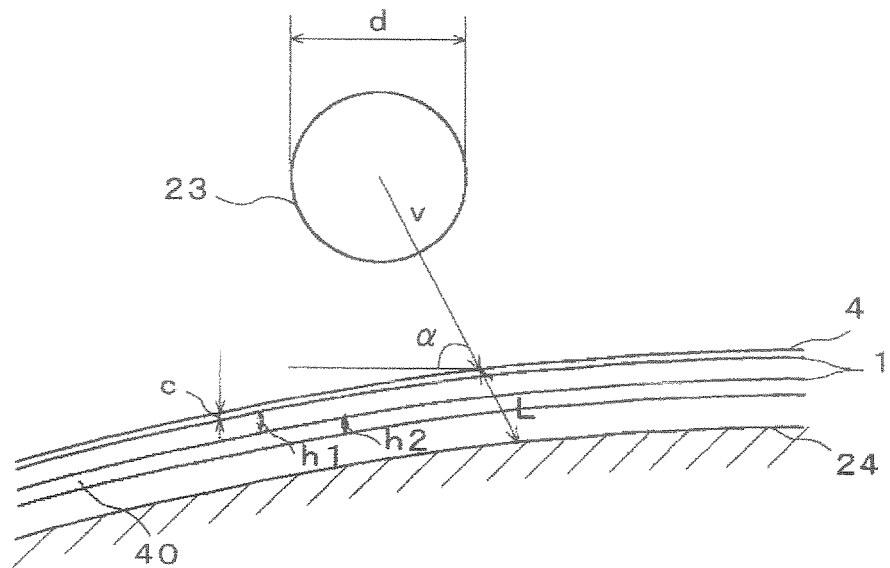
FIG. 21 is a diagram (side view) of a head impact model of a double corrugated vehicle body panel structure according to the present invention.
Figure 23:
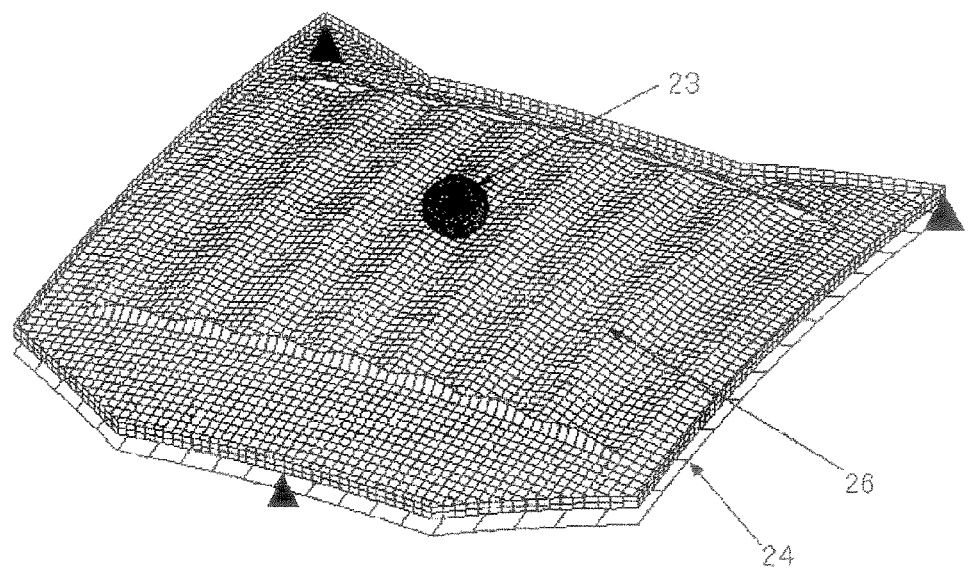
FIG. 23 is a model (perspective view) of a head model and corrugated inner panel according to the present invention.
Figure 24:
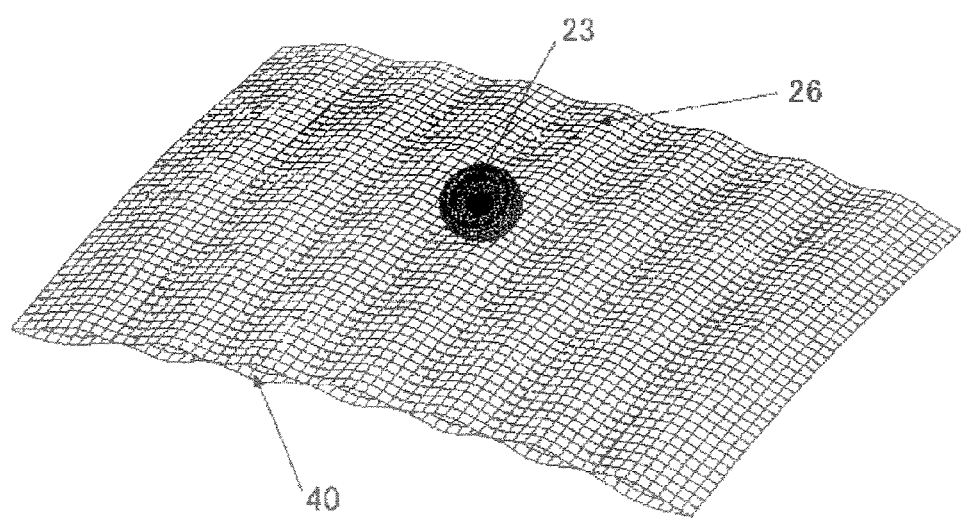
FIG. 24 is a model view (perspective view) of a double corrugated vehicle body panel structure according to the present invention.

The analysis model was set up as follows. FIG. 21 is a side view showing diagrammatically a pedestrian head impact model of a corrugated inner panel employed in the present invention and FIG. 22 is a front view FIG. 23 and FIG. 24 show perspective views of the head impact model.

Figure 22:
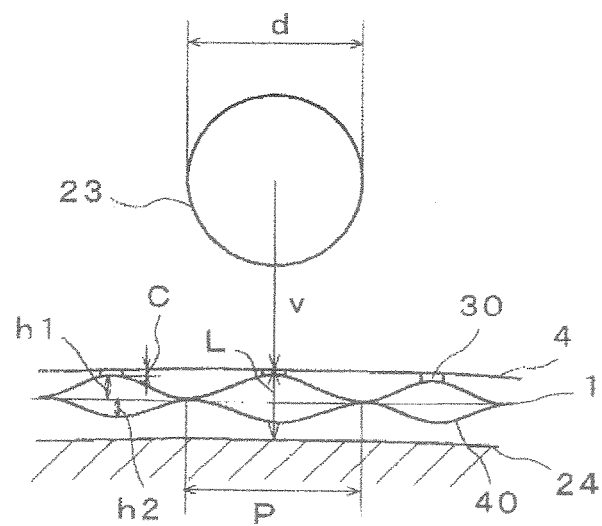
FIG. 22 is a diagram (front view) of a head impact model of a double corrugated vehicle body panel structure according to the present invention.

In FIG. 21 and FIG. 22, a corrugated inner panel 1 is provided on the inside face of an outer panel 4. A reinforcing inner panel 40 is provided on the inside face of the corrugated inner panel 1. The outer panel 4 and inner panel 1 are adhesively fixed by means of resin 30. The reference numeral 23 indicates the head of a pedestrian and the reference numeral 24 indicates the surface of a rigid body. Also the respective dimensions are indicated by: head outer diameter d, impact speed v, angle of impact α, interval L between the outer panel and the rigid body surface in the direction of impact, thickness c of the adhesive, wave height h1 of the corrugated inner panel, wave height h2 of the reinforcing inner panel, and wavelength p of the corrugated inner panel and reinforcing inner panel. Also, the analysis conditions of the pedestrian's head model are shown in Table 1 below.

TABLE 1

| Item | Adult | Child |
| --- | --- | --- |
| Weight W | 4.8 kg | 2.5 kg |
| Head external diameter d | 165 mm | 130 mm |
| Angle of impact α | 65° | 50° |
| Impact speed V | 40 km/h | 40 km/h |

In the analysis model, the following items were considered. For the head impact model, since detailed modeling in terms of the actual object is difficult, a spherical head model was adopted for the head and a simplified model was adopted in which the vehicle body section was constituted by a hood structure and rigid body surface.

The rigid body surface simulates rigid bodies such as the engine in the engine room, which are difficult to model, and has a curved surface parallel with the outer panel with a clearance L in the perpendicular direction.

For the hood model, the hood was modeled as an elastic body with a simple model of a double sheet structure having double curvature, specifically having curvature of 3100 mm in the hood longitudinal direction and curvature of 4300 mm in the width direction, an inner panel and reinforcing inner panel made of 5000 grade aluminum material, with an outer panel made of 6000 grade aluminum material, as in an ordinary sedan.

The adhesive section of the outer panel and inner panel was not modeled. The thickness c of the adhesive section was modeled as permitting a gap. The three points shown as black triangles in FIG. 23 are supporting sections. Other locations are not constrained. In the event of a head impact, the hood structure shows considerable deformation and the impact section collides with the rigid body surface.

As the head model, the head models of an adult and of a child shown in EEVC/WG 10 were adopted.

In order to investigate the effect of the double corrugated hood structure on head impact-resistance a comparative study was conducted with a conventional corrugated hood structure that had already been found to be effective. Table 2 shows a table of the dimensions of these two.

TABLE 2

| | Corrugated hood structure | |
|---|---|---|
| Item | Conventional type | Double corrugated type |
| Wavelength p | 165 mm | |
| Inner panel wave height h1 | 30 mm | 15 mm |
| Reinforcing inner panel wave height h2 | None | 15 mm |
| Outer panel sheet thickness | 1 mm | |
| Inner panel sheet thickness | 0.8 mm | |
| Reinforcing inner panel sheet thickness | None | 0.3 mm |
| Clearance in perpendicular direction | 70 mm | |
| HIC value | 966 | 657 |
| Peak value of first-wave acceleration | 130 G | 130 G |
| Peak value of second-wave acceleration | 120 G | 80 G |

Figure 25:
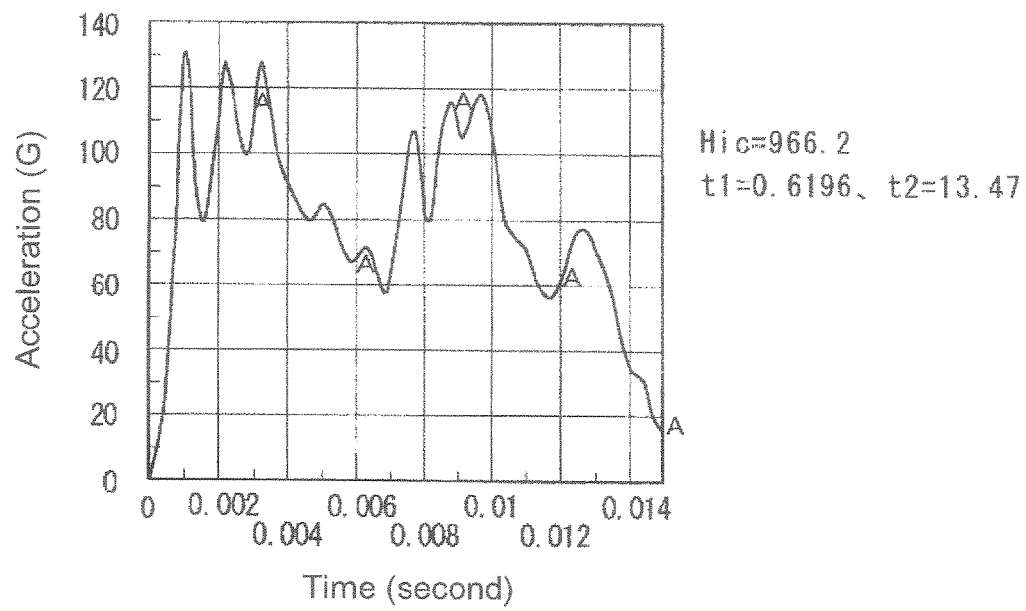
FIG. 25 is a diagram showing a head acceleration waveform in a conventional corrugated hood structure.
Figure 26:
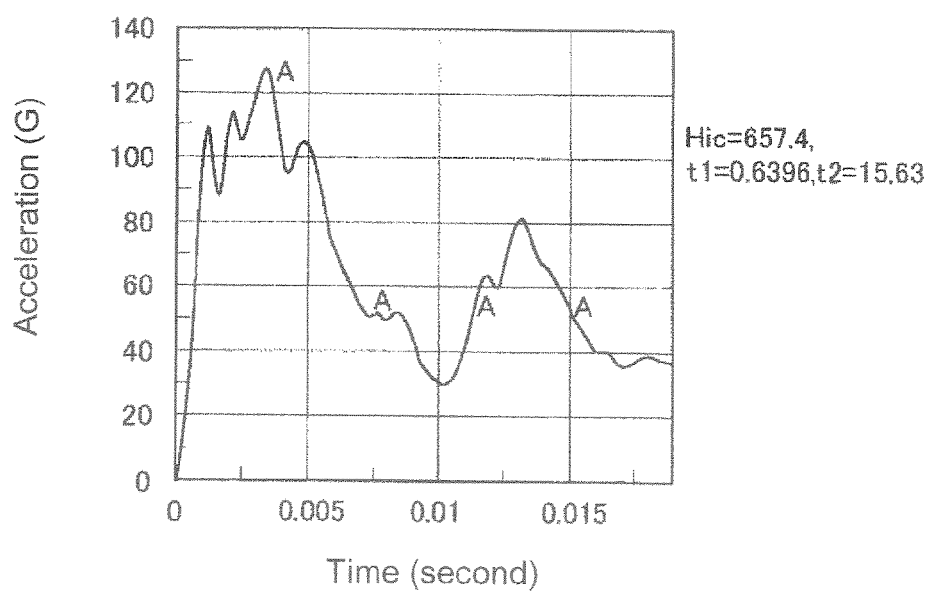
FIG. 26 is a diagram showing a head acceleration waveform with a double corrugated vehicle body panel structure according to the present invention.
Figure 62:
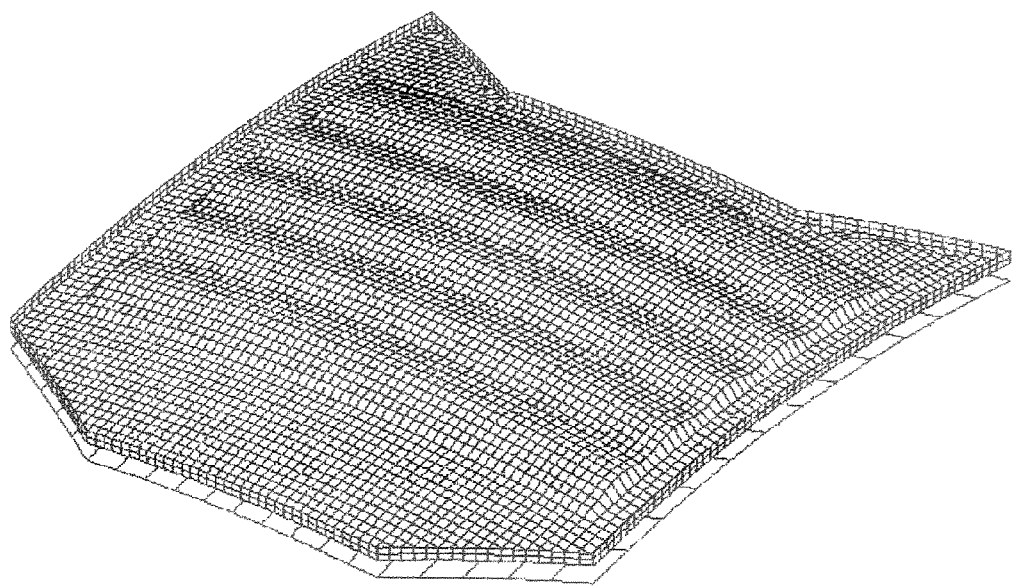
FIG. 62 is a diagram showing an analysis model of a double corrugated vehicle body panel structure combining an inner panel and reinforcing inner panel having a corrugated bead in the vehicle width direction.
Figure 66:
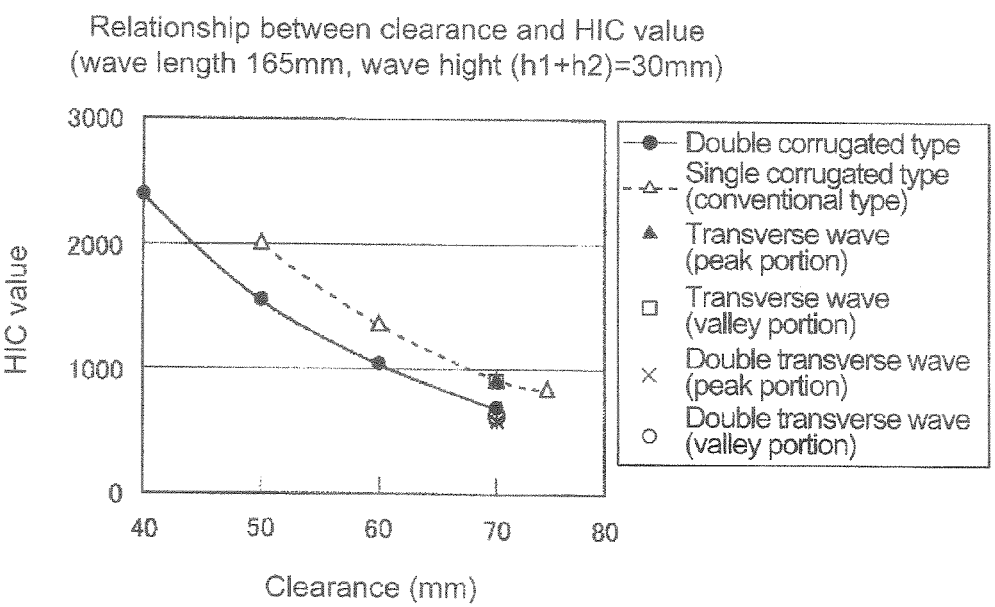
FIG. 66 is a diagram showing an analysis result of a double corrugated vehicle body panel structure combining an inner panel and reinforcing inner panel having a corrugated bead in the vehicle width direction in comparison with the conventional analysis result.

FIG. 23 and FIG. 62 are views showing the analysis model. The head impact position is taken as the middle of the hood. In FIG. 24, the corrugated portion of the double corrugated hood structure is extracted and displayed. The reinforcing inner panel at the underside of the corrugated inner panel is fixed to the inner panel by an adhesive section so that a closed space is defined by the inner panel and the reinforcing inner panel. In contrast, in the case of the conventional corrugated hood structure, no reinforcing inner panel is provided. The analysis results in the case of the corrugated hood structure are shown in FIG. 25. The analysis results in the case of the double corrugated (longitudinal corrugation) hood structure are shown in FIG. 26. The analysis results in the case of the double corrugated (transverse corrugation) hood structure are shown in FIG. 66. From these analysis results it was found that the HIC value was 966 in the case of the corrugated hood structure, but, in the case of the double corrugated (longitudinal corrugation) hood structure, the HIC value dropped to 657, and in the case of the double corrugated (transverse corrugation) hood structure the HIC value dropped to 635. This shows that the double corrugated hood structure resulted in efficient absorption of head impact energy, in particular, the magnitude of the second-wave acceleration was considerably lowered from 120 G to 80 G. This result confirmed the effectiveness of the double corrugated hood structure in regard to head impact-resistance.

Figure 27:
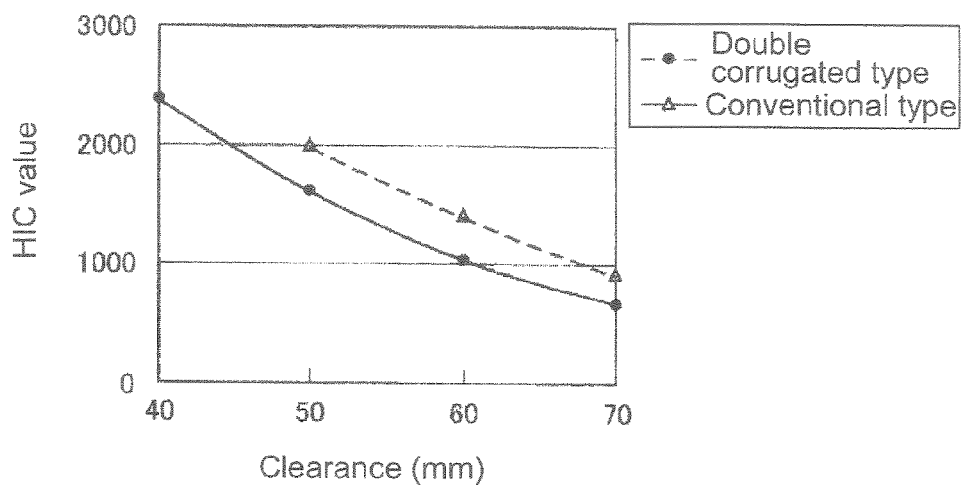
FIG. 27 is a diagram showing the relationship between clearance L and HIC value.
Figure 71:
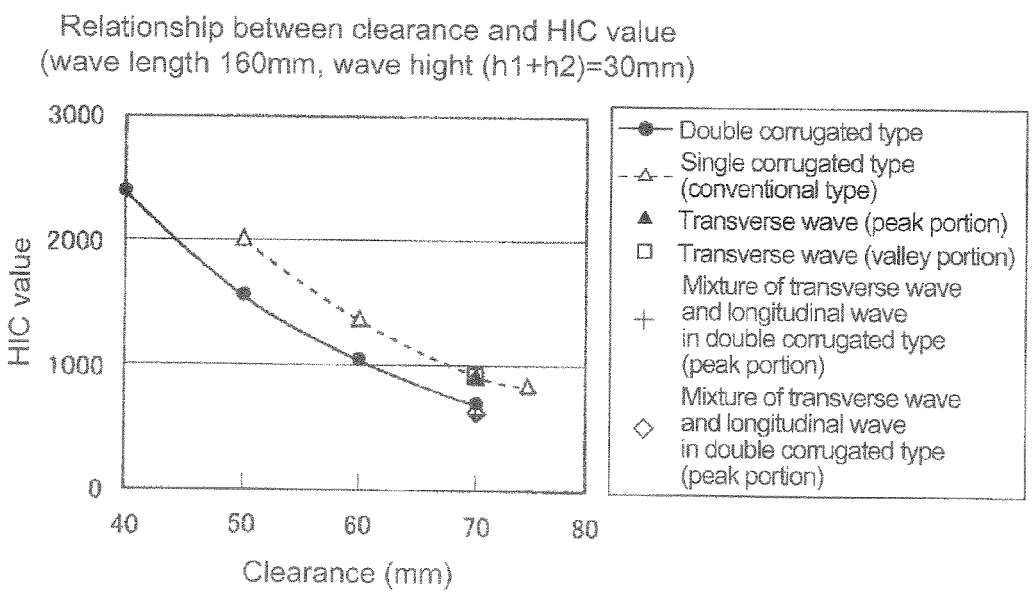
FIG. 71 is a view showing the analysis results of a double corrugated vehicle body panel structure combining an inner panel and a reinforcing inner panel in which there are present both a corrugated bead in the vehicle width direction and a corrugated bead in the vehicle body longitudinal direction.

The relationship between the clearance L and HIC value was investigated using the above analysis model. The analysis results are shown in FIG. 27 and FIG. 71. From these Figures, in the case of the double corrugated hood structure, the HIC value falls in comparison with the conventional structure, making it possible to reduce the clearance by about 7 mm i.e. excellent results were confirmed in terms of hood design.

Figure 28:
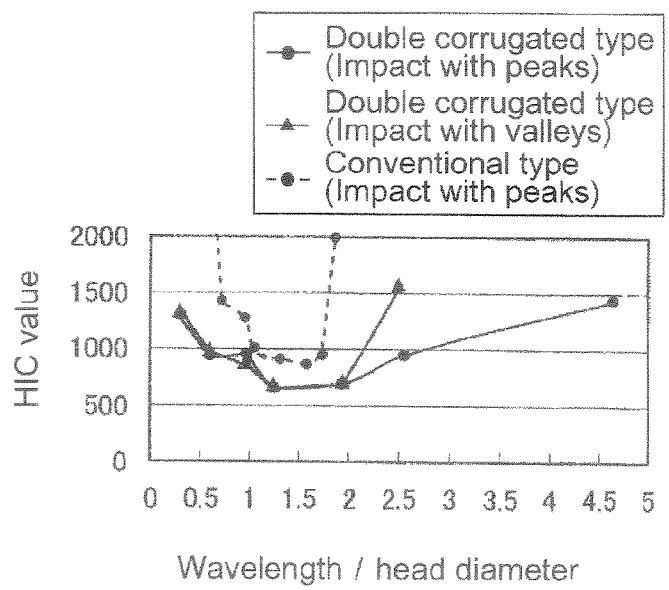
FIG. 28 is a diagram showing the effect of wavelength on HIC value.

Using this analysis, an investigation was conducted regarding the most suitable ranges of wavelength and wave height in a double corrugated hood structure. First of all, the analysis results in respect of child head impact with regard to wavelength are shown in FIG. 28. From FIG. 28 in the case of the double corrugated hood structure the HIC value fell considerably in comparison with the conventional structure and it was confirmed that a suitable range was represented by $0.5<p/d<2.8$, where the wavelength is p and the head external diameter of the pedestrian is d. This suitable range can be directly applied also for the case of adult head impact.

When the wavelength is short, the bending rigidity of the inner panel and reinforcing inner panel in the vehicle body longitudinal direction increases causing the hood rigidity to become excessive with the result that the HIC value exceeds the limiting value. Also if the wavelength is too large, contrariwise, the bending rigidity in the vehicle body longitudinal direction falls, causing excessive lowering of the hood rigidity with the result that the head collides with the rigid body surface and the HIC value exceeds the limiting value. It is extremely important to keep the wavelength in a suitable range.

Figure 29:
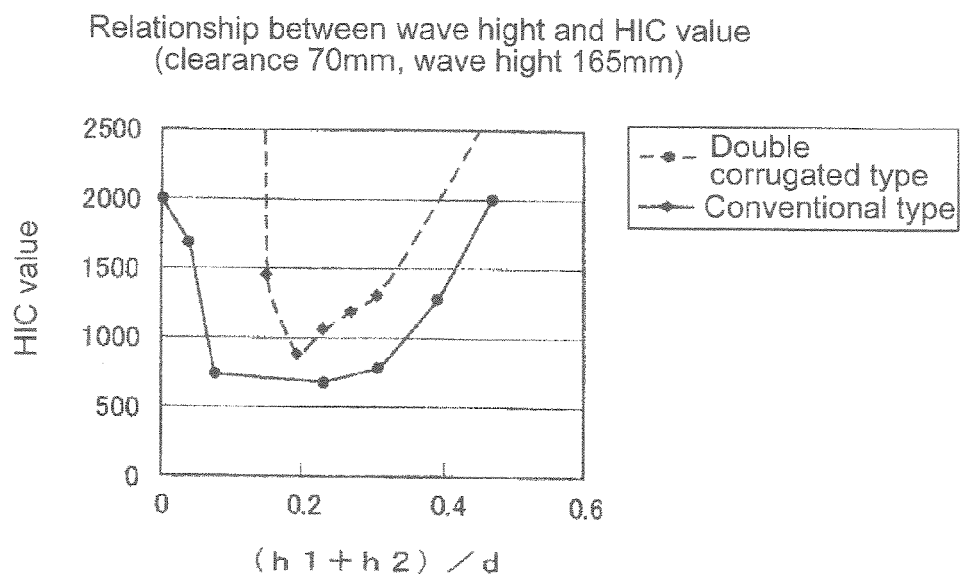
FIG. 29 is a diagram showing the effect of wave height on HIC value.

Next, in the same way, FIG. 29 shows the analysis results in the case of a child head impact with regard to wave height. From FIG. 29, in the case of the double corrugated hood structure, the HIC value drops considerably in comparison with the conventional case. It was confirmed that a suitable range is $0.05<(h1+h2)/d<0.35$, where the wave height of the inner panel is h1, the wave height of the reinforcing inner panel is h2, and the external diameter of the head of the pedestrian is d. This suitable range can be directly applied also for the case of adult head impact.

When the wave height is low, the bending rigidity in the vehicle body longitudinal direction falls, causing the hood rigidity to become too low, with the result that the head collides with the rigid body surface, and the HIC value exceeds the limiting value. Also, if the wave height is high, the bending rigidity of the inner panel and reinforcing inner panel in the vehicle body longitudinal direction increases, causing excessive increase in the hood rigidity, with the result that the HIC value exceeds the limiting value. It is extremely important to keep the wavelength in a suitable range.

Figure 30:
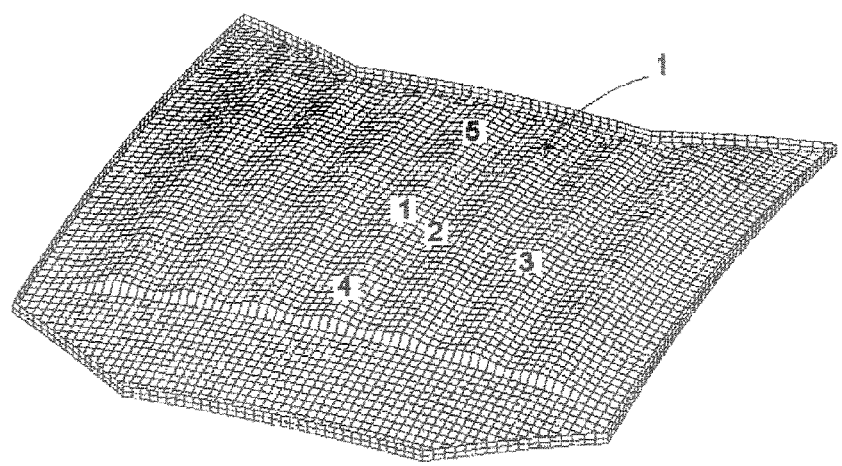
FIG. 30 is a perspective view showing the head impact position in a conventional corrugated hood structure.

The effect of head impact position in regard to the double corrugated hood structure was investigated. The analysis conditions were that in the case of a child head impact, clearance L in the perpendicular direction between the outer panel and rigid body surface of 70 mm was assumed and the head impact position is shown in FIG. 30. The analysis results are shown in Table 3. From this Table 3 even though the head impact position changed, the HIC value was roughly fixed. It was thereby confirmed that the HIC value was roughly uniform with regard to the location of impact in the case of the double corrugated hood structure. It may be said that constancy of the HIC value irrespective of impact position is of very considerable utility in regard to safety

TABLE 3

| Position of impact | Position of corrugation | HIC value |
|---|---|---|
| 1 | peak section | 705 |
| 2 | valley section | 884 |
| 3 | peak section | 666 |
| 4 | peak section | 850 |
| 5 | peak section | 668 |

Figure 31:
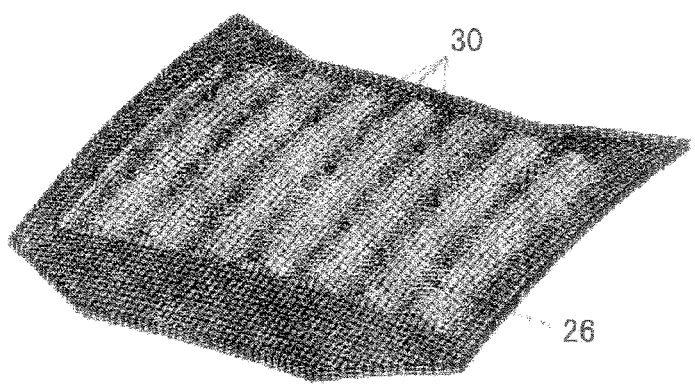
FIG. 31 is a diagram showing the location of joining of an outer panel and inner panel.

A gap of a few millimeters is present at the adhesive section of the outer and inner panels, but, in order to obtain suitable tensile rigidity of the hood it is actually necessary to keep the adhesive to the minimum. From analytical studies of the conventional hood structure it has been found that, in order not to impair rattling vibration, a structure is desirable such that the adhesive sections 30 are arranged in zigzag fashion or in dispersed fashion at the peak sections of the corrugated inner panel as in FIG. 31 using an extremely soft sponge-like adhesive, the contact cross-sectional shape being of comparatively restricted area. If the cross-sectional area of the adhesive sections is increased or the rigidity of the adhesive is increased, the outer panel and inner panel become unified, facilitating vibration as an integrated unit but preventing rattling vibration. As a result, it is found that the second acceleration wave is increased, tending to increase the HIC value. Even in the case of a double corrugated hood structure, the basic structure is the same, so the same mechanism is manifested and a like method of adhesion is therefore required. Consequently, the present invention specifies the method of adhesion of the corrugated inner panel and outer panel in the double corrugated hood structure.

In the double corrugated hood structure according to the present invention, preferably two air layers are provided, namely, between the outer panel and inner panel and between the inner panel and the reinforcing inner panel, and fine holes are provided in the inner panel or reinforcing inner panel. In this way, not merely improved pedestrian protection but also improved sound absorption performance can be achieved. Regarding the size of the fine holes, it should be noted that, as is general knowledge in manufacturing, it is fairly difficult to form fine holes of less than about the sheet thickness by punching. So, in cases where mass-production is a precondition, the minimum value of the hole diameter will be about the sheet thickness. However, separate study of methods of forming holes smaller than this economically is necessary.

From the provisional formula for a perforated sheet sound absorption panel based on Helmholtz's resonance principle:

$$f = c/2\pi \times \sqrt{(\beta/(t+1.6b)d)} \quad \text{[math 3]}$$

Figure 32:
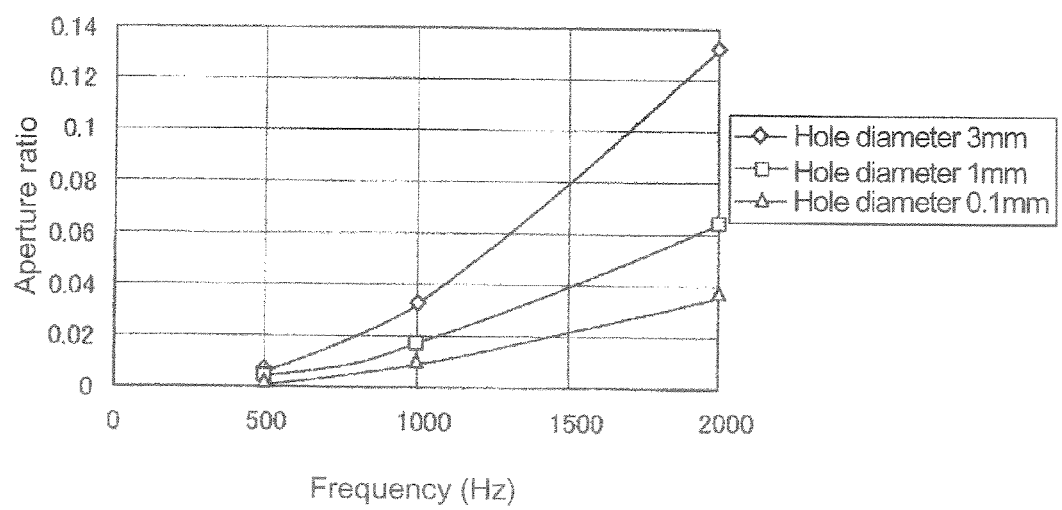
FIG. 32 is a diagram showing the relationship between frequency and aperture ratio with a perforated sheet.

(where f is the frequency, c is the speed of sound, $\beta$ is the aperture ratio, t is the sheet thickness, b is the aperture radius (radius of the holes) and d is the thickness of the back air layer), the frequency drops as the aperture ratio becomes smaller, if the hole diameter becomes larger, the sheet thickness becomes greater, and the thickness of the back air layer becomes larger. FIG. 32 shows the relationship between the thickness of the back air layer and the frequency.

The sound absorption characteristic improves as the holes are made smaller and it has been discovered good sound absorption performance is obtained by viscous attenuation at hole diameters of 1 mm or less (H V Fuchs and X Zha: The application of micro-perforated sheets as sound absorbers with inherent damping. Acustica, 81, 107-110 (1995). Application of this known fact is envisioned.

However, in view of productivity and economics, it is difficult to make the hole diameter produced by punching less than about the thickness of the sheet. Accordingly, if, as the sound absorption condition of the hood inner panel, a sheet thickness of inner panel thickness 0.8 mm thickness of the back air layer of 30 mm and target sound absorption frequency of 1000 Hz or less are specified, from FIG. 33, it can be seen that the target frequency can be satisfied if the aperture ratio is no more than 2% in the case of the hole diameter of 1 mm and if the aperture ratio is no more than about 3% in the case of the hole diameter of 3 mm.

Figure 33:
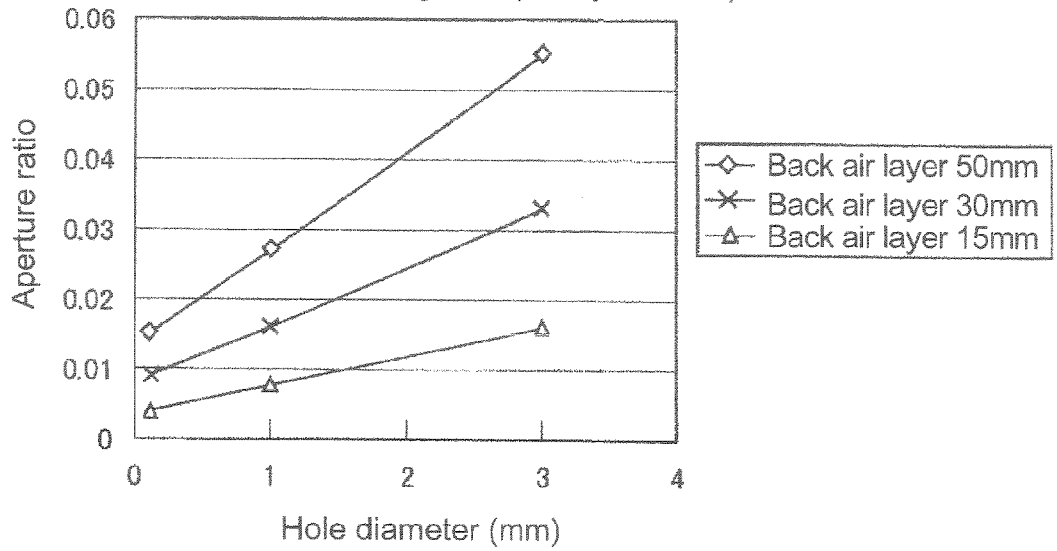
FIG. 33 is a diagram showing the relationship between hole diameter and aperture ratio with a perforated sheet.
Figure 34:
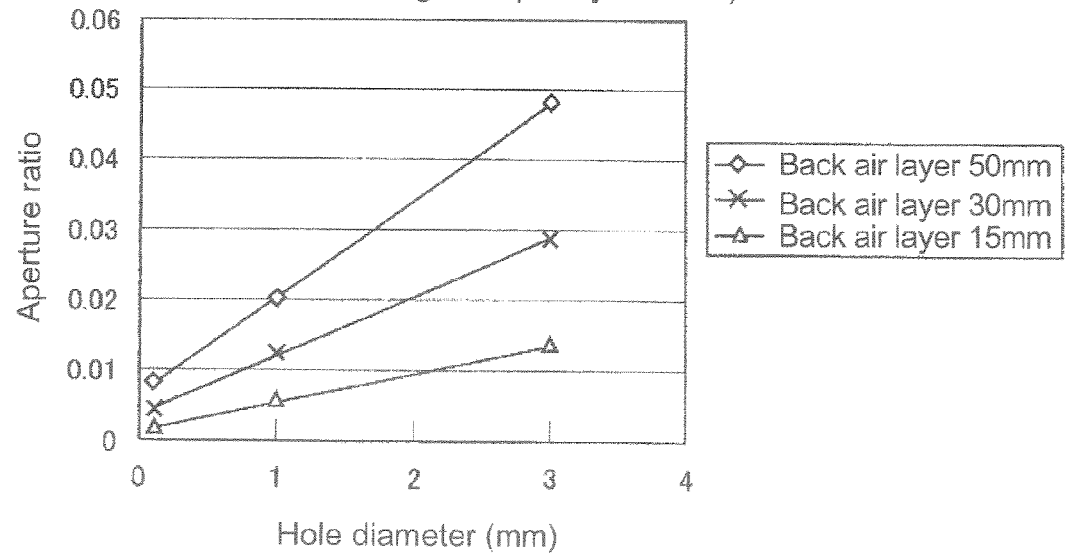
FIG. 34 is a diagram showing the relationship between hole diameter and aperture ratio with a perforated sheet.

Further, rewriting the above provisional formula as:

$$\beta = (f \times 2\pi/c)^2 \times (t+1.6b) \times d \quad \text{[math 4]}$$

the relationship between the hole diameter and aperture ratio may be obtained. The relationship between the hole diameter and the aperture ratio when the target frequency is 1000 Hz or less and the sheet thickness is 0.8 mm is shown in FIG. 33. If the thickness of the back air layer is taken as no more than 30 mm, it can be seen that the target frequency is obtained if the hole diameter is no more than 3 mm and the aperture ratio is no more than 3%. Even when the sheet thickness is 0.4 mm, it can be seen from FIG. 34 that roughly the same conclusion is obtained.

The above shows that, assuming that the target frequency is no more than 1000 Hz under the hood inner panel sound absorption condition, hole diameter of no more than 3 mm and aperture ratio of no more than 3% are necessarily derived by the above provisional expression. Also, with a hole diameter of no more than 1 mm, as is a known fact, the viscous resistance in the holes is increased, resulting in high sound absorption performance being obtained. Thus, this pedestrian protective sound absorption hood has considerable technical value in that both pedestrian protection and sound absorption can be achieved.

It is already known that a double perforated sheet structure wherein the thickness of the back air layer changes has a wide band sound absorption property. Accordingly, we conducted an analysis of the characteristic values of the sound field assuming an inner panel thickness of 0.8 mm and reinforcing inner panel thickness of 0.3 mm.

First of all, since accurate modeling with the circular holes causes the size of the analysis model to become too large, the holes were replaced with slit structures to make it two-dimensional model. The provisional expression for the slit sound absorption structures was:

$$f = c/2\pi \times \sqrt{(\beta/h(LO+LE))} \quad \text{[math 5]}$$

where f is the frequency, c is the speed of sound, and $\beta$ is the aperture ratio (=b/L), LO is the sheet thickness, b is the slit width, L is the slit length, h is the thickness of the back air layer and $LE = 0.564 \cdot b \cdot \log e(4L/b)$.

Figure 35:
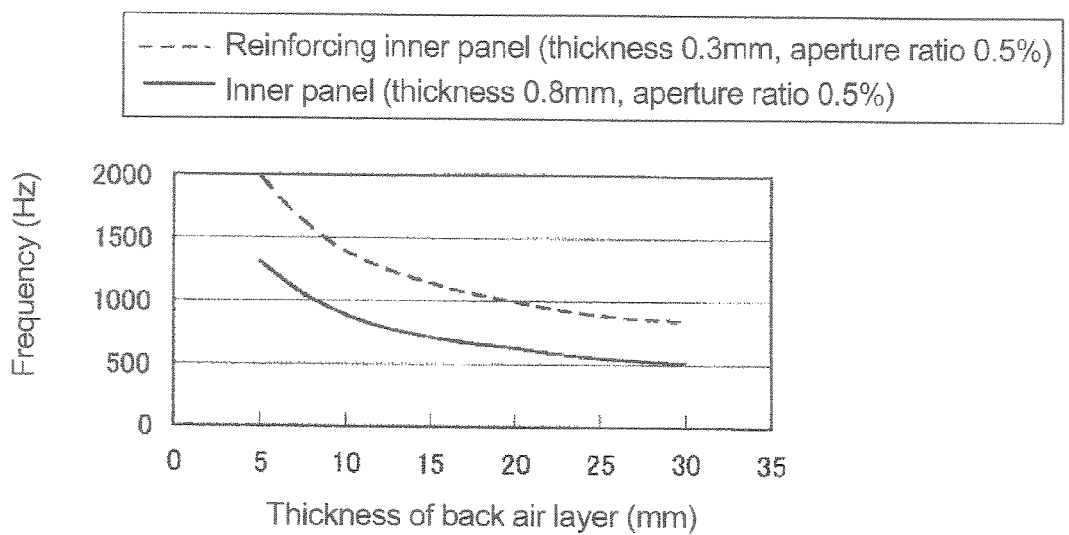
FIG. 35 is a diagram showing the relationship between the back air layer and the frequency for a perforated sheet.
Figure 36:
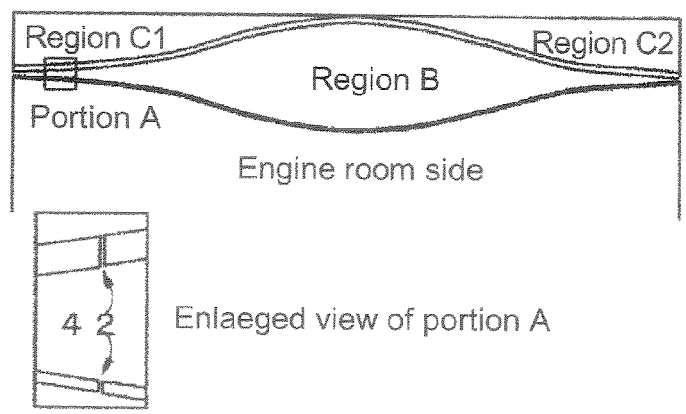
FIG. 36 is a view showing a sound field characteristic value analysis model (two dimensional slit model) in a double corrugated vehicle body panel structure.

In this case, the inner panel sheet thickness was taken as 0.8 mm, the aperture ratio as 0.5%, the slit width as 005 mm and the slit length as 100 mm; the reinforcing inner panel sheet thickness was taken as 0.3 mm, its aperture ratio as 0.5%, Slit width as 0.05 mm thick and slit length as 100 mm. The wave height was taken as 15 mm in the case of both the inner panel and reinforcing inner panel. The relationship between the back air layer and the frequency in this case is shown in FIG. 35 and the analysis model is shown in FIG. 36. The regions enclosed by the outer panel and inner panel in the analysis model are taken as the region C1 and the region C2 and the region enclosed by the inner panel and reinforcing inner panel is taken as the region B (see FIG. 36). The slit cross-sectional shape is as shown in the enlarged view of the portion A in the Figure. Slits having a width of 0.05 mm are provided at 10 mm intervals such that the aperture ratio in the inner panel and reinforcing inner panel is 0.5%.

Figure 37:
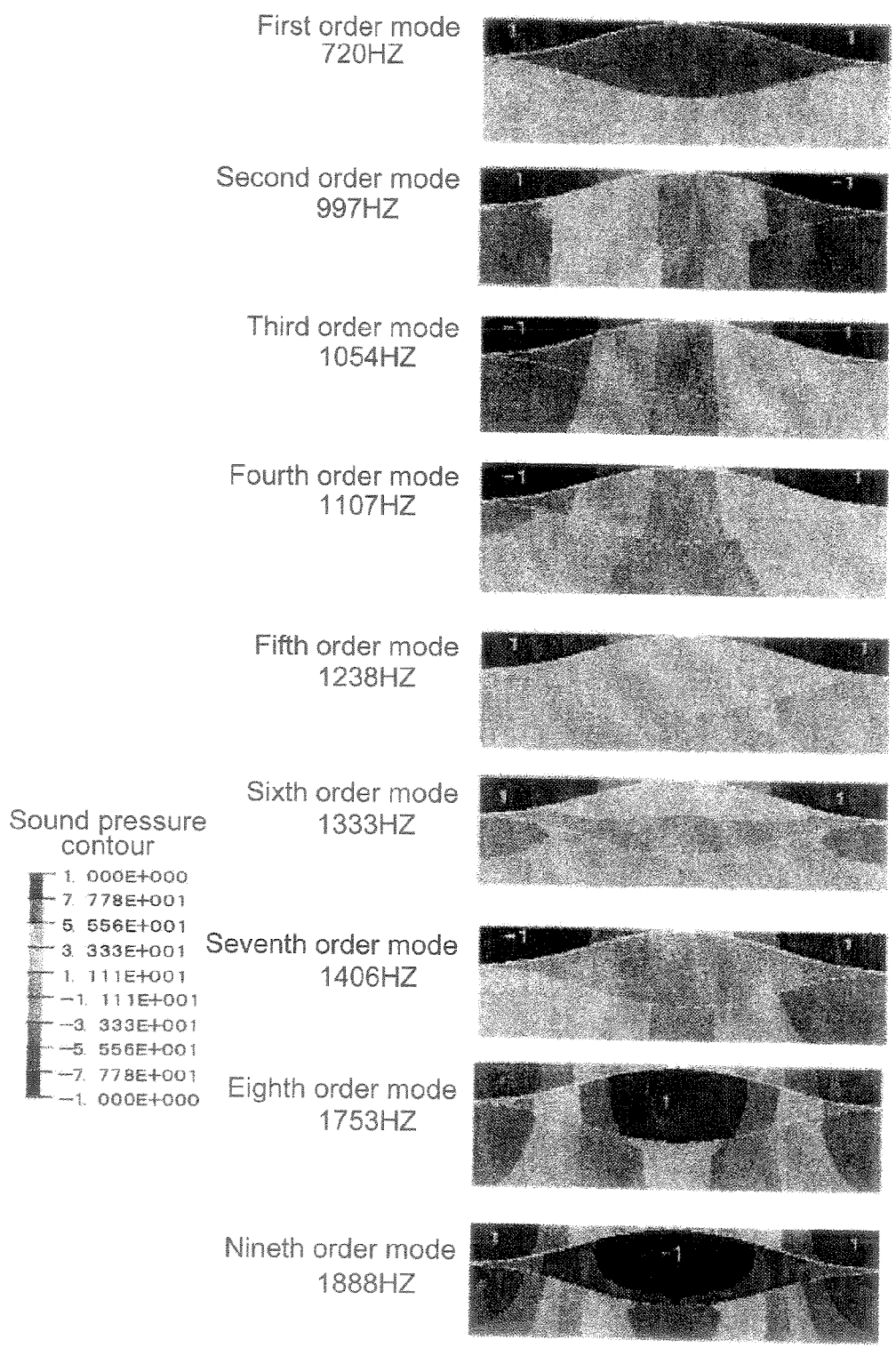
FIG. 37 is a view showing the results of sound field characteristic value analysis in a double corrugated vehicle body panel structure.

FIG. 37 is a view showing the characteristic vibration modes of a sound field in the case where the wavelength is 160 mm, in which a single left/right symmetrical wavelength is modeled. Specifically, FIG. 37 shows the sound pressure distribution chart and the characteristic frequency in the modes from first-order mode to ninth-order mode in a left/right symmetrical single wavelength two-dimensional slit model. In this Figure, the sound pressure is represented by a normalized value distributed in a range of from 1 to −1. In the first-order mode, sound pressure 1.0 is generated in the C1 region and C2 region (numbers marked in the Figure) and the characteristic frequency is 720 Hz. This mode is considered to be a vibration mode produced by the back air layer of the outer panel and inner panel (average value 7.5 mm). In FIG. 35, the characteristic frequency of 720 Hz is obtained in the case that the thickness of the back air layer is 16 mm. It is therefore considered that this mode is a vibration mode at a region in which part of the B region is added to the C1 region and C2 region and the back air layer is 16 mm. Next the characteristic frequency in the second mode is 997 Hz which is the characteristic frequency with a thickness 8.5 mm of the back air layer in the C1 region and C2 region which roughly corresponds to an average value of 7.5 mm, of the back air layer of the outer panel and inner panel. The C1 region has a sound pressure of 1.0, but the C2 region has a sound pressure of −1.0 i.e. the sign is inverted. From third-order mode to seventh-order mode, the vibration modes are roughly similar to the second-order vibration mode. However these are believed to be modes in which the thickness of the back air layer progressively becomes smaller. The eighth-order mode and ninth-order mode are vibration modes produced by the back air layer between the reinforcing inner panel and the inner panel. It can thus be seen that, with a double corrugated structure, not merely does the thickness of the back air layer change, but also complex vibrational modes are generated due to the fact that the air layer comprises two layers.

Figure 38:
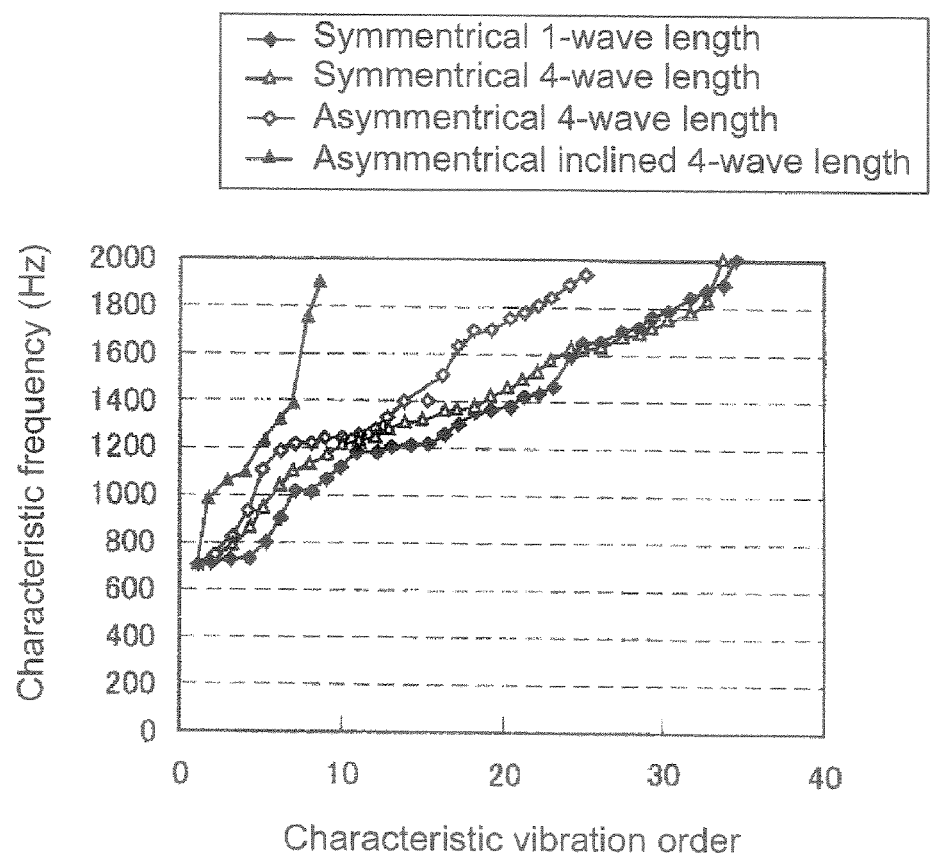
FIG. 38 is a view showing the results of sound field characteristic value analysis in a double corrugated vehicle body panel structure.
Figure 39:
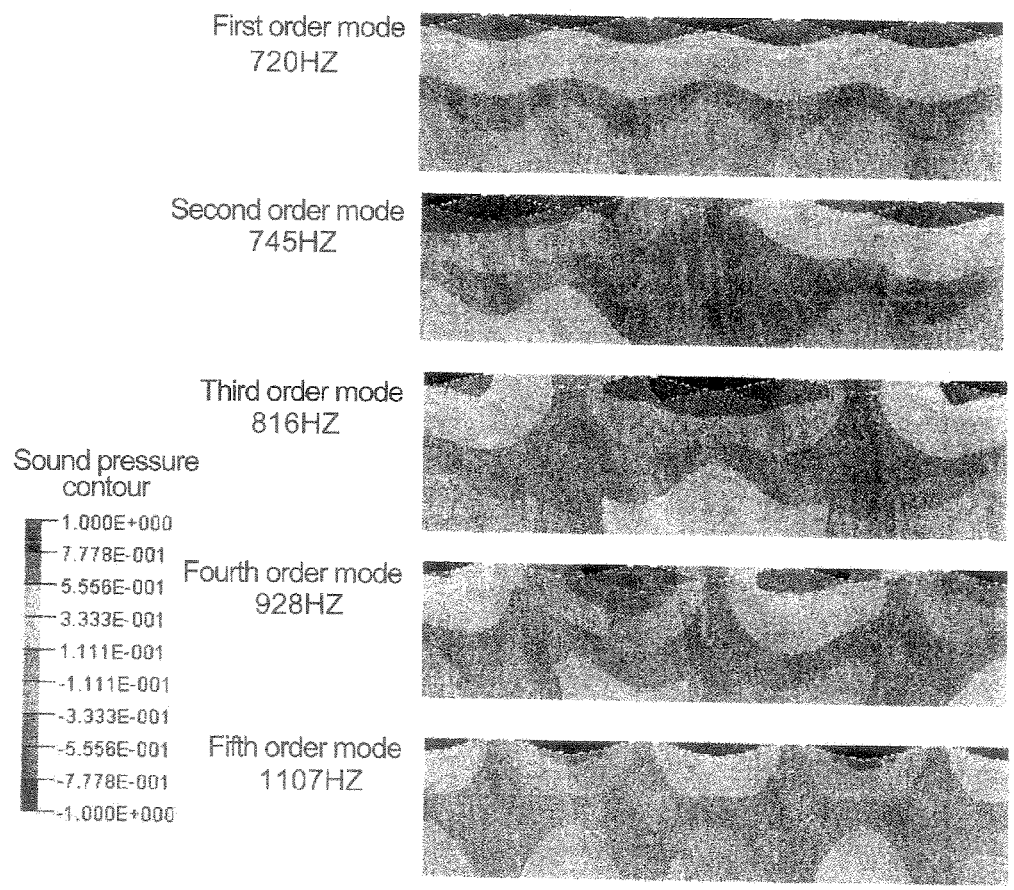
FIG. 39 is a view showing the results of sound field characteristic value analysis in a double corrugated vehicle body panel structure.
Figure 40:
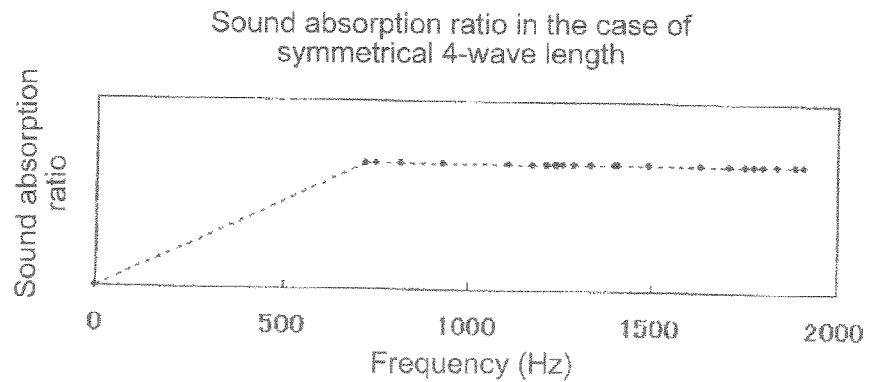
FIG. 40 is a view showing the results of sound field characteristic value analysis in a double corrugated vehicle body panel structure.

Next FIG. 39 shows the analysis results when a left/right symmetrical four-wave waveform is modeled with the same dimensions, and shows the sound pressure distribution and the characteristic frequencies in each mode from first-order mode to fifth-order mode. FIG. 38 shows the relationship between the vibration order and the characteristic frequency. From FIG. 39, the pattern of the vibration modes is similar to the case of a single wave, but more complex vibration modes are produced due to the effect of adjacent waves. As shown in FIG. 38, the number of vibration modes not exceeding 2000 Hz increases from nine modes to 25 modes. Although it is previously known that a wide band sound absorption characteristic is obtained by superimposing two perforated sheets the sound absorption characteristic of the double corrugated hood structure that is here illustrated demonstrates that a flat wide band sound absorption characteristic is achieved for frequencies such as in FIG. 40 as a result of a linking of the peak values of the various vibrational modes. This was not confirmed experimentally, for economic reasons. FIG. 40 shows the wide band sound absorption characteristic that may be anticipated from the left/right symmetrical 4-wavelength second-order slit model.

Figure 41:
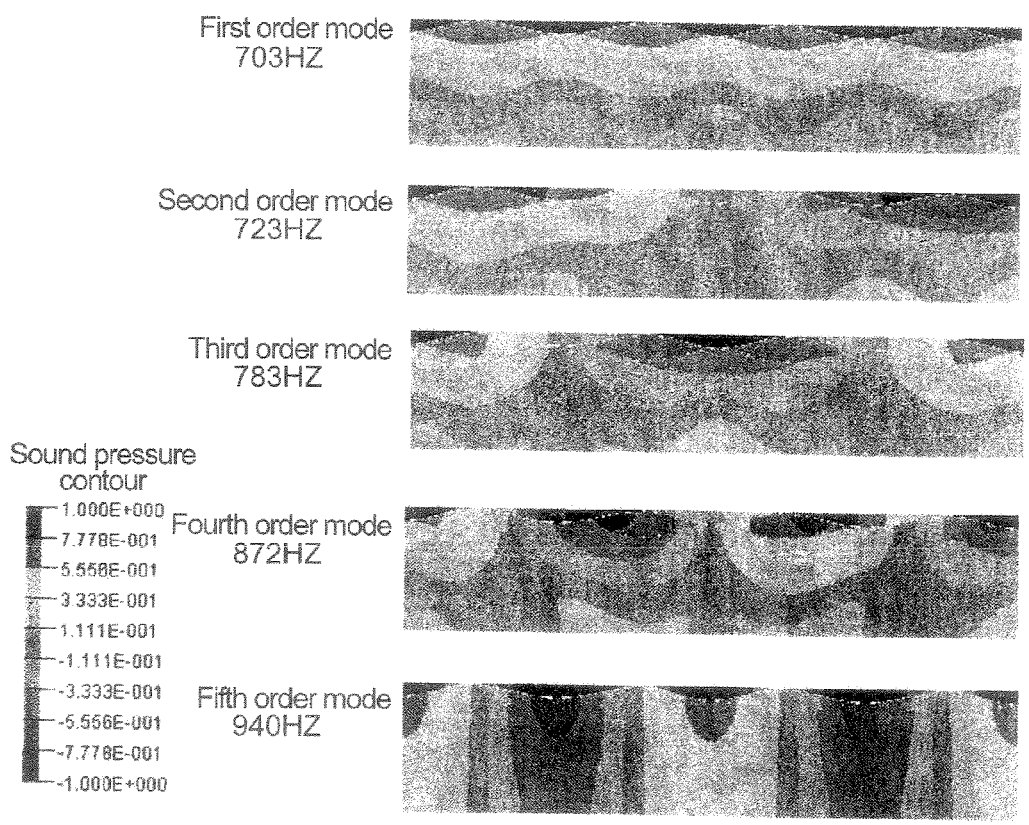
FIG. 41 is a view showing the results of sound field characteristic value analysis in a double corrugated vehicle body panel structure.

The effect of asymmetry in regard to wavelength of the corrugations was investigated. The cross-sectional shape of single pitch 160 mm in FIG. 38 was replaced by a corrugated shape of half pitch 100 mm and half pitch 80 mm and the same analysis was conducted. The analysis results are shown in FIG. 41 and FIG. 38 also shows the relationship between order of vibration and characteristic frequency. FIG. 41 shows the sound pressure distribution and characteristic frequency in each mode from first-order mode to fifth-order mode for the case of a left/right asymmetrical four-wavelength second-order slit model. As understood from FIG. 41 the vibration modes are similar to those of FIG. 39, but the characteristic frequencies are shifted to the low-frequency side. The number of orders of characteristic vibration not exceeding 2000 Hz is increased to 33 as understood from FIG. 38. This is due to increase of the region constituted by the C1 region, C2 region and B region caused by some increase in wavelength, but it is thought that a further reason is that the vibration modes become more complex due to the corrugated shape being asymmetrical. As a result, the vibration modes are densely clustered in a frequency range not exceeding 2000 Hz and it may be said that this results in wide bandwidth sound absorption performance.

Figure 42:
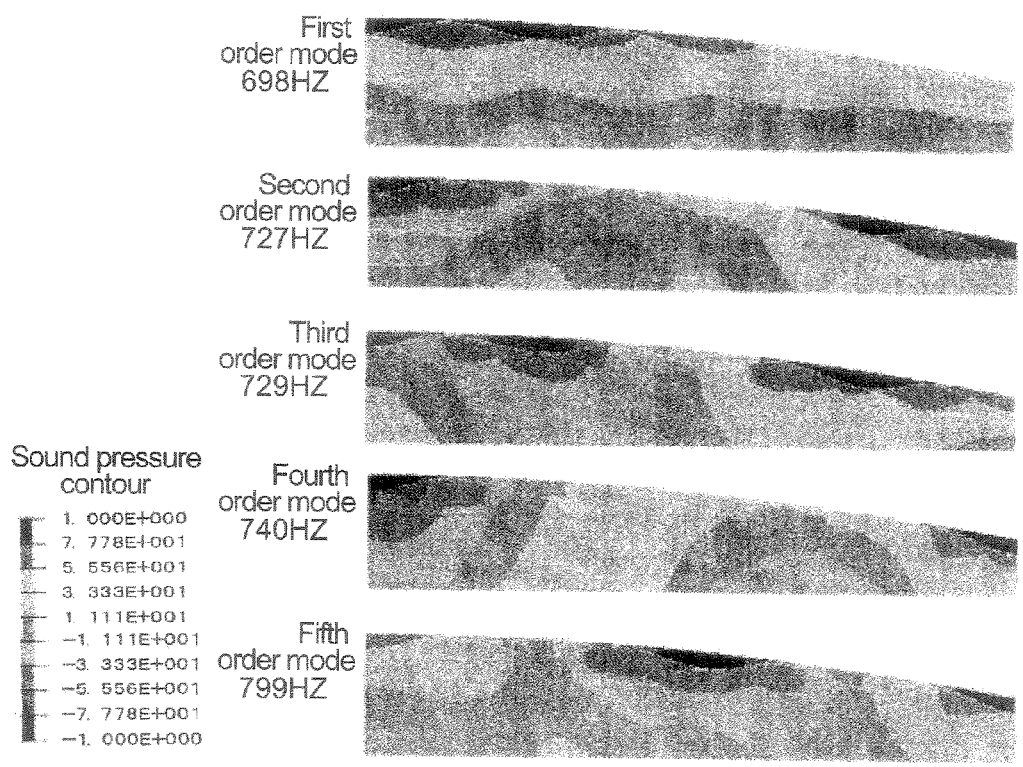
FIG. 42 is a view showing the results of sound field characteristic value analysis in a double corrugated vehicle body panel structure.

The effect of inclination of the curved surface in the vehicle width direction considering the shape of the hood was investigated. The analysis results are shown in FIG. 42 and the relationship of the order of vibration and characteristic frequency is shown in FIG. 38. Specifically, FIG. 42 shows the sound pressure distribution and characteristic frequency for each mode from first-order mode to fifth-order mode in a four-wave length second-order slit model inclined in left/right asymmetrical fashion. In this case, the clearance between the outer panel and inner panel was 3 mm and the clearance between the inner panel and reinforcing inner panel was 0.3 mm. From FIG. 42, it can be seen that the vibration modes become more complex due to increased complexity of the shape and, in addition, the characteristic frequencies are shifted to the low frequency side. The reasons for the shift in characteristic frequencies to the low-frequency side are linkage of adjacent waves due to the clearance between the outer and inner panels and concomitant increase in the closed space region. In general in a sound absorption structure vibrations on the low frequency side are more difficult to suppress. So, this feature of shifting of the characteristic frequencies to the low-frequency side may be said to be highly advantageous in terms of the sound absorption required for the hood. It should be noted that wide-band sound absorption performance may be said to be obtained, with the number of characteristic vibration orders not exceeding 2000 Hz being 34.

From the above, it may be said that a suitable basic structure of a pedestrian protective sound absorption hood is one in which the vibration modes of the sound field are complex, making it possible to realize wide band sound absorption performance by increasing as far as possible the number of characteristic vibration modes not exceeding 2000 Hz, and such a shape should also achieve good pedestrian protection performance. Specifically, the design concepts in regard to a double corrugated hood structure may be considered to be as follows.

The cross-sectional shape left and right in a single wavelength should be asymmetrical in order to achieve complexity of the vibration modes of the sound field. Specifically, this means that the corrugated shape in a single wavelength should be left-right asymmetrical (see FIG. 41) and not only the wavelength but also the wave height should be asymmetrical. In this way, complexity of the characteristic vibrational modes of the sound field is achieved. Complexity of the vibration modes of the sound field can also be achieved by changing the wavelength of adjacent corrugations or by making the cross-sectional shape of the corrugations non-uniform in the vehicle body longitudinal direction of the hood. Complexity of the characteristic vibration modes of the sound field can also be achieved in a substantially corrugated shape of the inner panel cross section by making the wavelength or wave height of the inner panel and reinforcing inner panel nonuniform in the vehicle width direction or vehicle body longitudinal direction.

Figure 43:
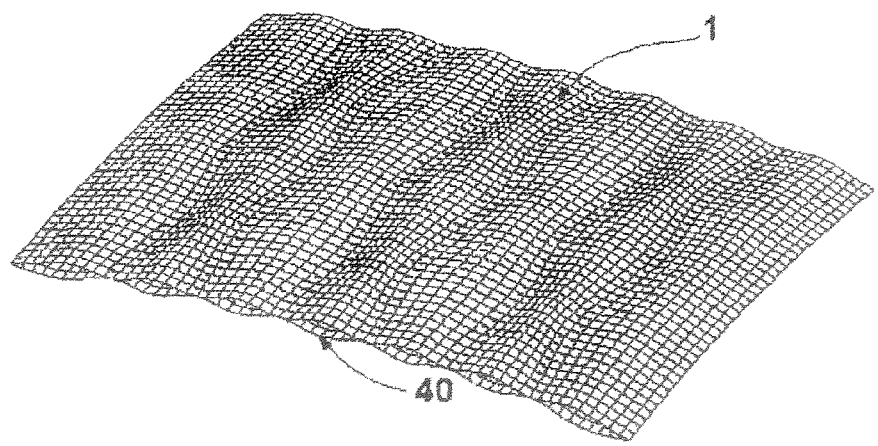
FIG. 43 is a view showing the three-dimensional shape of an inner panel and reinforcing inner panel of a double corrugated vehicle body panel structure.
Figure 44:
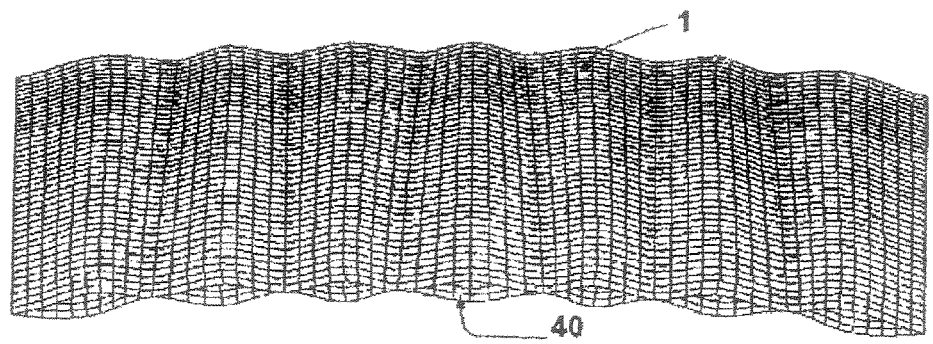
FIG. 44 is a view showing the three-dimensional shape of an inner panel and reinforcing inner panel of a double corrugated vehicle body panel structure.
Figure 45:
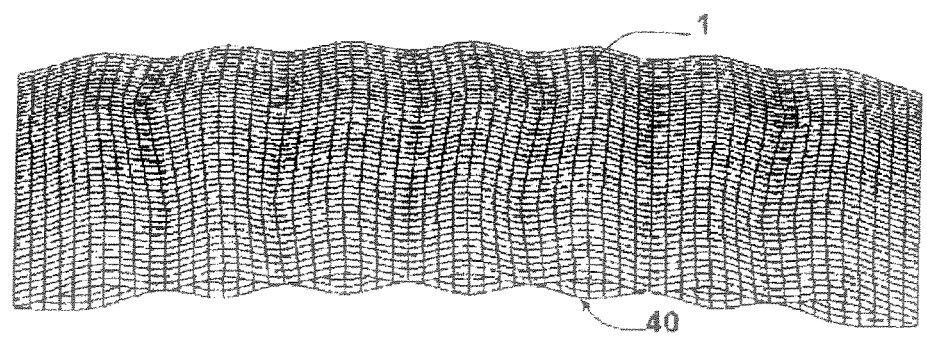
FIG. 45 is a view showing the three-dimensional shape of an inner panel and reinforcing inner panel of a double corrugated vehicle body panel structure.
Figure 46:
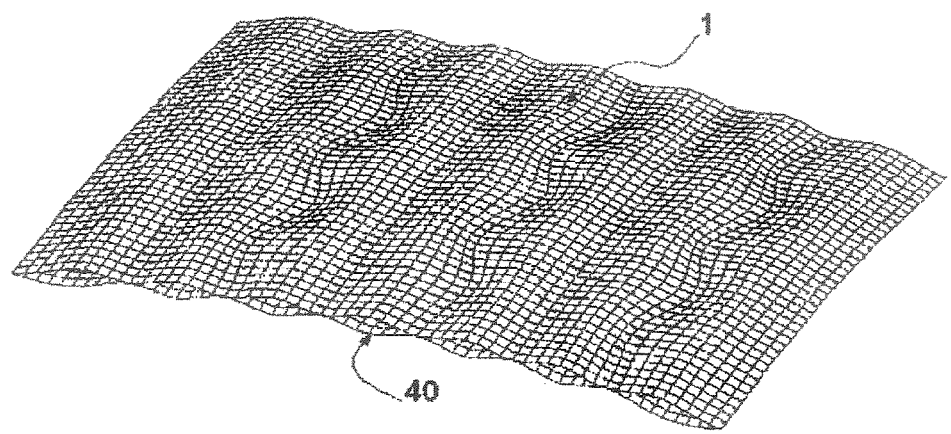
FIG. 46 is a view showing the three-dimensional shape of an inner panel and reinforcing inner panel of a double corrugated vehicle body panel structure.

Such embodiments are shown in FIG. 43 to FIG. 45. FIG. 43 is a view showing an embodiment in which the wavelength of adjacent corrugations is varied, and shows an embodiment in the case where the wavelength is non-uniform in the vehicle width direction and in the vehicle body longitudinal direction. FIG. 44 shows an embodiment in which the cross-sectional shape of the corrugations is made non-uniform in the vehicle body longitudinal direction of the hood. Also, FIG. 45 and FIG. 46 show an example in which respectively the wavelength or wave height is made non-uniform in the vehicle width direction or vehicle body longitudinal direction.

In these embodiments, preferably the outer panel and inner panel are flexibly coupled by an adhesive section arranged in zigzag fashion. This is because, if the coupling is a rigid coupling, rattling vibration of the outer panel and inner panel is suppressed, increasing the secondary wave acceleration and increasing the HIC value. Usually the clearance between the inner panel and outer panel should be from 1 mm to 10 mm, preferably from roughly 2 mm to 5 mm. From the point of view of pedestrian protection, it is preferable that the clearance should be small. This is because, if the time point of generation of the first acceleration wave, that is generated in the event of a head impact, is brought forward, the same benefit is obtained as that of increasing the clearance from the outer panel to the rigid body surface, making it possible to reduce the speed of impact with the rigid body surface.

On the other hand, from the point of view of sound absorption, larger clearance between the outer panel and the inner panel is best. This facilitates movement of air between adjacent wavelengths, resulting in the appearance of low order frequency modes in the characteristic vibrational modes of the sound field and increased complexity of the vibrational modes. As a result, the frequency range that can be absorbed is made wider, increasing the order of the vibrational modes not exceeding 2000 Hz, which is the target, and so improving sound absorption performance. Thus, since the pedestrian protective effect and the sound absorption performance are in an opposing relationship with regard to the clearance between the outer panel and inner panel, it is necessary to select the value of the clearance carefully.

Figure 47:
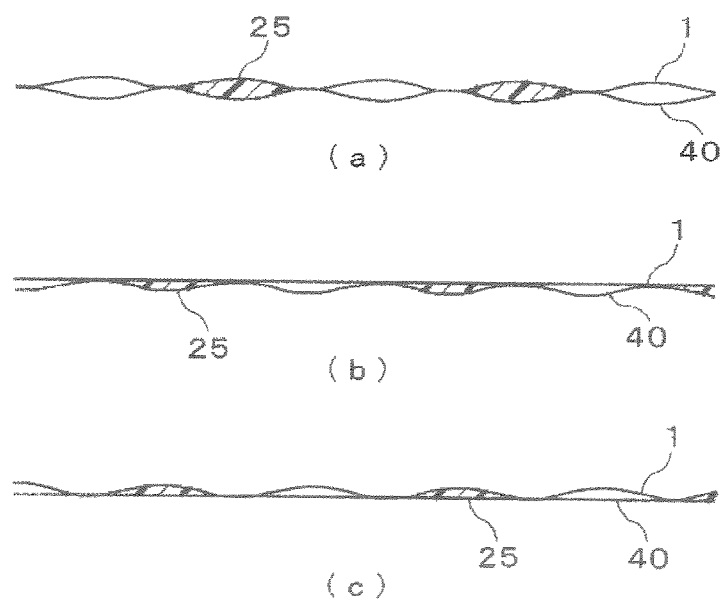
FIG. 47 is a diagram showing the joining condition of an inner panel and reinforcing inner panel.

Preferably the inner panel and reinforcing inner panel are coupled by resin adhesive or mechanical coupling such as bolts or rivets. From the point of view of pedestrian protection, preferably the inner panel and reinforcing inner panel are rigidly coupled at a contact portion. This is because the amount of energy absorption by ensuring that the impact load that is transmitted to the reinforcing inner panel from the inner panel is absorbed by the entire reinforcing inner panel so that the amount of energy absorption is increased and impact of the head with the rigid body surface is avoided. However, with regard to the sound field characteristic vibration modes of the air layer, an arrangement where the adjacent back air layer between the inner panel and reinforcing inner panel is not closed offers better sound absorption performance at each wavelength due to the formation of more complex vibrational modes, than an arrangement in which a closed construction is adopted. Consequently, from the point of view of sound absorption, an ample gap such as to permit passage of air between the inner panel and reinforcing inner panel should preferably be provided. FIG. 47 shows a method of coupling the inner panel and rein forcing inner panel in such a way as to satisfy the conditions of both pedestrian protection and sound absorption.

FIG. 47 is a view seen from the direction orthogonal to the vehicle body longitudinal direction of the corrugated inner panel. Small concavities/convexities of substantially corrugated shape of wave height about 1 mm to 10 mm are provided in the perpendicular direction. The concavities/convexities are provided on the inner panel and reinforcing inner panel (a), are provided on the reinforcing inner panel (b) and are provided on the inner panel (c) respectively. In the Figure, the portion indicated by the reference symbol 25 is the adhesive section. It is necessary to ensure an ample adhesion area in the vehicle width direction. The adhesive used may be a resin adhesive, but an adhesive of high rigidity and high adhesive strength capable of firmly coupling the inner panel and reinforcing inner panel is preferable. Secure reinforcement may be achieved by combining this with for example riveting or spot welding.

Figure 48:
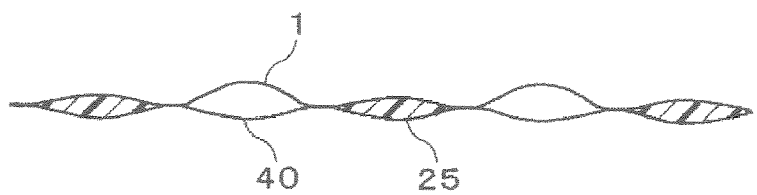
FIG. 48 is a diagram showing the joining condition of an inner panel and reinforcing inner panel.

In order to facilitate the flow of air between adjacent corrugations, preferably, as in FIG. 48, air passage holes are provided in the vehicle width direction by locally increasing the wave height. In this way, low frequency vibrational modes are generated spanning adjacent wavelengths, making it possible to achieve increased complexity of the vibrational modes of the sound field.

The shape of the holes of the perforated sheets is usually circular, but for example slit shaped, rectangular shaped, triangular, star-shaped or polygonal shaped holes could be employed. The Helmholtz resonance principle can be applied to such shapes also. Regarding the above sound absorption structures, satisfactory pedestrian protection performance needs to be confirmed. However, the range of suitability of wavelength and wave height in regard to pedestrian protection is extremely wide, so sound absorption performance is easily satisfied. As has been described above, with a vehicle body panel structure according to the present invention, a pedestrian protective structure can be provided that satisfies sound absorption performance, by means of a double corrugated hood structure having an outer panel and an inner panel arranged on the inside face of this outer panel, and a reinforcing inner panel further arranged on the inside face of this inner panel.

Figure 53:
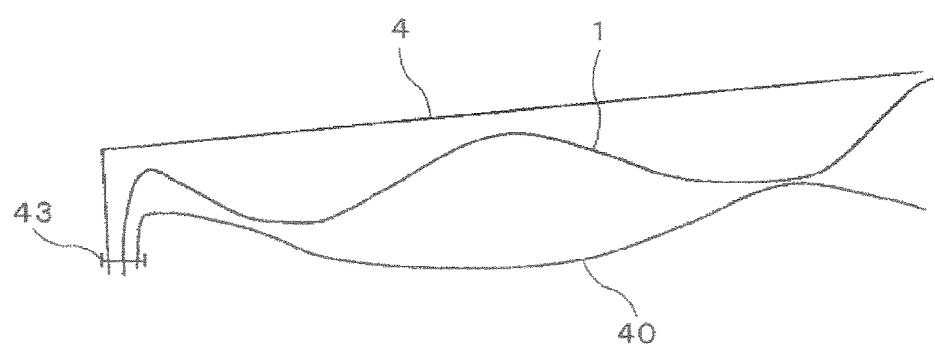
FIG. 53 is a view showing the condition in which an outer panel, inner panel and reinforcing inner panel of a double corrugated vehicle body panel structure are joined by means of for example rivets.

By the way, a perforated sheet is unsuitable for painting since the paint fills up the holes when painting is performed. Normal hood painting is performed by a method known as dipping, in which the outer panel and inner panel are assembled into a unit and, in this condition, introduced into a container filled with paint. In the case of a soundproof hood, such a method cannot be adopted. A method is necessary in which the outer panel is separately painted and the inner panel and reinforcing inner panel then assembled. In this case the method of joining of the outer panel and inner panel that was conventionally employed using hem bending is inappropriate for a sound absorption hood. In the case of certain hoods, the technique was adopted of joining the inner panel and outer panel by bending the outer peripheral section of the outer panel by about 90°. In the case of a sound absorption hood, as shown in FIG. 53, it is necessary to employ a mechanical method of joining in a form including the reinforcing inner panel by for example using rivets 43. In FIG. 53 the outer panel 4, inner panel 1 and reinforcing inner panel 40 are joined by means of rivets 43.

Figure 49:
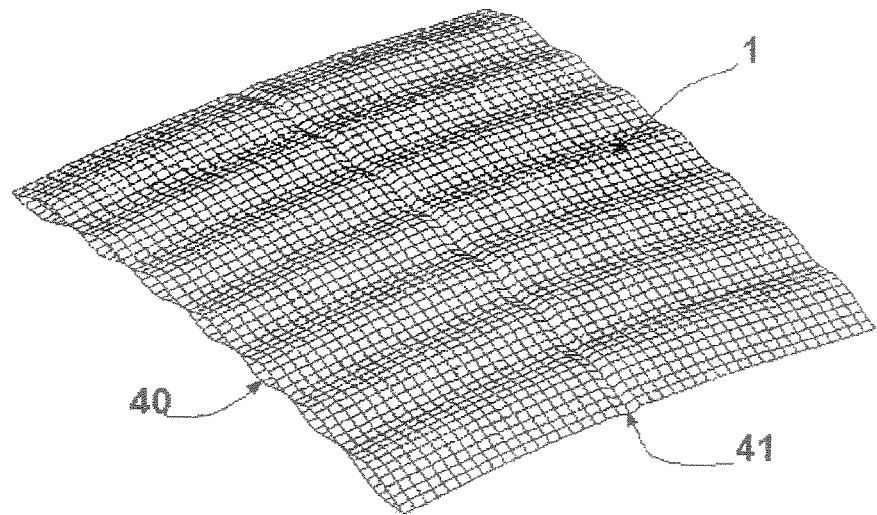
FIG. 49 is a diagram of a crash bead of a double corrugated vehicle body panel structure.

In the case of a vehicle body hood of for example an automobile, typically a crash bead is provided to ensure safety of the driver in the event of a head-on impact of the vehicle body. By means of this crash bead, the hood folds in the middle of the hoods thereby making it possible to avoid the phenomenon of so-called guillotining of the driver. FIG. 49 is a diagram showing a crash bead in a double corrugated hood structure. In FIG. 49, a crash bead is applied to the inner panel and reinforcing inner panel with the exception of the outer peripheral section of the hood.

If the crash bead is too deep, the bead width becomes too large and rigidity of the hood inner panel in the longitudinal direction of the vehicle body is lowered, lowering the pedestrian protective performance. A suitable depth and bead width are therefore determined by analysis and testing etc.

In general, the bead width may be determined taking the bead depth as about 10 mm, based on a multi-cone structure in which a closed cross-section structure is adopted in the same way as in the present hood structure. A crash bead is provided for the reinforcing inner panel in the same way as with the inner panel, but, taking into account the deformation mode in the case of a head-on impact, preferably the bead has a shape that is recessed vertically downwards in the same way as the inner panel.

In order to improve pedestrian protection performance, in a double corrugated hood structures preferably the outer panel is made of steel and the inner panel and reinforcing inner panel are made of aluminum. According to Okamoto (Concept of hood design for possible reduction in head injury, 14th ESV Conferences 1994), it has been discovered that, for an ideal head acceleration waveform, if the first-wave acceleration is about 200 G, the HIC value is about 1000.

Figure 50:
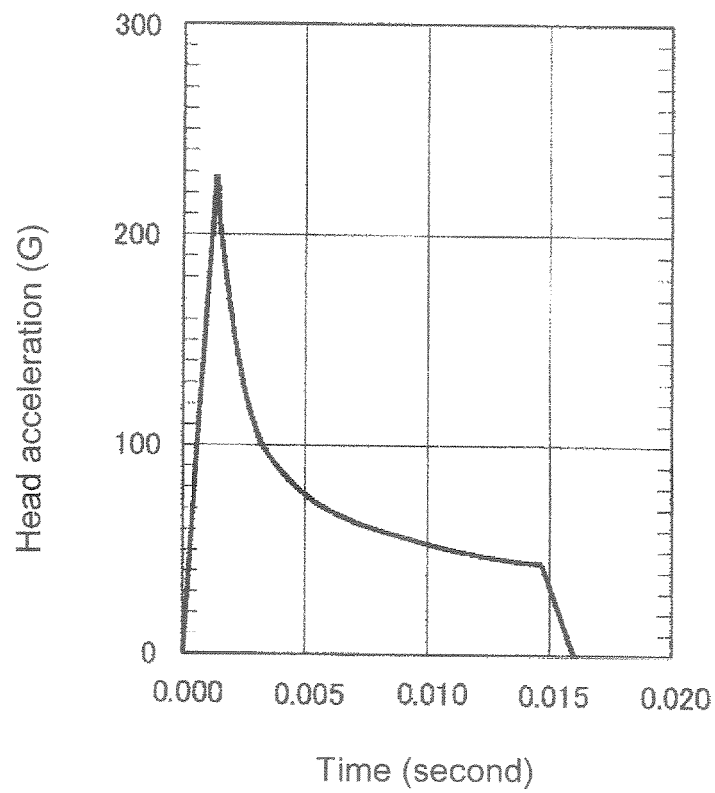
FIG. 50 is a diagram showing a head acceleration waveform for suppressing the HIC value to no more than 1000.

An ideal acceleration waveform is shown in FIG. 50. In FIG. 50, by making the outer panel of steel sheet, the outer panel weight is increased, with the result that the magnitude of the first acceleration wave in the event of a head impact is increased. By making this magnitude about 200 G, the head impact energy is dissipated, decreasing the second acceleration wave. As a result, an ideal acceleration waveform is obtained, making it possible to suppress the HIC value to no more than 1000. Incidentally, the outer panel sheet thickness in the case of steel sheet is about 0.7 mm. The present inventors have already shown, in Laid-open Japanese Patent Application No. 2003-205866 that this method is applicable to a conventional corrugated hood. It can likewise be applied to a double corrugated hood structure, since this is a similar structure.

It is also desirable, in order to improve pedestrian protection performance, that a metal sheet made of for example steel, aluminum or lead should be stuck onto the undersurface of the outer panel in a double corrugated hood structure. The second-wave acceleration can be lowered and the HIC value suppressed to a value of 1000 or less by increasing the local weight of the outer panel and so increasing the magnitude of the first acceleration wave in the event of a head impact to make this about 200 G. Detailed conditions such as the type of metal sheet, location of arrangement number of sheets and the thickness thereof were thoroughly studied. Although the present inventors indicated in Japanese Patent Application No. 2002-239976 that this method could be applied to a conventional corrugated hood structure, it can likewise be applied to a double corrugated hood structure, since this is a similar structure.

Figure 51:
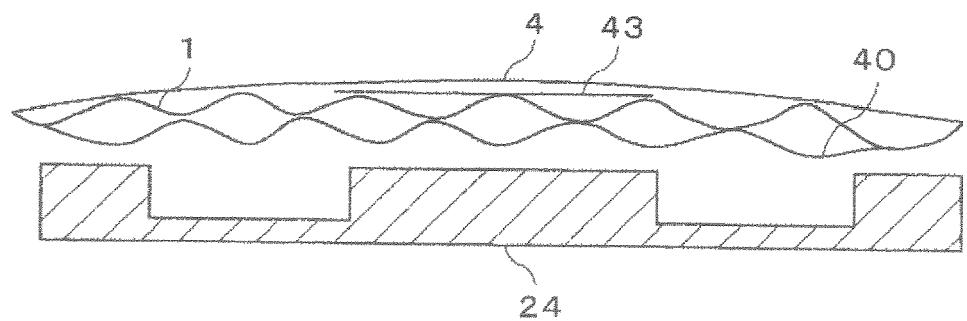
FIG. 51 is a diagram of the case where a reinforcing panel is mounted on the undersurface of the outer panel of a double corrugated vehicle body panel structure.
Figure 52:
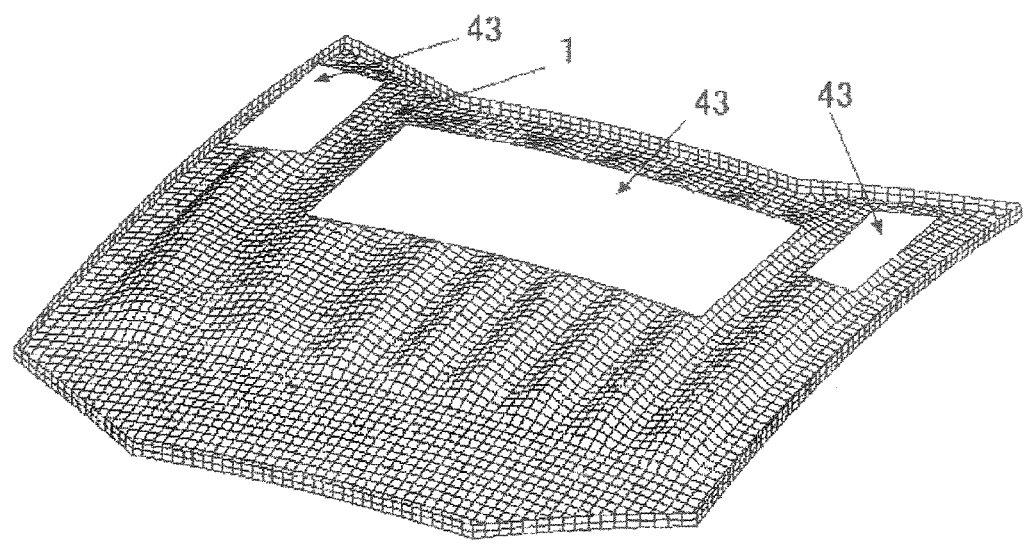
FIG. 52 is a diagram showing eight reinforcing panels mounted on the undersurface of the outer panel of a double corrugated vehicle body panel structure.

Such an embodiment is shown in FIG. 51 and FIG. 52. In FIGS. 51 and 52, a reinforcing sheet is mounted by means of rivets 43 on the driver's seat side of the hood, which is the region where adult head impact takes place. By mounting such a reinforcing sheet, the HIC value in adult head impact, in which the weight of the head is large, is reduced.

Since a double corrugated vehicle body panel structure such as the double corrugated vehicle body hood structure has excellent rigidity and impact-resistance and has sound absorbing property, it can be applied also to vehicle body structures other than the hood. Specifically, application to the roof, doors or trunk lid, for example, may be envisioned. Furthermore, it is applicable to panel structural bodies such as rail vehicle bodies.

Figure 54:
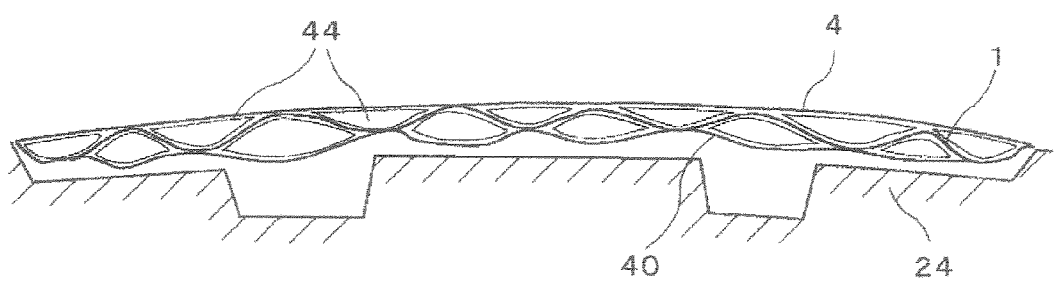
FIG. 54 is a cross-sectional view of a double corrugated vehicle body panel structure in which a bag made of rubber or made of resin is provided for purposes of ensuring sealing of internal pressure in the interior.

By applying a suitable degree of internal pressure in the closed space between the outer panel and inner panel or between the inner panel and reinforcing inner panel, the efficiency of absorption of head impact energy is increased, reducing the second acceleration wave, lowering the HIC value and so improving pedestrian protection performance. An embodiment is shown in FIG. 54. A bag 44 made of rubber or resin shown in FIG. 55 may be independently provided or linked with each corrugation. Also, the magnitude of the internal pressure need not be the same in each case but could be set to a suitable value for each location. A bag 44 made of rubber or made of resin may be employed to ensure sealing solely for the outer panel, inner panel or reinforcing inner panel. In this case, sealing must be maintained at the adhesive sections by for example using adhesive.

Figure 55:
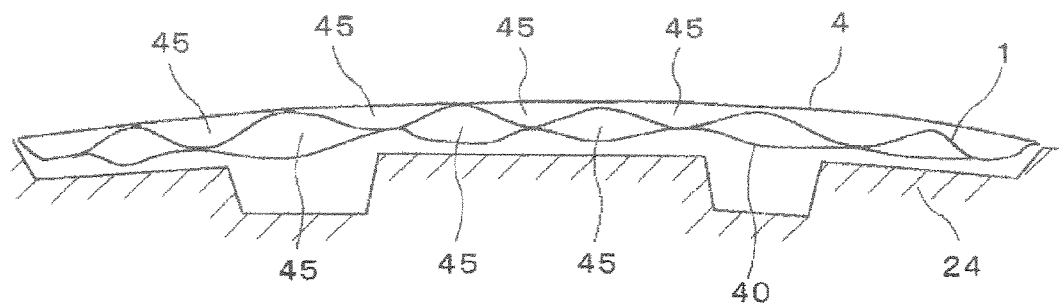
FIG. 55 is a diagram showing a construction in which an energy absorbing member is incorporated in the closed space or an inner panel and reinforcing inner panel.

Pedestrian protection performance may be improved by increasing the head impact energy absorption efficiency by embedding an energy absorbing member made of for example foamed styrol in the closed space between the outer panel and inner panel or in the close space between the inner panel and reinforcing inner panel. An embodiment is shown in FIG. 55. Energy absorbing members 45 made of for example foamed styrol as shown in FIG. 55 may be independently provided or linked for each corrugation.

Figure 57:
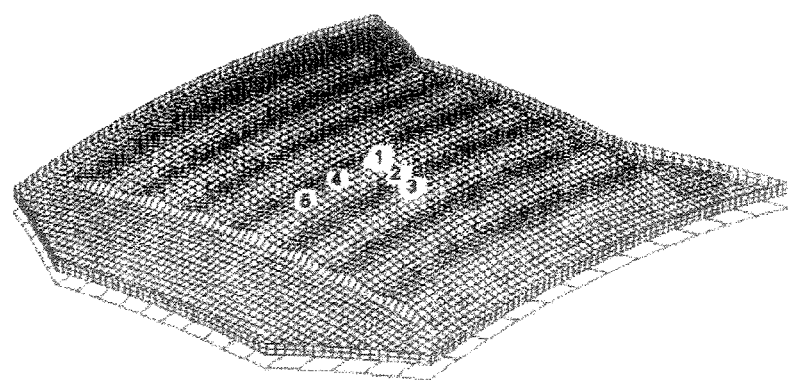
FIG. 57 is a perspective view showing the position of head impact with an inner panel in a construction combining a reinforcing inner panel having a corrugated bead in the vehicle width direction with an inner panel having a corrugated bead in the vehicle body longitudinal direction.
Figure 58:
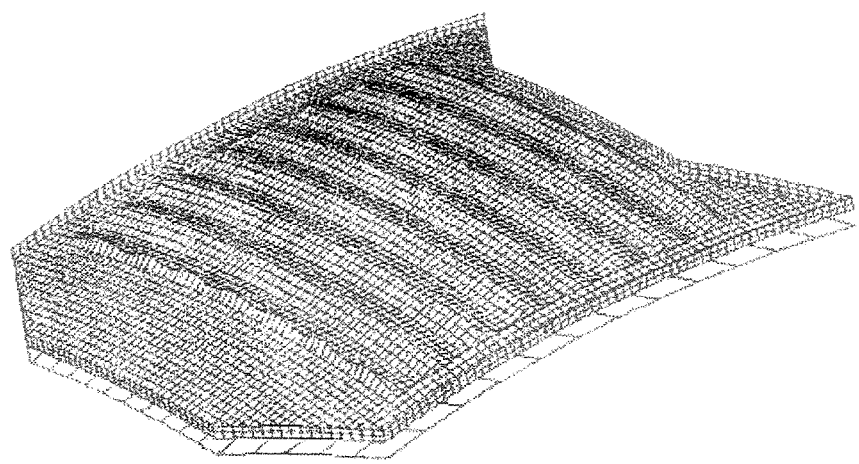
FIG. 58 is a perspective view showing a reinforcing inner panel in a construction combining a reinforcing inner panel having a corrugated bead in the vehicle width direction with an inner panel having a corrugated bead in the vehicle body longitudinal direction.
Figure 59:
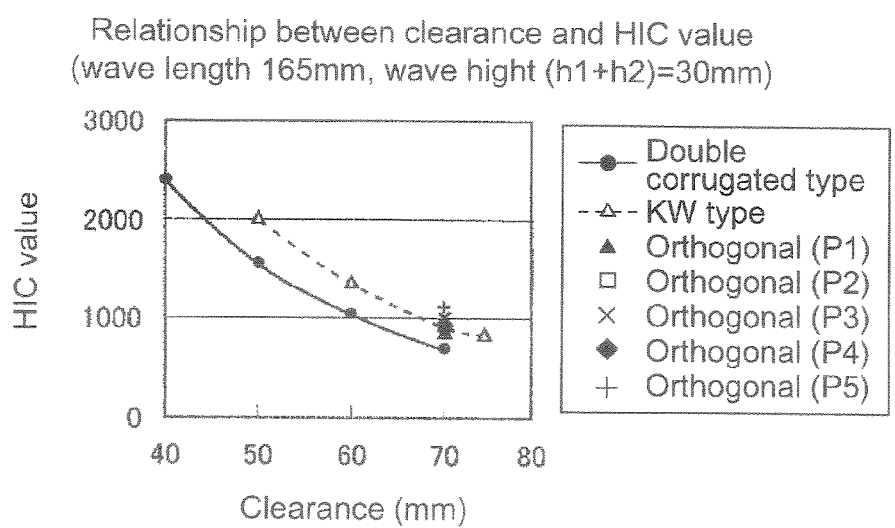
FIG. 59 is a view showing a comparison with the conventional structure of the analysis results within a structure combining a reinforcing inner panel having a corrugated bead in the vehicle width direction with an inner panel having a corrugated bead in the vehicle body longitudinal direction.
Figure 60:
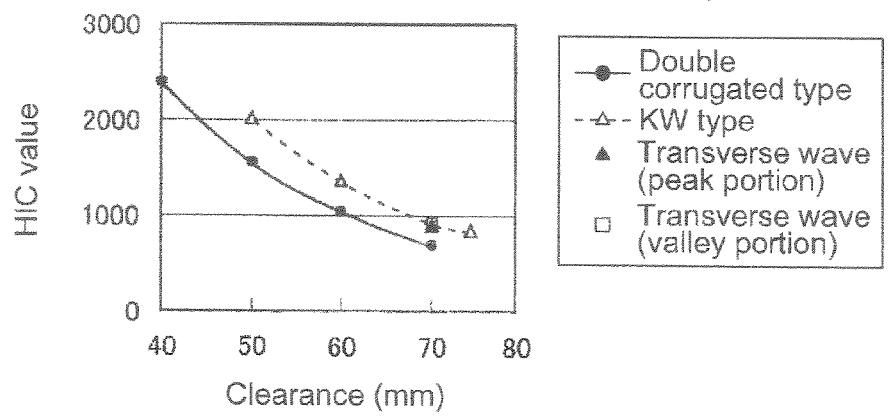
FIG. 60 is a view showing a comparison with the conventional structure of the analysis results with a single-layer corrugated structure having an inner panel provided with a corrugated bead in the vehicle width direction.
Figure 76:
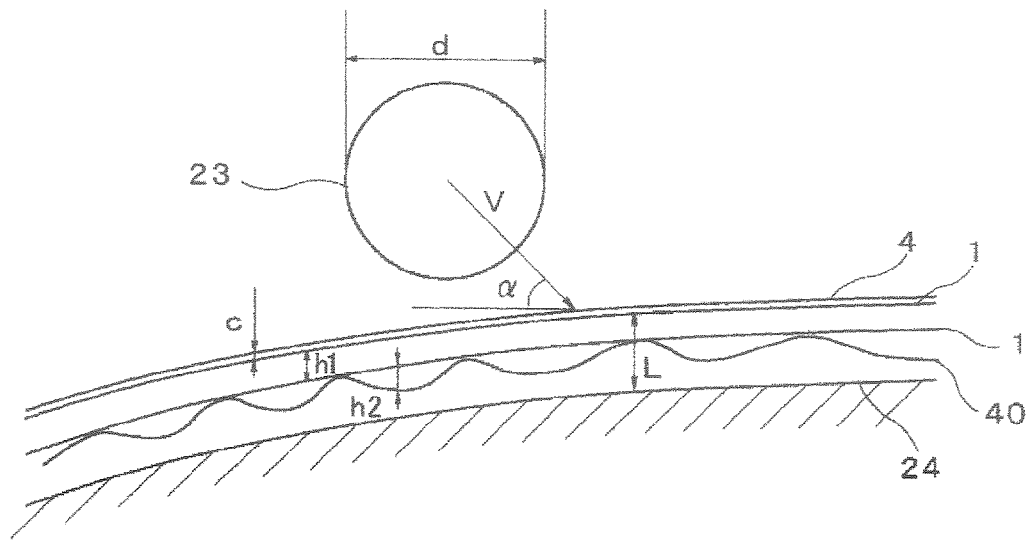
FIG. 76 is a view showing the cross-sectional shape of a double corrugated vehicle body panel structure combining a corrugated bead in the vehicle width direction and a corrugated bead in the vehicle body longitudinal direction.
Figure 77:
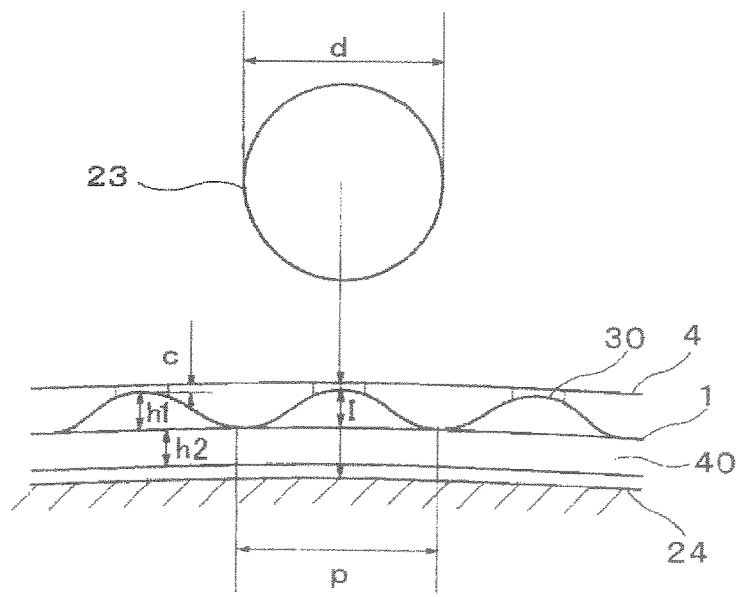
FIG. 77 is a view showing the cross-sectional shape of a double corrugated vehicle body panel structure combining a corrugated bead in the vehicle width direction and a corrugated bead in the vehicle body longitudinal direction.
Figure 78:
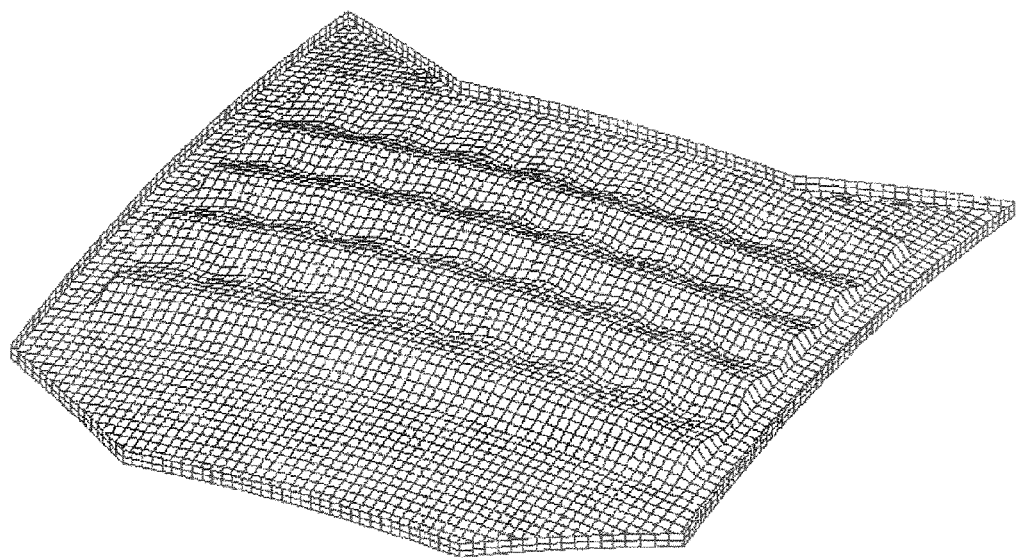
FIG. 78 is a view showing an example of an inner panel of a vehicle body panel structure in which no double intersection takes place in the middle of the vehicle body.
Figure 79:
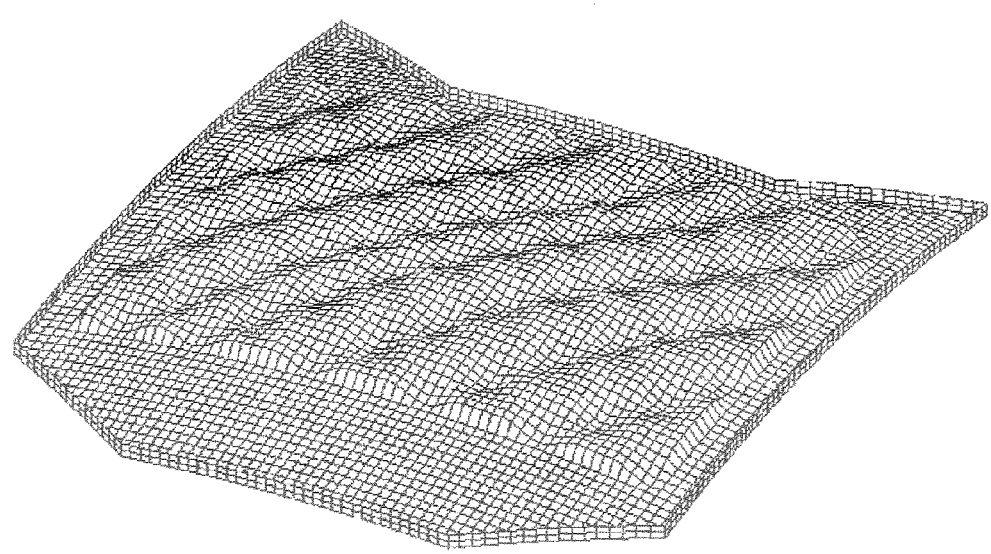
FIG. 79 is a view showing an example of an inner panel of a vehicle body panel structure in which no double intersection takes place in the middle of the vehicle body.
Figure 80:
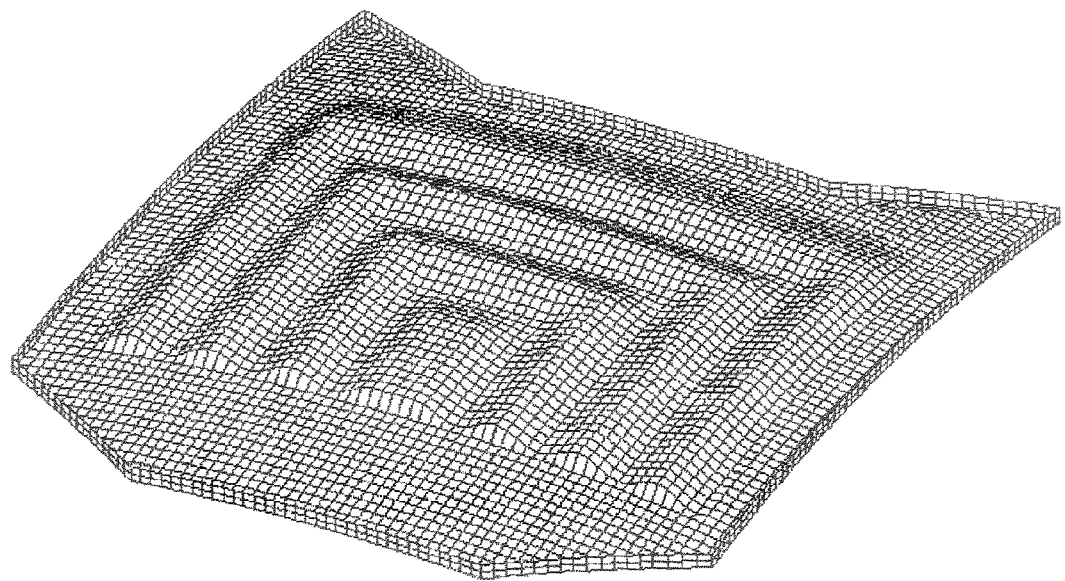
FIG. 80 is a view showing an example of an inner panel of a vehicle body panel structure in which no double intersection takes place in the middle of the vehicle body.
Figure 81:
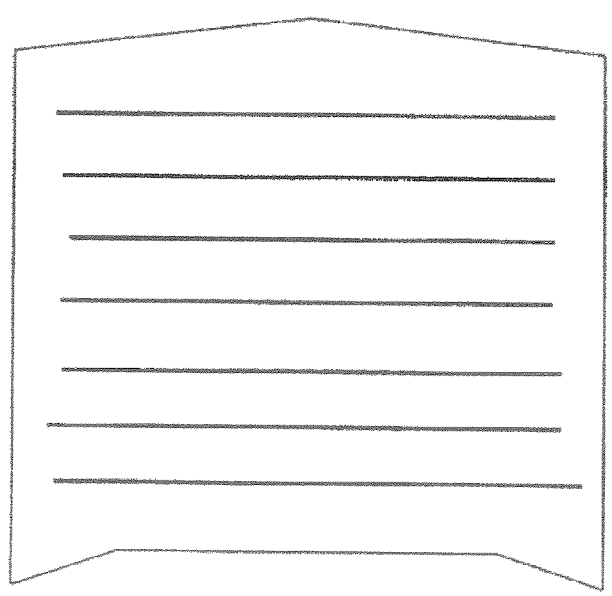
FIG. 81 is a view showing an example of an inner panel of a vehicle body panel structure in which no double intersection takes place in the middle of the vehicle body.
Figure 82:
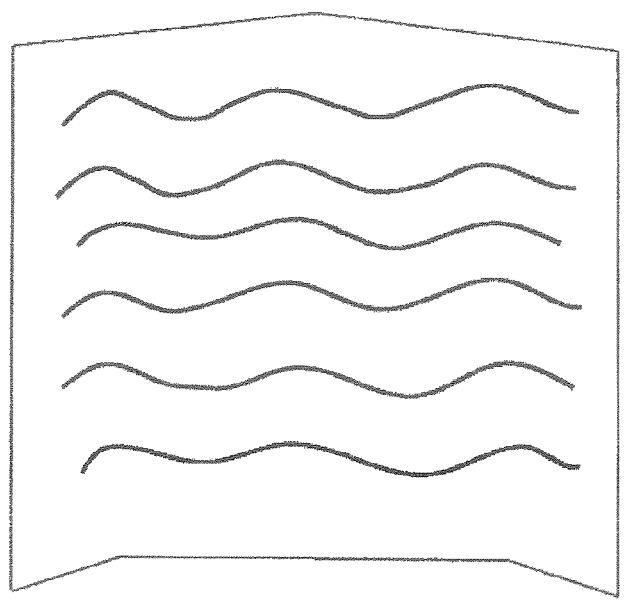
FIG. 82 is a view showing an example of an inner panel of a vehicle body panel structure in which no double intersection takes place in the middle of the vehicle body.
Figure 83:
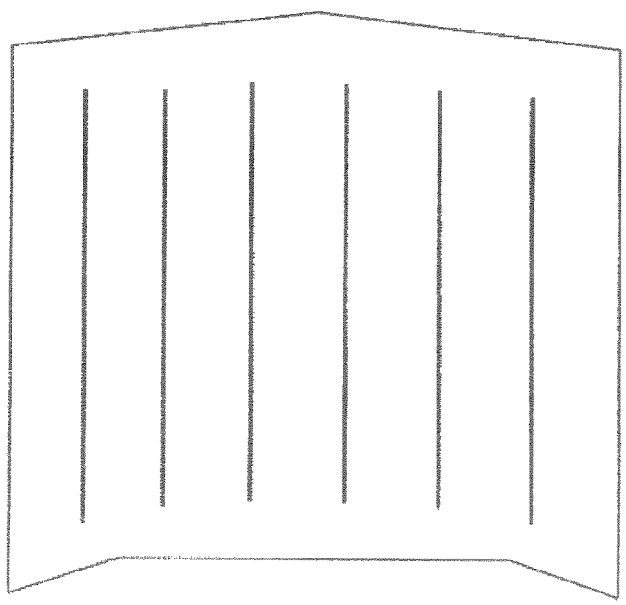
FIG. 83 is a view showing an example of an inner panel of a vehicle body panel structure in which no double intersection takes place in the middle of the vehicle body.
Figure 84:
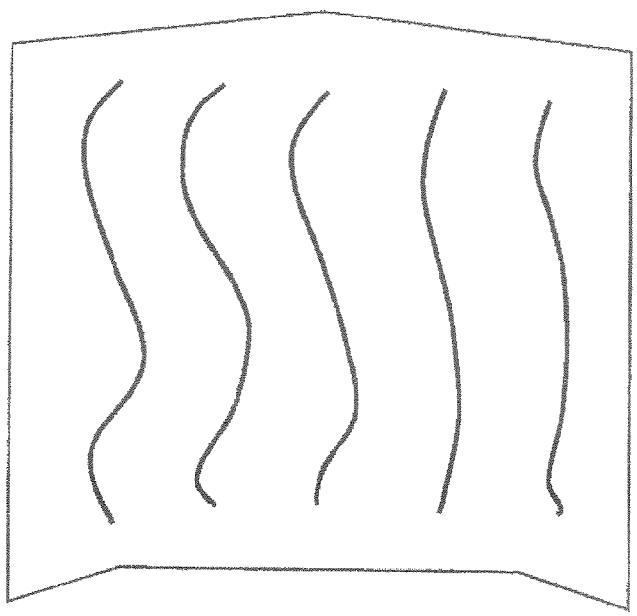
FIG. 84 is a view showing an example of an inner panel of a vehicle body panel structure in which no double intersection takes place in the middle of the vehicle body.
Figure 85:
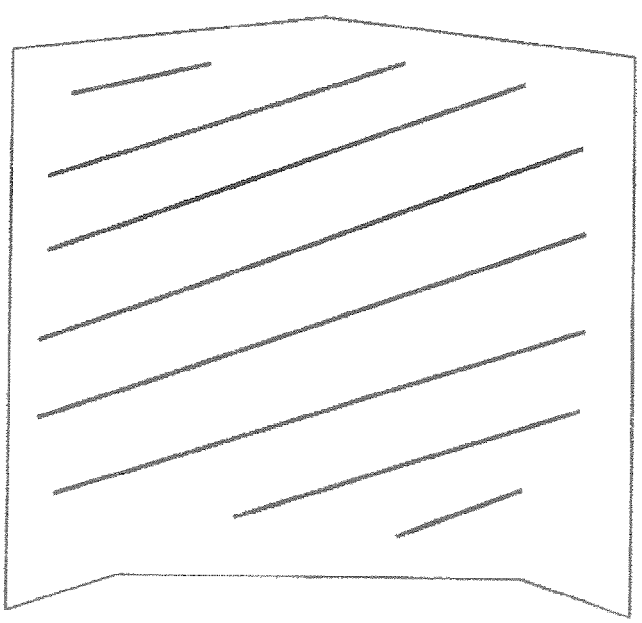
FIG. 85 is a view showing an example of an inner panel of a vehicle body panel structure in which no double intersection takes place in the middle of the vehicle body.
Figure 86:
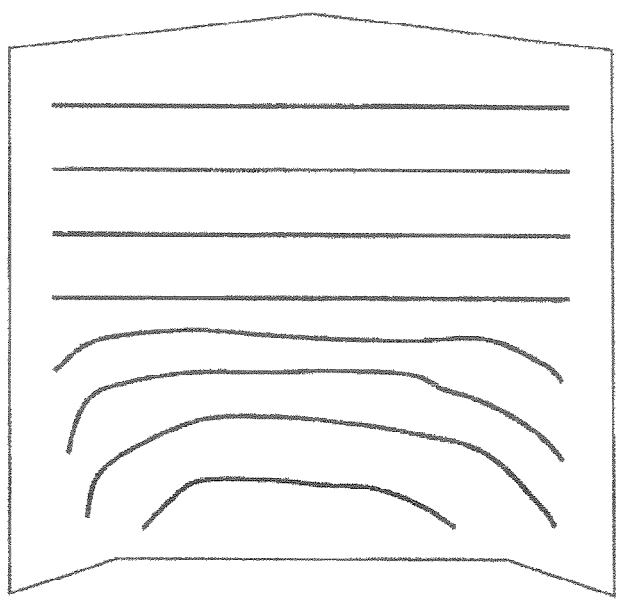
FIG. 86 is a view showing an example of an inner panel of a vehicle body panel structure in which no double intersection takes place in the middle of the vehicle body.
Figure 87:
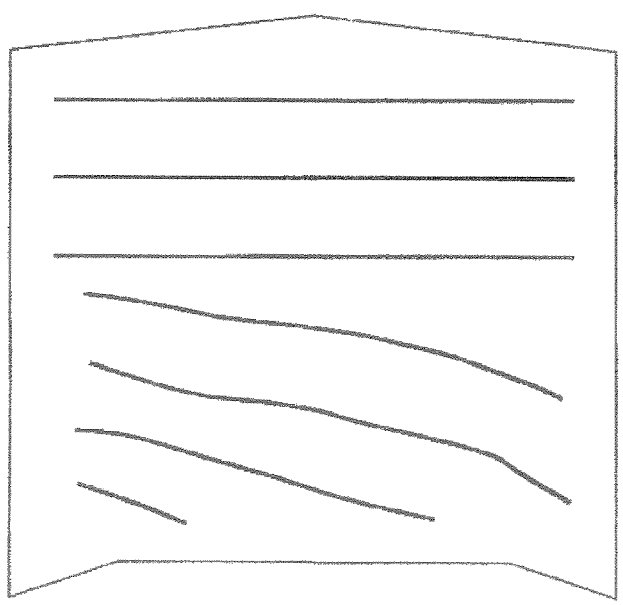
FIG. 87 is a view showing an example of an inner panel of a vehicle body panel structure in which no double intersection takes place in the middle of the vehicle body.
Figure 88:
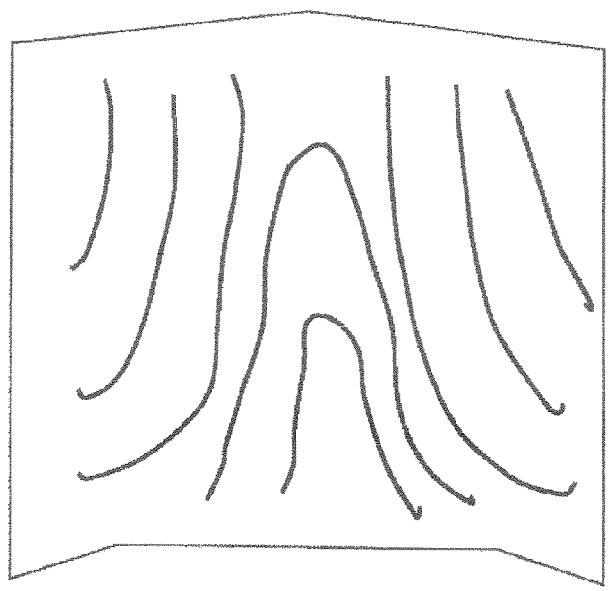
FIG. 88 is a view showing an example of an inner panel of a vehicle body panel structure in which no double intersection takes place in the middle of the vehicle body.

Although various combinations of inner panel and reinforcing inner panel made be considered, an analysis of head impact (child head impact) was conducted for the case where a substantially corrugated bead is provided in the vehicle body longitudinal direction of the inner pane and the reinforcing inner panel is provided in the vehicle width direction with a substantially corrugated bead in the vehicle width direction. The analysis model is shown in FIG. 57 and FIG. 58. Also, FIG. 76 is a diagrammatic cross-sectional view seen from the side of the hood and FIG. 77 is a diagrammatic cross sectional view seen from in front of the hood. The head impact positions are the five points 1 to 5 shown in FIG. 57. The analysis results are shown in FIG. 59. From these Figures, substantially equivalent results are obtained in regard to head impact performance as in the conventional case, in which no reinforcing inner panel is provided but the result was obtained that there was some falling off of performance compared with the conventional type. However, with this construction the excellent benefit was obtained compared with the conventional type, that sound absorption performance was added.

Figure 61:
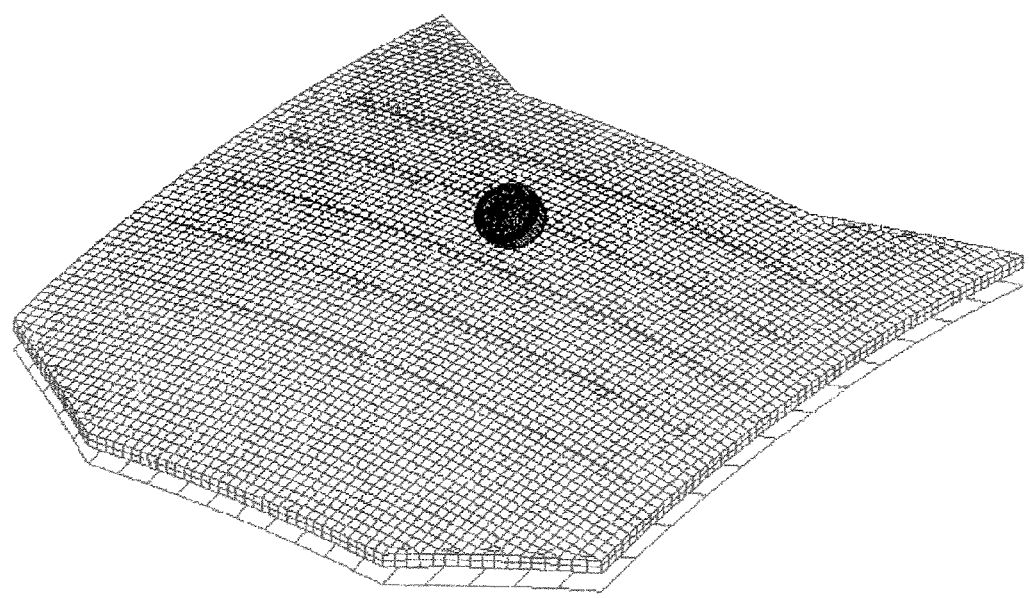
FIG. 61 is a diagram showing an analysis model of a double corrugated vehicle body panel structure combining an inner panel and reinforcing inner panel having a corrugated bead in the vehicle width direction.
Figure 63:
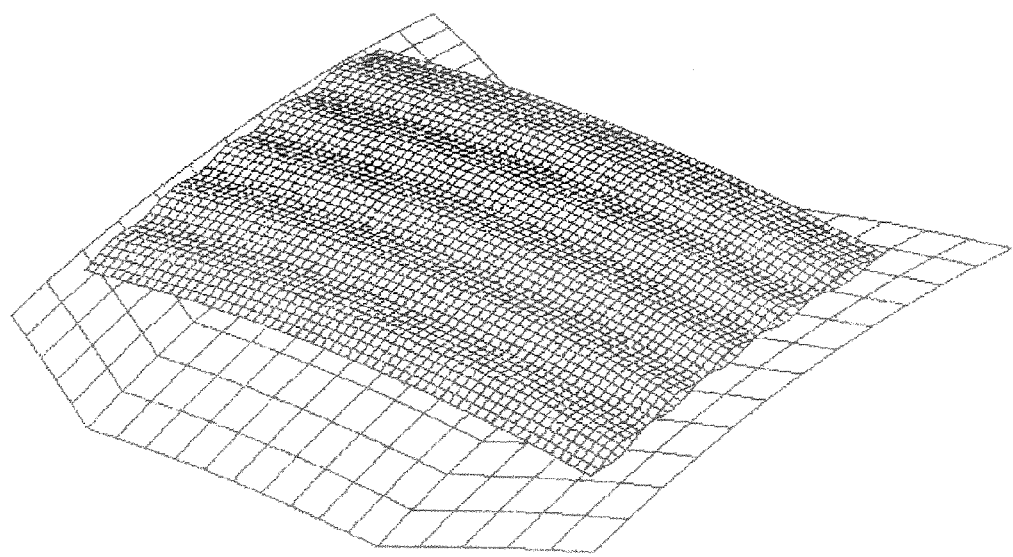
FIG. 63 is a diagram showing an analysis model of a double corrugated vehicle body panel structure combining an inner panel and reinforcing inner panel having a corrugated bead in the vehicle width direction.
Figure 64:
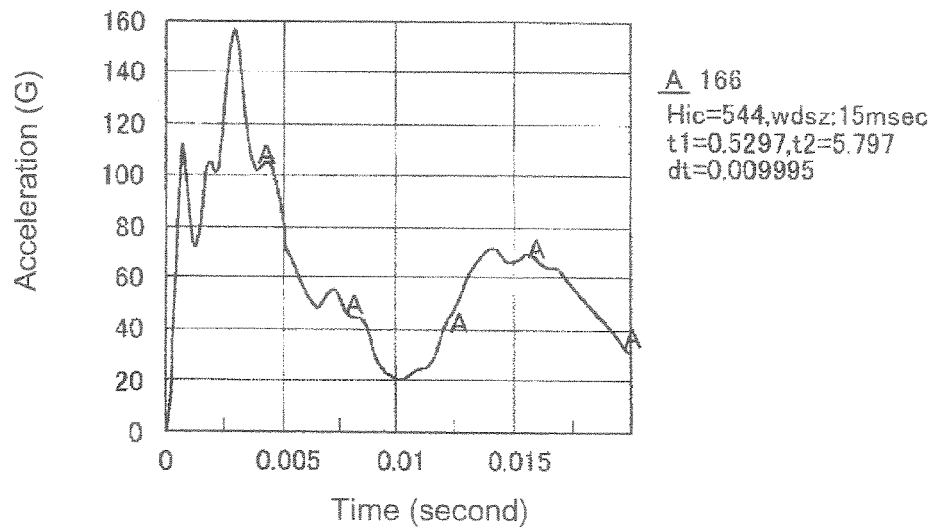
FIG. 64 is a diagram showing an analysis result of a double corrugated vehicle body panel structure combining an inner panel and reinforcing inner panel having a corrugated bead in the vehicle width direction.
Figure 65:
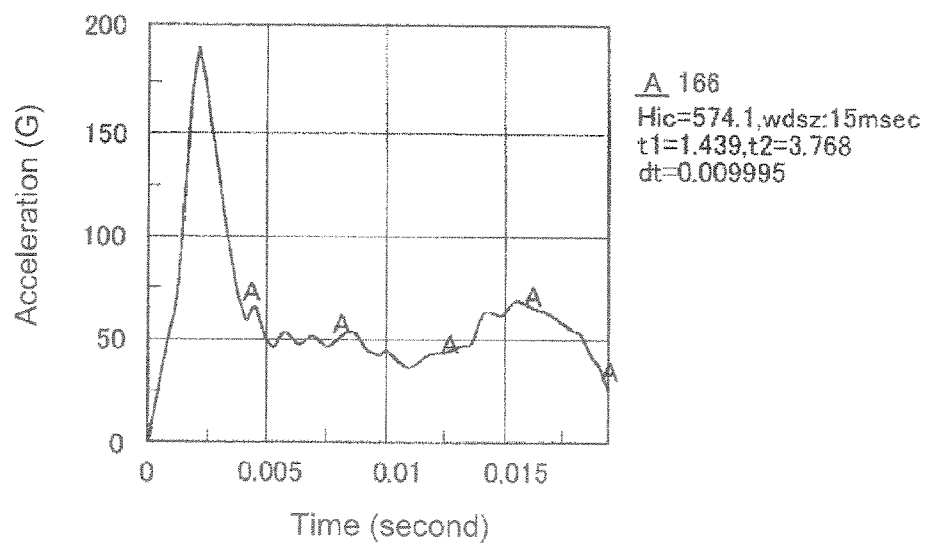
FIG. 65 is a diagram showing an analysis result of a double corrugated vehicle body panel structure combining an inner panel and reinforcing inner panel having a corrugated bead in the vehicle width direction.

An analysis of child head impact was conducted for the double corrugated hood structure combining an inner panel and reinforcing inner panel having a corrugated bead in the vehicle width direction. The sheet thickness was 1 mm 0.8 mm and 0.3 mm in the case of the outer panel, inner panel and reinforcing inner panel respectively and the material used was aluminum alloy. FIG. 61 is a view showing the analysis model as a whole, FIG. 62 is a view showing the shape of the inner panel of FIG. 61, FIG. 63 is a view showing the shape of the middle sections of the inner panel and the reinforcing inner panel and FIG. 74 is a diagrammatic cross-sectional view seen from the side of the hood. Also, in FIG. 64, the head acceleration waveform in the event of impact of a child head with the peak section of the inner panel corrugation is shown. FIG. 65 shows the head acceleration waveform in the event of impact of a child head with the valley section of the corrugation. Also, FIG. 66 and FIG. 94 to 96 show a comparison with the conventional analysis results.

From these analysis results, it can be seen that the pedestrian protective performance of the double corrugated hood structure combining an inner panel and reinforcing inner panel and having a corrugated bead in the vehicle width direction is much superior to that of the conventional structure. In a vehicle body panel structure combining an outer panel, an inner panel having a bead of corrugated cross-sectional shape parallel with the vehicle width direction and arranged on the inside face of this outer panel, and a reinforcing inner panel having a bead of corrugated cross-sectional shape parallel with the vehicle width direction and further arranged on the inside face of this inner panel, the head impact performance is further improved by sticking one or more reinforcing sheets made of steel, made of aluminum or made of lead onto the ins de lace of the outer panel.

In addition, as shown in diagrammatic cross-sectional view in FIG. 75, in the corrugated cross-section shape of the inner panel or reinforcing inner panel, preferably, taking the wavelength of the inner panel or reinforcing inner panel in the adult head impact range as pa, and taking the external diameter of an adult head as da, $0.5 < pa/da < 2.8$ is satisfied. Also, taking the wavelength of the inner panel or reinforcing inner panel in the child head impact range as pc, and taking the external diameter of a child head as dc, $0.5<pc/dc<2.8$ is satisfied. Also, preferably the wave height (h1a) of the inner panel and the wave height (h2a) of the reinforcing inner panel in the adult head impact range satisfy $0.05<(h1a+h2a)/da<0.35$, or the wave height (h1c) of the inner panel and the wave height (h2c) of the reinforcing inner panel in the child head impact range satisfy $0.05<(h1c+h2c)/dc<0.35$. In this way, the impact energy can be efficiently and suitably absorbed in respect of both adult head impacts and child head impacts. Specifically, in the event of an adult head impact, the impact energy increases, so it is necessary to make the wave height greater than in the case of a child impact. It becomes possible to make the wave height of the adult head impact region greater than the wave height of the child head impact region by adopting this construction. Consequently, a more optimum pedestrian protective hood is obtained.

Figure 72:
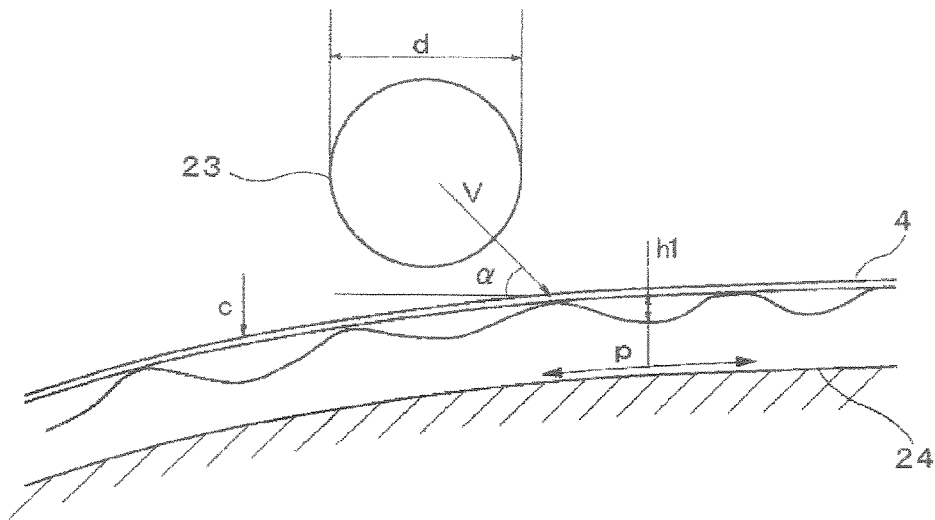
FIG. 72 is a view showing the cross-sectional shape of a corrugated vehicle body panel structure having a corrugated bead in the vehicle width direction and a corrugated bead in the vehicle body longitudinal direction.

Next, an embodiment of a single layer corrugated vehicle body panel structure combining an outer panel and an inner panel having a corrugated cross-sectional bead parallel with the vehicle width direction arranged on the inside face of this outer panel will be described. FIG. 72 is a cross-sectional view of a simplified model and FIG. 60, FIG. 91, FIG. 92 and FIG. 93 are views showing the analysis results in respect of pedestrian protection performance in regard to a single layer corrugated vehicle body panel structure in the case where the inner panel has a substantially corrugated bead in the vehicle width direction. From these Figures, it can be seen that either the pedestrian protective performance in the case of a vehicle body panel structure having single layer transverse corrugations (impact with the peak section) where the inner panel has a substantially corrugated bead in the vehicle width direction is roughly the same as the pedestrian protective performance in the case of the conventional type (single layer longitudinal corrugation, impact onto the peak sec ion) of vehicle body panel structure, where the inner panel has a substantially corrugated bead in the vehicle body longitudinal direction, or better pedestrian protective performance is obtained, by a suitable setting of the wavelength. As a result, it can be seen that, in the case of a vehicle body panel structure with single layer transverse corrugation (impact onto the peak section), this structure is of light weight in the case where the inner panel has a substantially corrugated bead in the vehicle width direction and such a vehicle body hood panel structure is useful in that it has excellent pedestrian protective performance.

Figure 114:
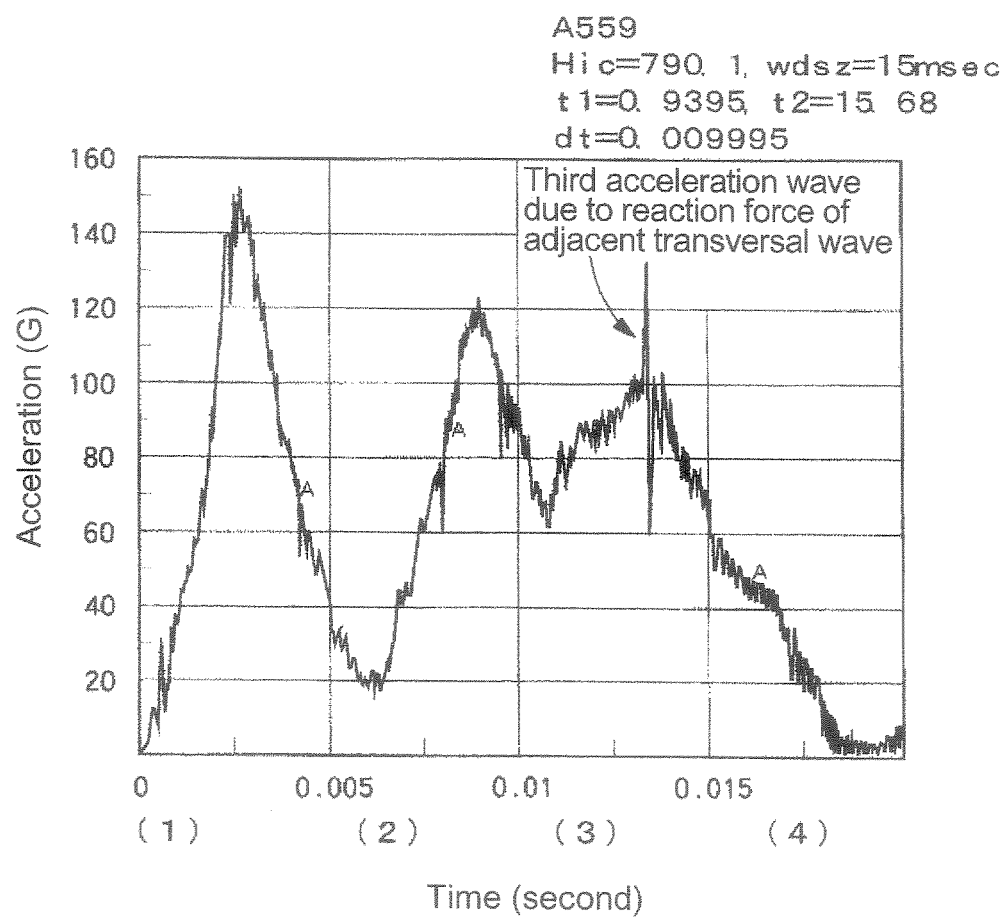
FIG. 114 is a view showing the head acceleration waveform in the case where the wavelength is 160 mm, the wave height 30 mm and the clearance 70 mm in a single layer corrugated hood structure.
Figure 115:
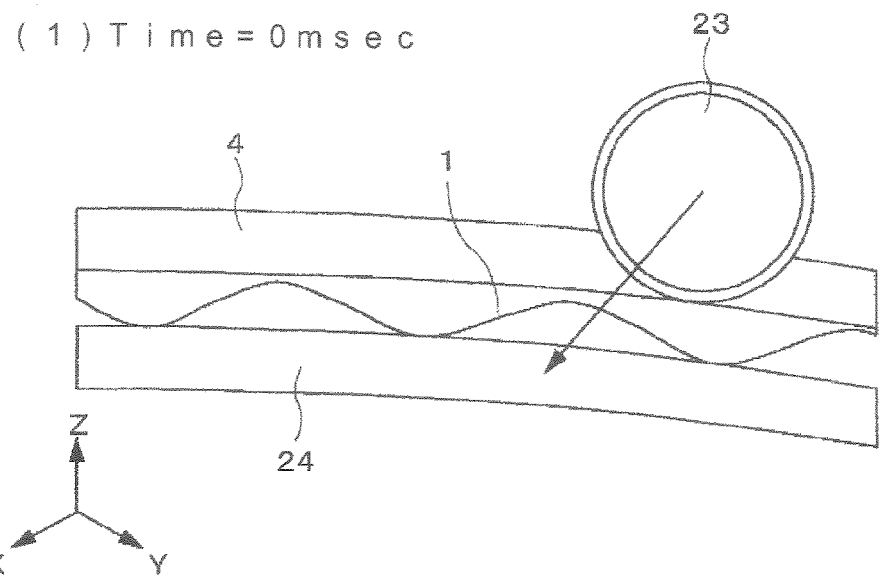
FIG. 115 is a view of the deformation during head impact after 0 msec in FIG. 114.
Figure 116:
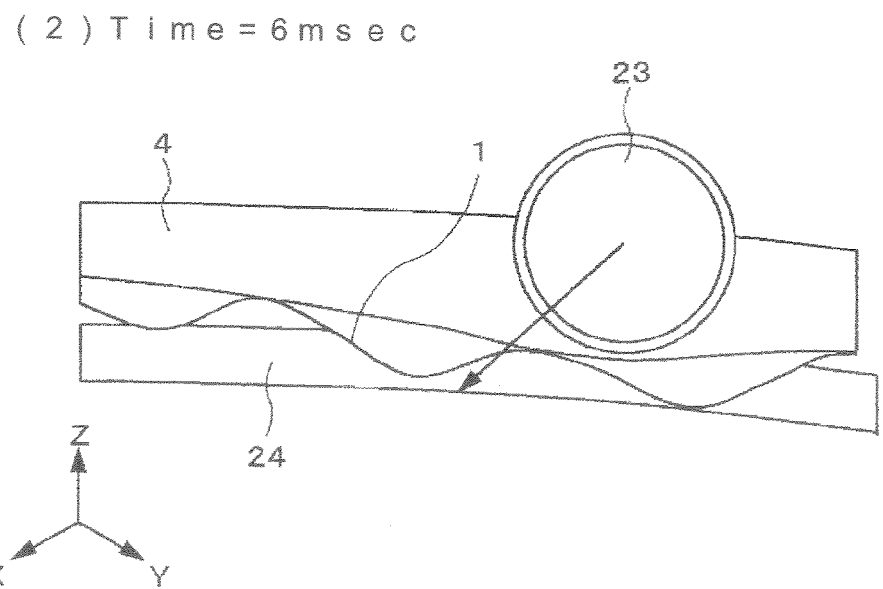
FIG. 116 is a view of the deformation during head impact after 6 msec in FIG. 114.
Figure 117:
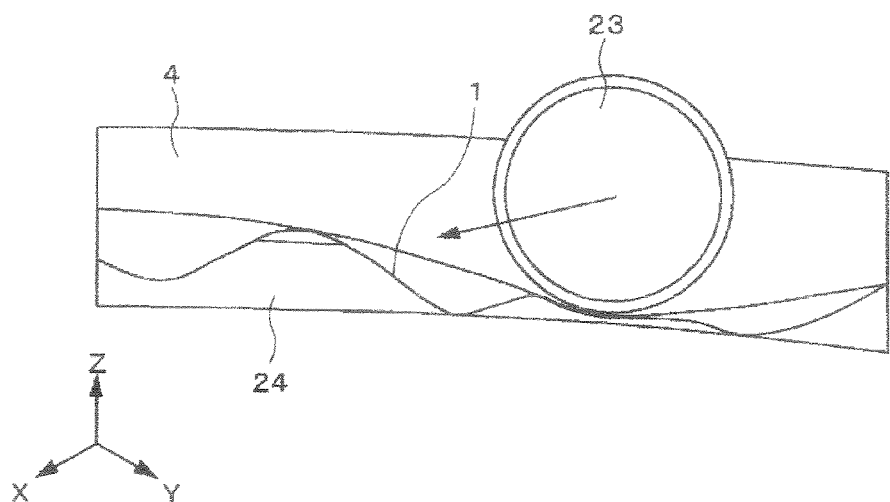
FIG. 117 is a view of the deformation during head impact after 11 msec in FIG. 114.
Figure 118:
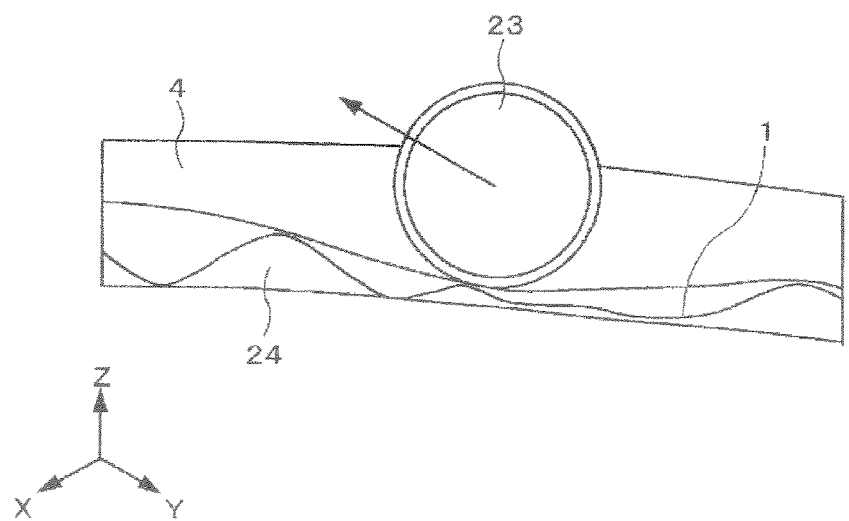
FIG. 118 is a view of the deformation during head impact after 17 msec in FIG. 114.

FIG. 114 shows the head acceleration waveform in the case where the wavelength is 160 mm, wave height 30 mm and clearance 70 mm in respect of a single layer transverse corrugated hood structure. The mechanism of a HIC value reduction in the case of such a single layer transverse corrugated hood structure was investigated. FIG. 115 to FIG. 118 are views showing the deformation in the event of head impact respectively after 0 msec, 6 msec, 11 msec and 17 msec in FIG. 114. The acceleration that then exists can be read from the head acceleration waveform diagram of FIG. 114. (1) is 0 msec, (2) is 6 msec, (3) is 11 msec and (4) is 17 msec. In the case of the head acceleration waveform it can be seen that, in contrast to the conventional longitudinal corrugation, a third acceleration wave is generated. It can be seen from the deformation diagram that this is due to the effect of an adjacent transverse wave in front of the head impact region. Although the head undergoes a third wave acceleration due to this adjacent transverse corrugation the second-wave acceleration resulting from approach to the rigid body surface is lowered. As a result, the acceleration waveforms of the second-wave acceleration and third wave acceleration are smoothed out, with the consequence that the HIC value is lowered. By employing such an inner panel corrugated transversely in the vehicle width direction, pedestrian protection performance is improved. However, if the wavelength and wave height are not selected in appropriate ranges, this benefit cannot be obtained. Specifically, if the wavelength is too small, the rigidity of the inner panel becomes excessive, provoking an abrupt increase in the second-wave acceleration and so increasing the HIC value. If the wavelength is too large, the rigidity of the inner panel becomes too low, with the result that the head impacts the rigid body surface and the limiting value of 1000 of the HIC value is greatly exceeded. The same applies in respect of the wave height. If the wave height is too larger the rigidity of the inner panel becomes too great. If the wave height is too small, the rigidity is insufficient, resulting in increase in the HIC value.

It should be noted that, as shown in FIG. 73, by means of a vehicle body panel structure wherein the inner panel wave height (h1a) in the adult head impact range is larger than the inner panel wave height (h1c) in the child head impact range, the impact energy can be efficiently and appropriately absorbed in respect of both adult head impacts and child head impacts. Specifically, since the impact energy in the event of an adult head impact increases, the wave height must become larger than in the case of a child impact, but this is possible by this construction. Consequently, a more appropriate pedestrian protective hood can be obtained.

FIG. 73 is a hood cross-sectional view seen from the vehicle body side direction. In FIG. 73, the wave heights of the inner panel and reinforcing inner panel in the adult head impact range are respectively larger than the wave heights of the inner panel and reinforcing inner panel in the child head impact range. It is not then necessary that the wavelength and wave height should be fixed values.

Figure 67:
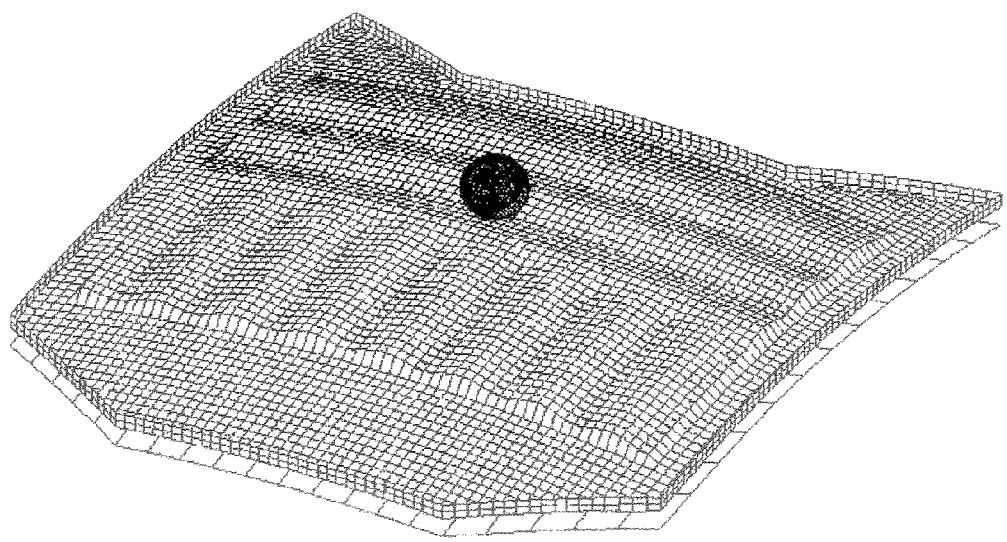
FIG. 67 is a diagram showing an analysis model of a double corrugated vehicle body panel structure combining an inner panel and reinforcing inner panel having both a corrugated bead in the vehicle width direction and a corrugated bead in the vehicle body longitudinal direction.
Figure 68:
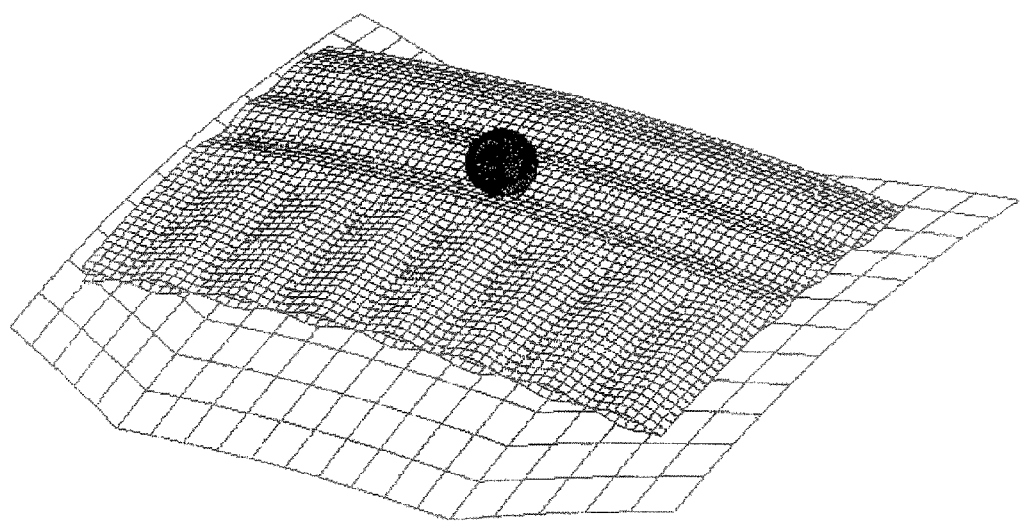
FIG. 68 is a view showing an analysis model of a double corrugated vehicle body panel structure combining an inner panel and a reinforcing inner panel in which there are present both a corrugated bead in the vehicle width direction and a corrugated bead in the vehicle body longitudinal direction.
Figure 69:
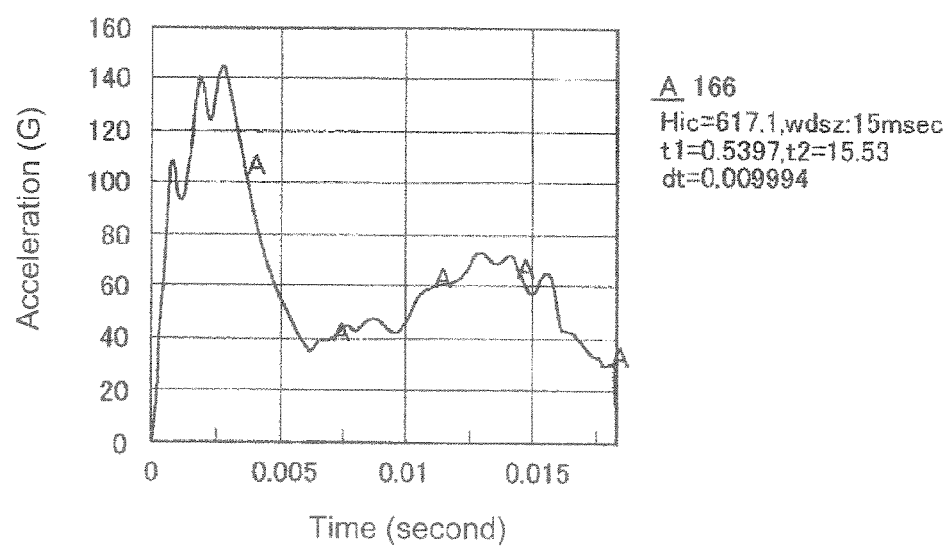
FIG. 69 is a view showing the analysis results of a double corrugated vehicle body panel structure combining an inner panel and a reinforcing inner panel in which there are present both a corrugated bead in the vehicle width direction and a corrugated bead in the vehicle body longitudinal direction.
Figure 70:
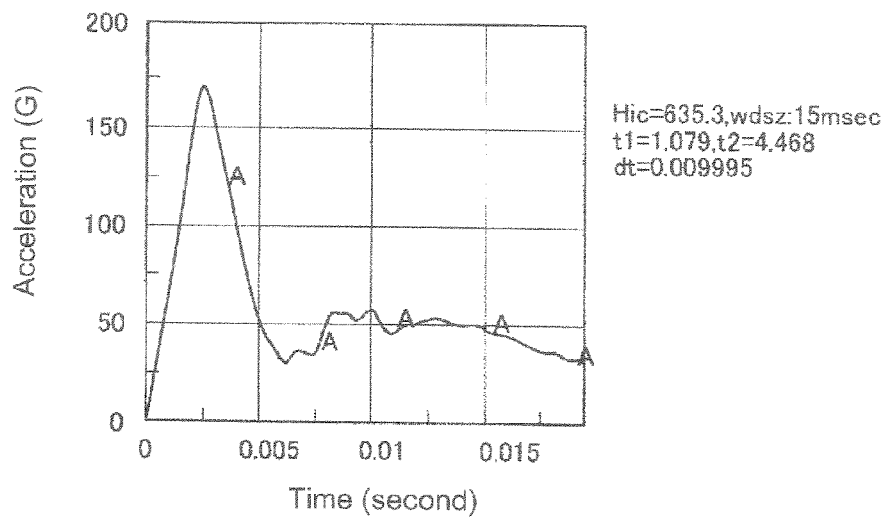
FIG. 70 is a view showing the analysis results of a double corrugated vehicle body panel structure combining an inner panel and a reinforcing inner panel in which there are present both a corrugated bead in the vehicle width direction and a corrugated bead in the vehicle body longitudinal direction.

In the combination of inner panel and a reinforcing inner panel, a child head impact analysis was performed in respect of a double corrugated hood structure combining an inner panel and reinforcing inner panel in which both a corrugated bead in the vehicle width direction and a corrugated bead in the vehicle body longitudinal direction were present. The sheet thickness of the outer panel, inner panel and reinforcing inner panel was 1 mm, 0.8 mm and 0.3 mm respectively, and the material used was aluminum alloy. FIG. 67 is a view showing the inner panel shape of the analysis model. FIG. 68 is a view showing the shape of the central portion of the inner panel and reinforcing inner panel. Also, FIG. 69 is a view showing the head acceleration waveform when a child's head collides with a peak section of the inner panel. FIG. 70 is a view showing the head acceleration waveform when a child's head collides with a valley section. FIG. 65 is a view showing a comparison with the conventional analysis results. From the results of these analyses, it can be seen that a double corrugated hood combining an inner panel and reinforcing inner panel in which both a corrugated bead in the vehicle width direction and a corrugated bead in the vehicle body longitudinal direction are present is very considerably superior in comparison with the conventional structure. It should be noted that in the combination of inner panel and reinforcing inner panel head impact performance can be further improved by sticking a reinforcing sheet onto the inside surface of the outer panel of the double corrugated hood structure combining an inner panel and reinforcing inner panel in which both a corrugated bead in the vehicle width direction and a corrugated bead in the vehicle body longitudinal direction are present.

Also, by means of a vehicle body panel structure in which the wave height (h1a) of the inner panel in the adult head impact range is larger than the wave height (h1c) of the inner panel in the child head impact range, or in which the wave height (h2a) of the reinforcing inner panel in the adult head impact range is larger than the wave height (h2c) of the reinforcing inner panel in the child head impact range, the impact energy in the event of an adult head impact and the impact energy in the event of a child head impact can be efficiently absorbed, so pedestrian protection performance is improved.

Figure 89:
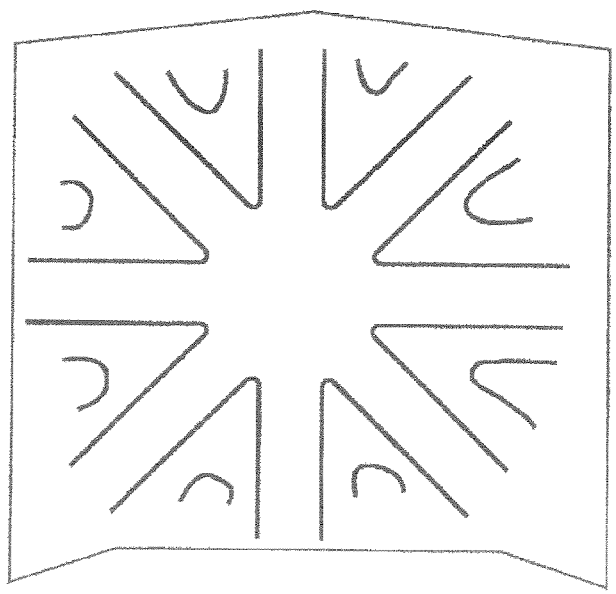
FIG. 89 is a view showing an example of an inner panel of a vehicle body panel structure in which there is a single location at which double intersection takes place in the middle of the vehicle body.
Figure 90:
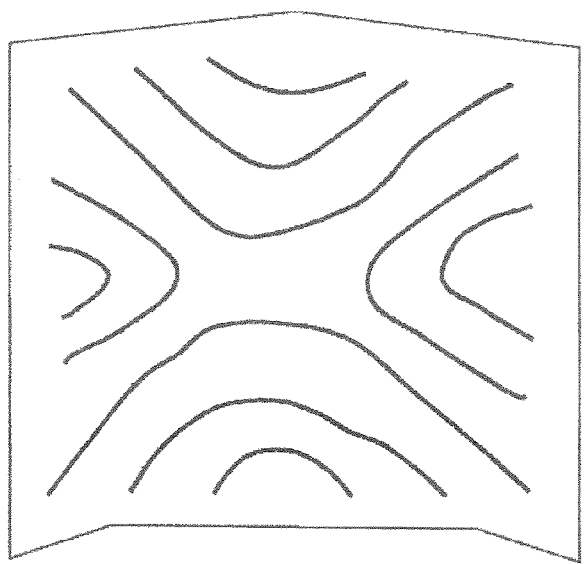
FIG. 90 is a view showing an example of an inner panel of a vehicle body panel structure in which there is a single location at which double intersection takes place in the middle of the vehicle body.
Figure 91:
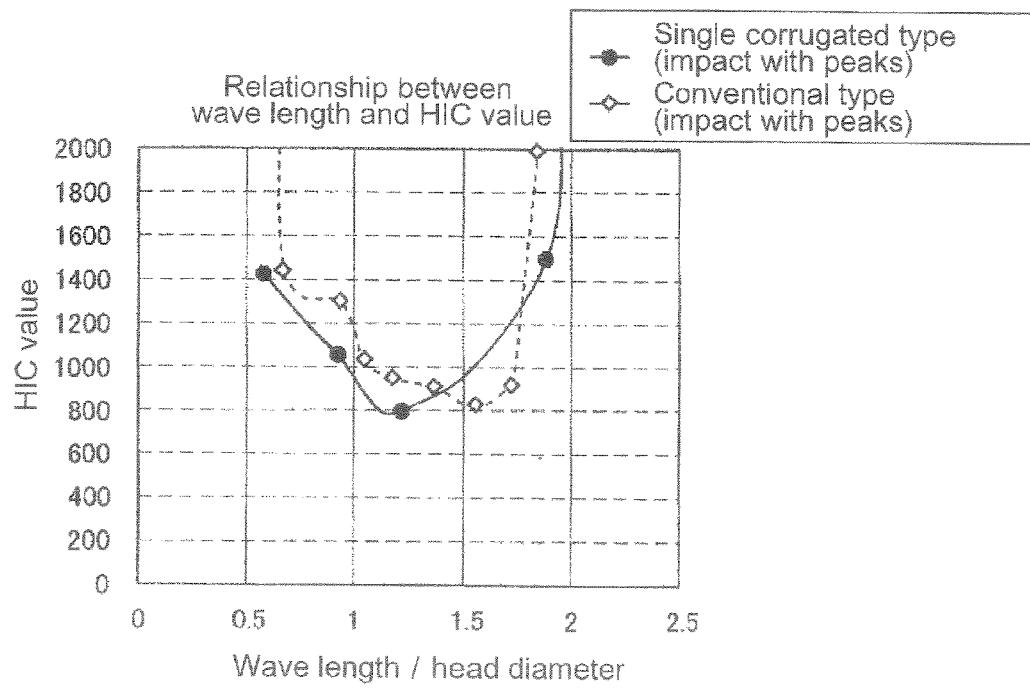
FIG. 91 is a view showing the relationship between wavelength and HIC value in a single layer corrugated vehicle body panel structure.
Figure 92:
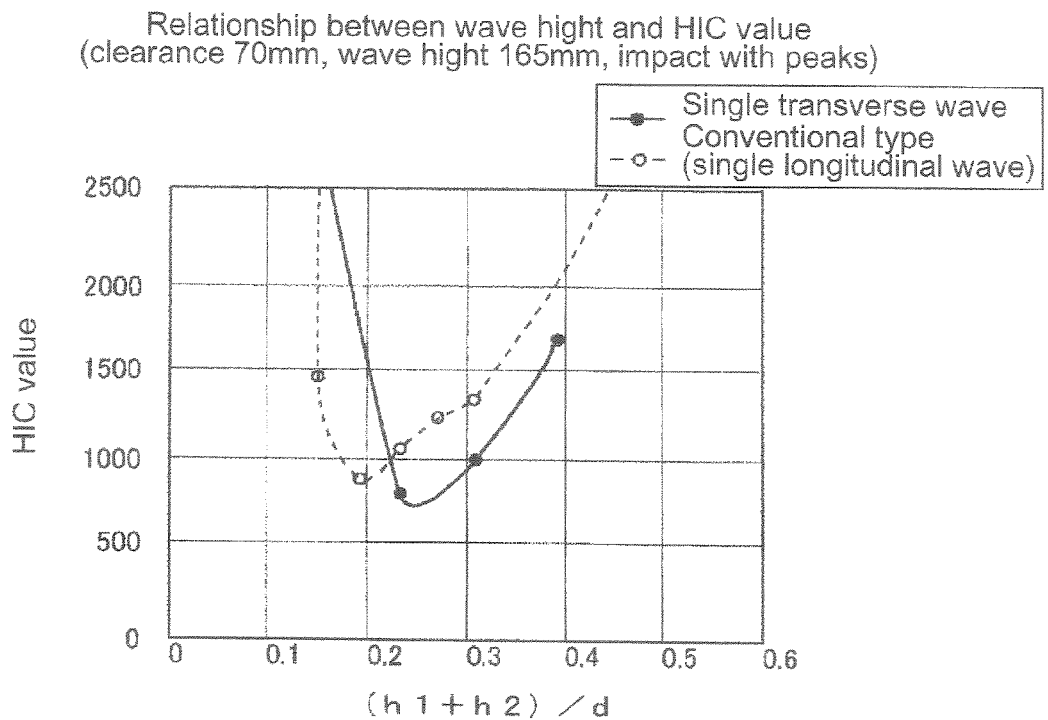
FIG. 92 is a view showing the relationship between wave height and HIC value in a single layer corrugated vehicle body panel structure.
Figure 93:
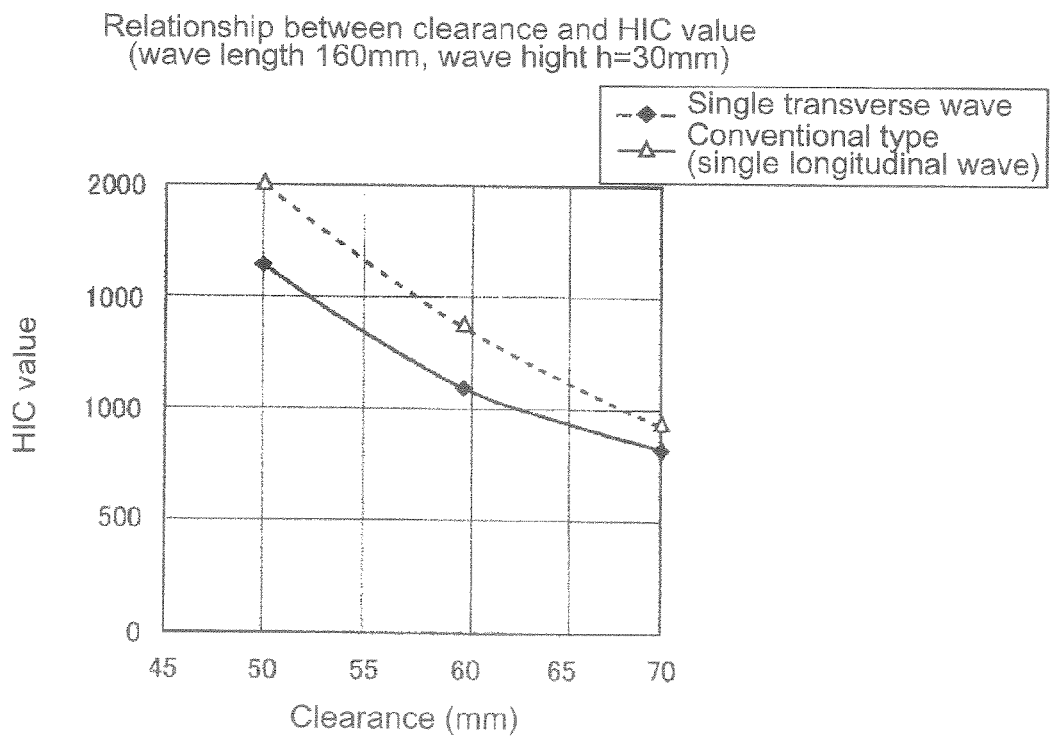
FIG. 93 is a view showing the relationship between clearance and HIC value in a single layer corrugated vehicle body panel structure.
Figure 94:
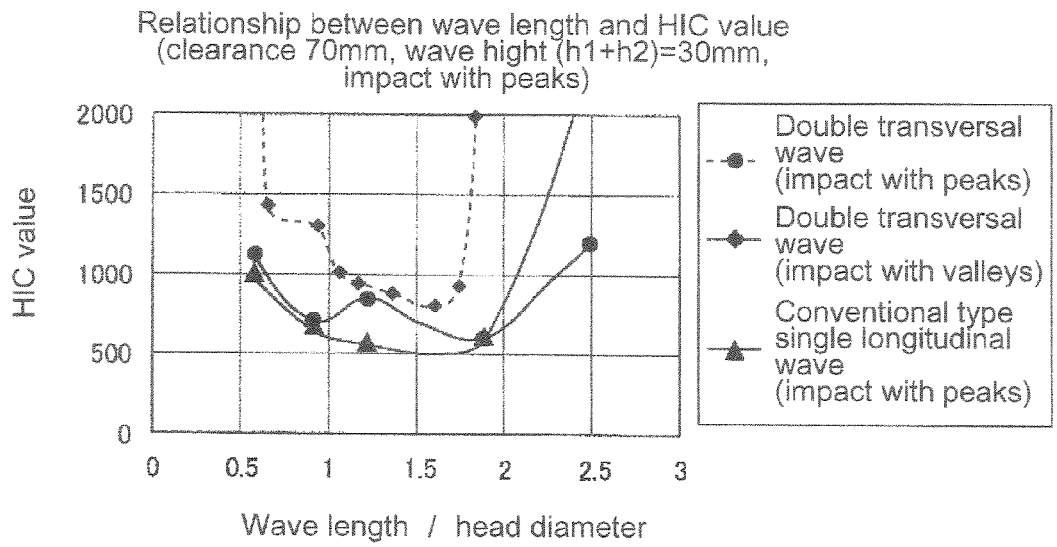
FIG. 94 is a view showing the relationship between wavelength and HIC value in a double corrugated vehicle body panel structure.
Figure 95:
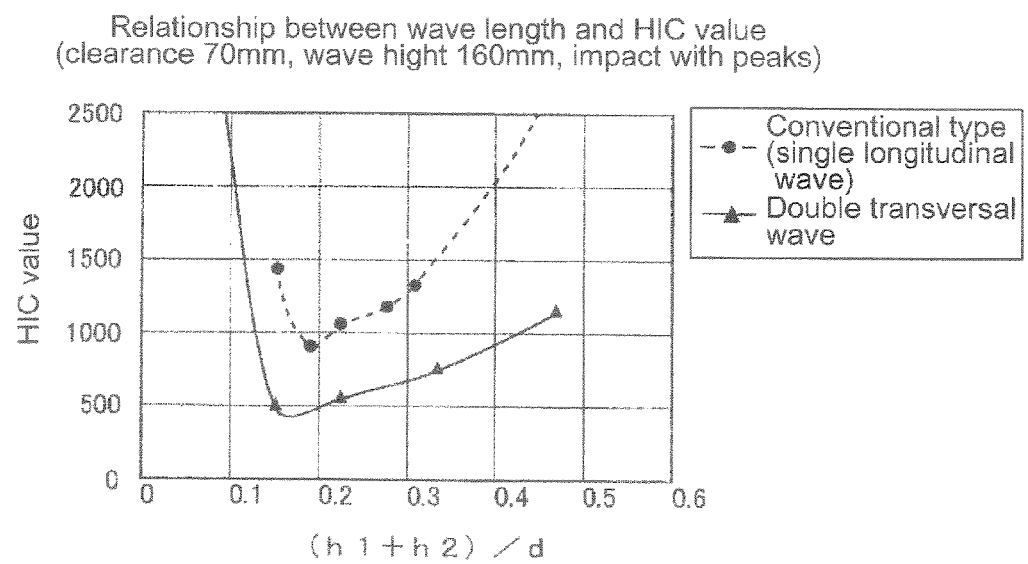
FIG. 95 is a view showing the relationship between wave height and HIC value in a double corrugated vehicle body panel structure.
Figure 96:
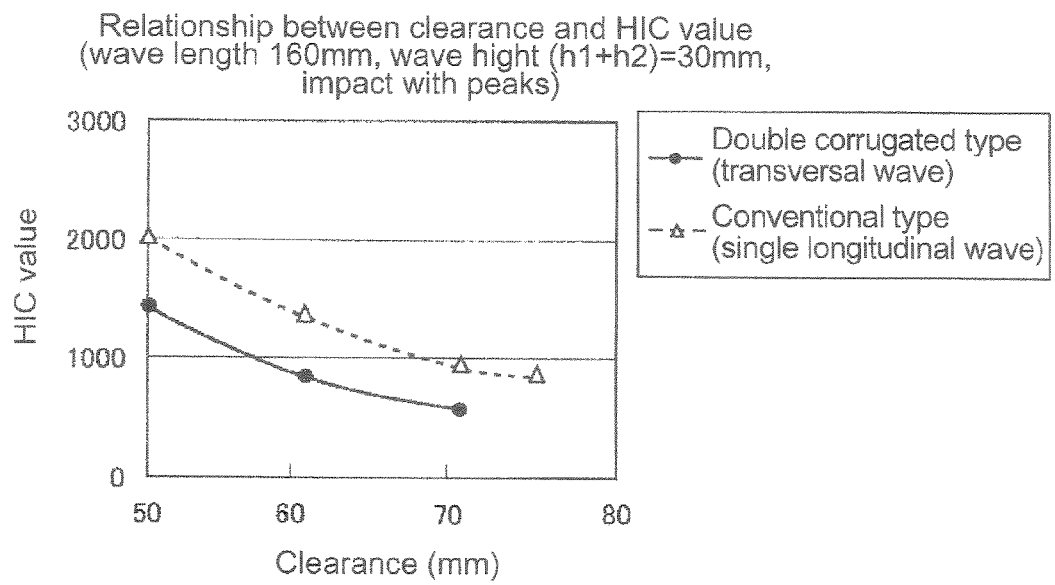
FIG. 96 is a view showing the relationship between clearance and HIC value in a double corrugated vehicle body panel structure.
Figure 97:
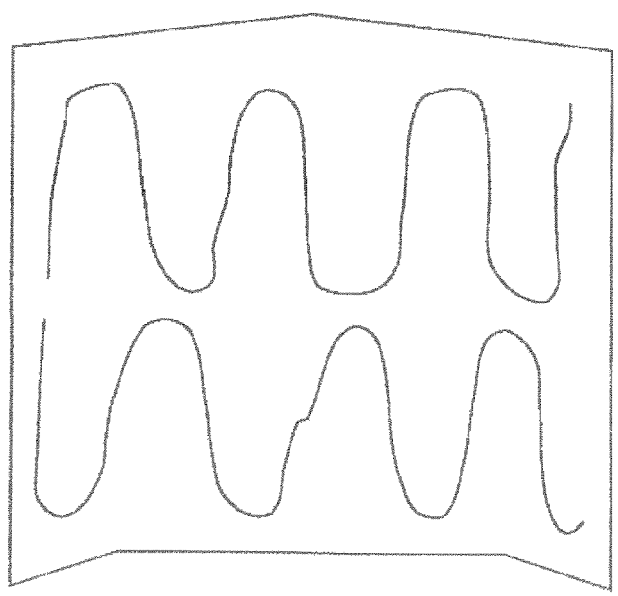
FIG. 97 is a view showing the configuration of distribution of corrugations being a view showing a configuration in which both transverse corrugations and longitudinal corrugations are present.
Figure 98:
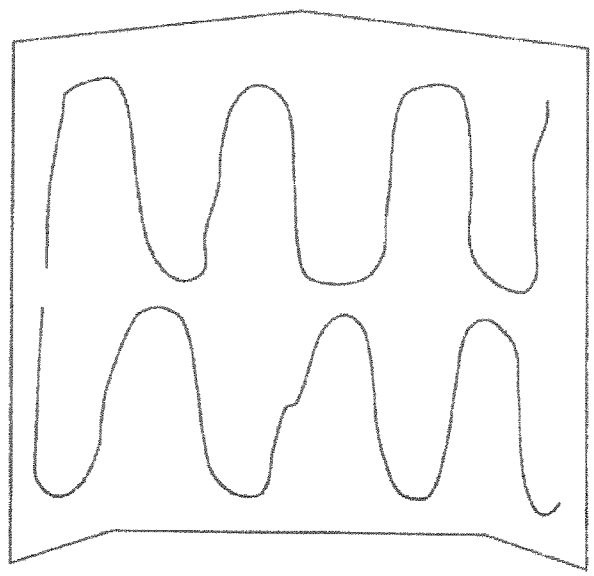
FIG. 98 is a view showing the configuration of distribution of corrugations, being a view showing a modified example of the configuration of the longitudinal corrugations.

Preferably, in a vehicle body panel structure of a single layer corrugated hood structure or double corrugated hood structure according to the present invention, the inner panel and reinforcing inner panel cross-sectional shapes have a corrugated shape other than a corrugated shape in which a double intersection takes place in the central portion of the panel. In this way, a vehicle body panel structure can be obtained that offers excellent pedestrian protection. FIG. 78 FIG. 79, FIG. 80, FIG. 81 and FIG. 82 to FIG. 88 and FIG. 97 and FIG. 98 are views showing a panel structure having corrugations other than corrugations intersecting in doubleed fashion in the central portion of the hoard i.e. a vehicle body panel structure which is a single layer corrugated hood structure having a corrugated shape in which no double intersection takes place in the central portion of the hood. In a portion where corrugations intersect in doubleed fashion, the crushing strength is locally lowered, making it easier for the head to collide with the rigid body surface, so, if such shape is avoided, impact in the event of a head impact can be buffered. FIG. 89 and FIG. 90 show the case where there is a single location where double intersection takes place. Preferably in this case, a study is conducted of a shape such that appropriate crushing strength is obtained in the area of intersection of the corrugations.

Next, an embodiment of a vehicle body panel structure comprising an outer panel, an inner panel arranged on the inside face of this outer panel and a reinforcing inner panel further arranged on the inside face of this inner panel and having a corrugated cross-sectional shape of a different wavelength and wave height over the entire surfaces of the inner panel and reinforcing inner panel, respectively will be described.

Figure 99:
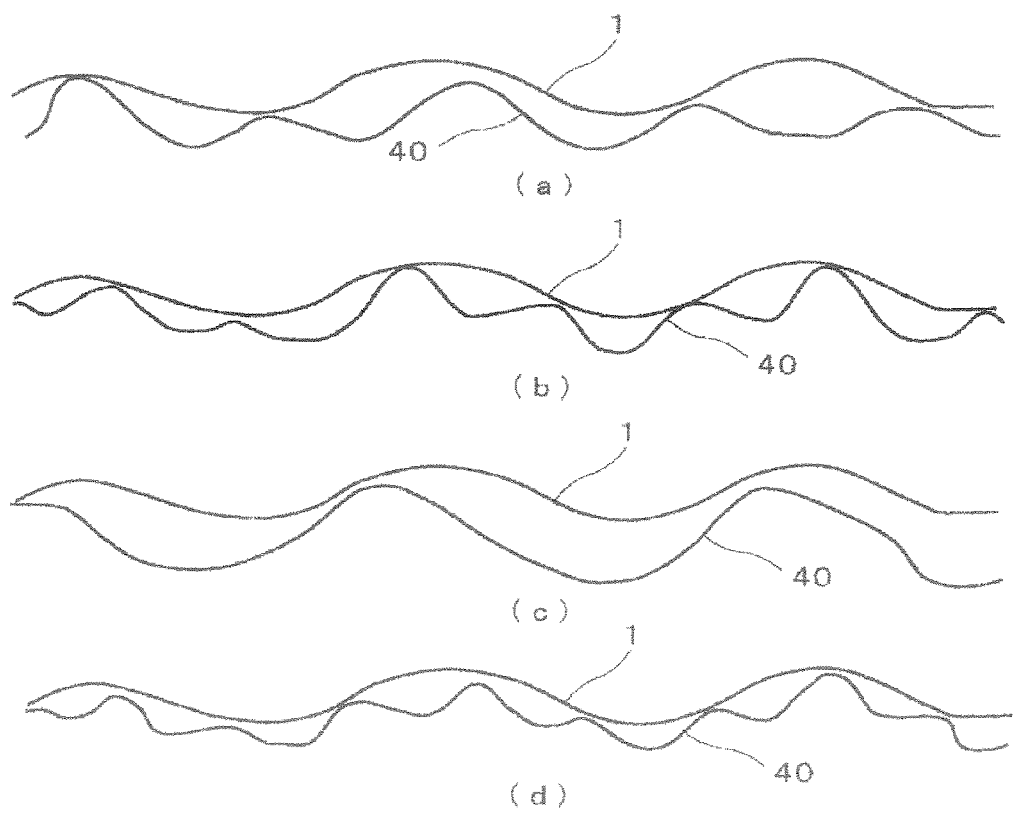
FIG. 99 is a view showing the cross-sectional shape of an inner panel and reinforcing inner panel.
Figure 100:
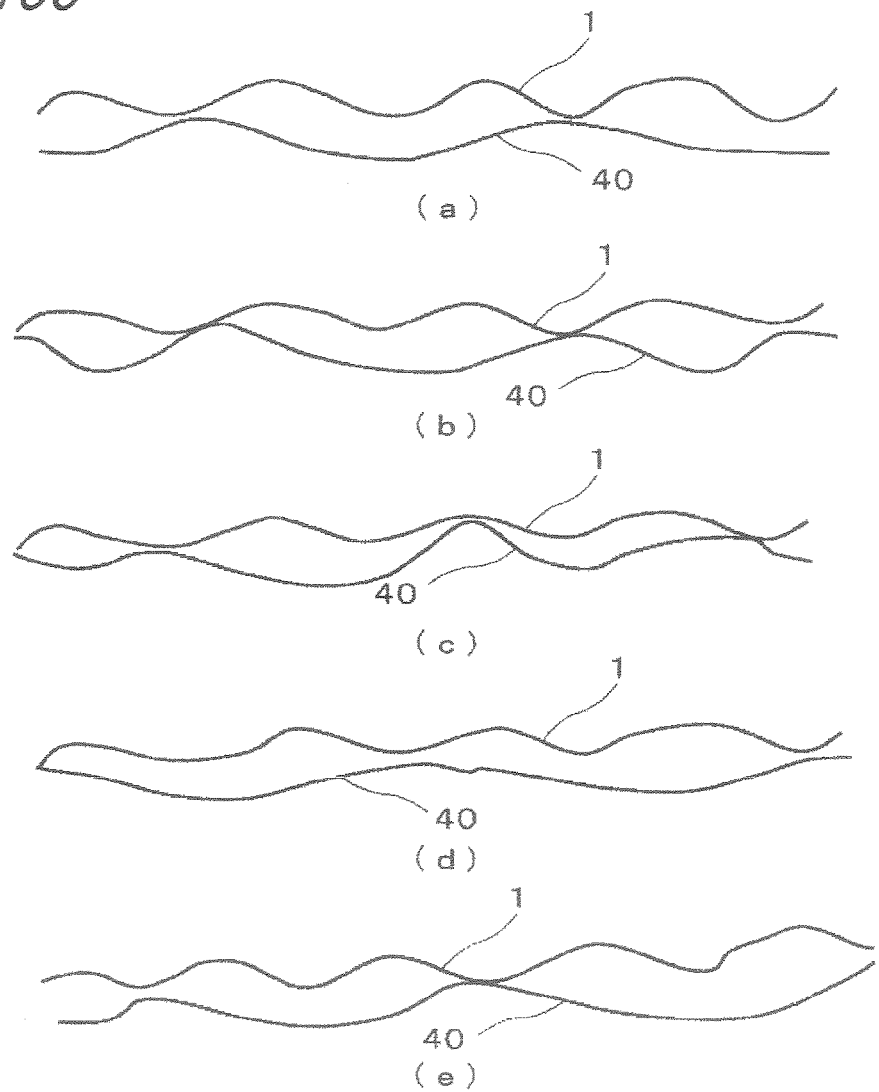
FIG. 100 is a view showing the cross-sectional shape of an inner panel and reinforcing inner panel.

Up to this point, the case has been illustrated where the inner panel and the reinforcing inner panel have roughly the same wavelength. However, cases may be considered in which head impact-resistance can be maintained even if the wavelength or wave height of these two is different. FIG. 99 and FIG. 100 are views showing such a vehicle body panel structure having a cross-sectional corrugated shape of different wavelength and wave height over the entire surfaces of the inner panel and reinforcing inner panel, respectively. FIG. 99 shows the case where the wavelength of the inner panel is longer than the wavelength of the reinforcing inner panel and FIG. 100 shows the contrary case. Since the clearance between the outer panel and the rigid body is different depending on the position of impact of the hood, head impact-resistance can be maintained with such a construction also.

Next, a pedestrian protective sound absorption vehicle body panel structure comprising an outer panel, inner panel, reinforcing inner panel and a second reinforcing inner panel will be described.

Figure 101:
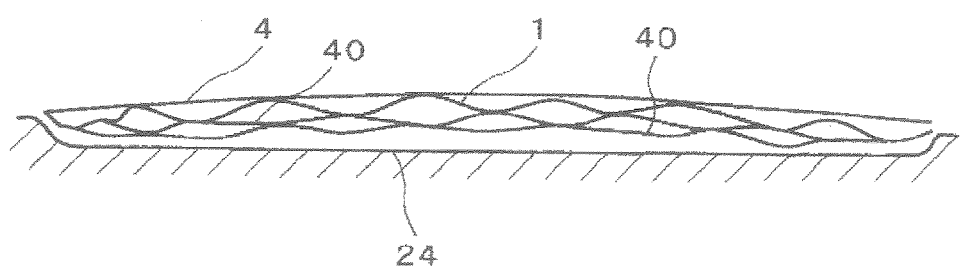
FIG. 101 is a diagram showing a vehicle body hood structure comprising an outer panel inner panel, reinforcing inner panel and second reinforcing inner panel.

FIG. 101 is a diagram showing a vehicle body panel structure comprising an outer panel, inner panel reinforcing inner panel and a second reinforcing inner panel. In FIG. 101, head impact performance and sound absorption performance are considerably improved by the addition of a second reinforcing inner panel 46 to the vehicle body panel structure comprising an outer panel 4, inner panel 1 and reinforcing inner panel 40.

Figure 102:
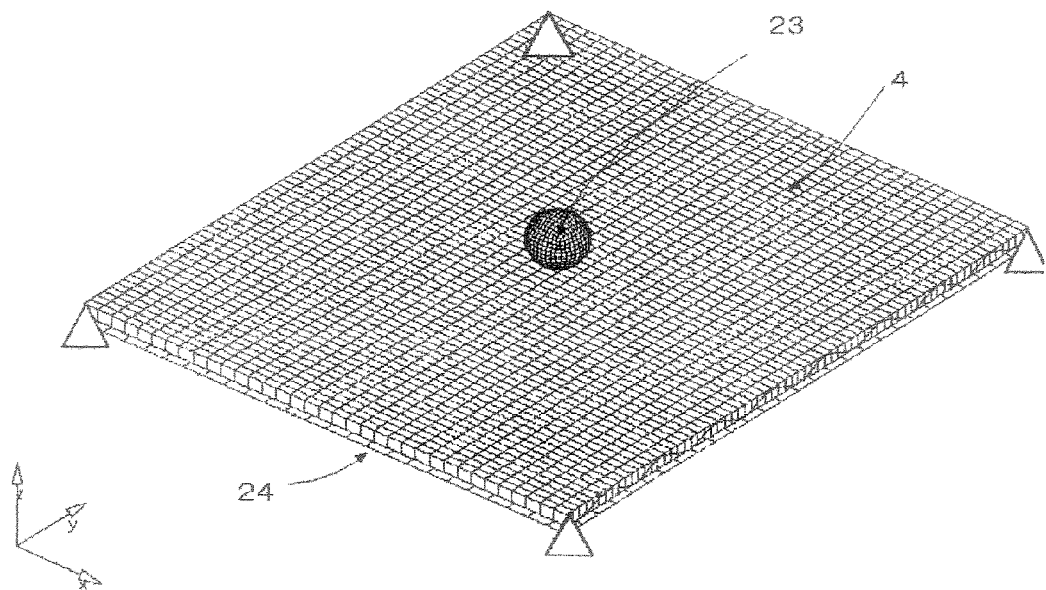
FIG. 102 is a view of an analysis model of a rectangular shape comprising an outer panel and corrugated inner panel.

In order as to investigate the relationship between head impact direction and the corrugation direction, analysis was conducted using a rectangular flat sheet model as shown in FIG. 102. The head in FIG. 102 is a child's head. The four corners of a rectangular sheet are in a purely supported condition. Also, the clearance between the rigid body surface and the outer panel is assumed to be 50 mm. In this model, a child's head is employed and aluminum alloy of sheet thickness 1 mm is employed for the outer panel, and aluminum alloy of sheet thickness 0.8 mm is employed for the inner panel. For a size of 1 m (meter)×1 m, the clearance between the outer panel and the rigid body was taken as 50 mm, the head impact direction was taken as the same direction as the corrugations i.e. 0°, the direction orthogonal thereto was taken as 90°, and the HIC value was found in the cases of 0°, 30°, 45°, 60° and 90°. The definition of head impact direction is shown in FIG. 103.

Figure 103:
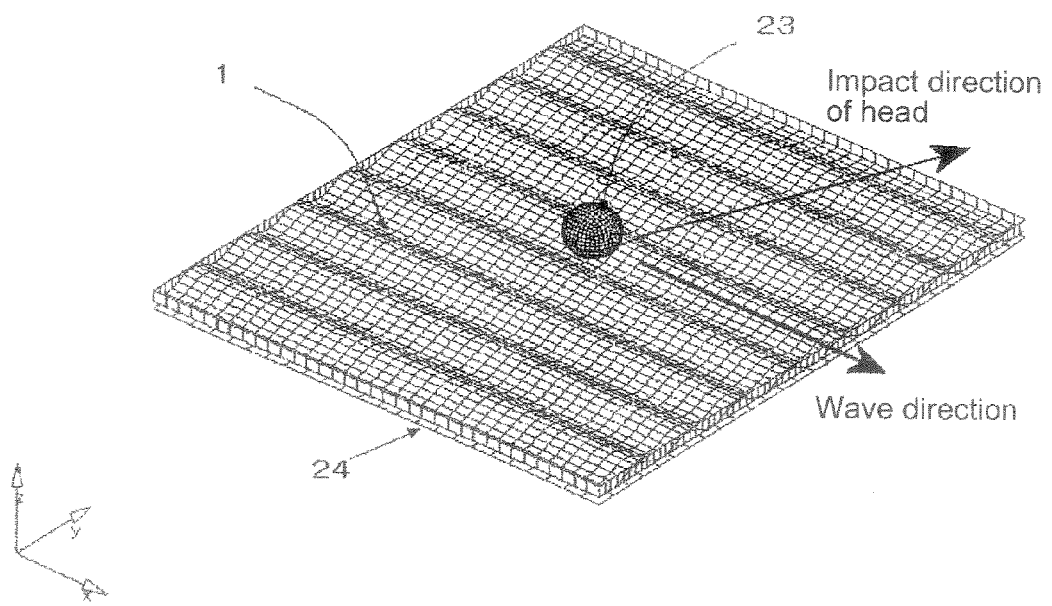
FIG. 103 is a view of an analysis model being a view of an analysis model in which the outer panel is not displayed.
Figure 104:
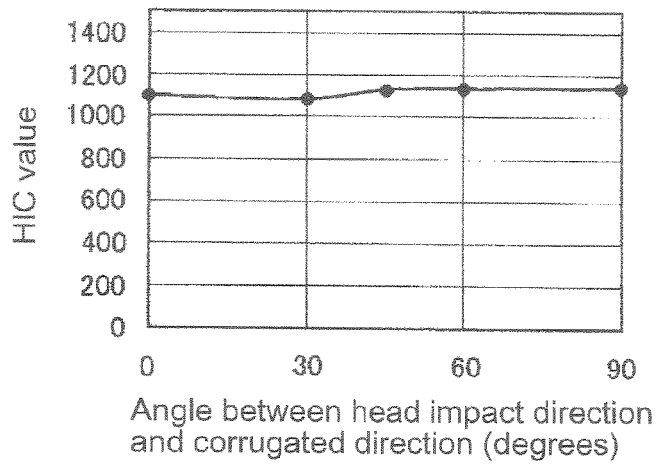
FIG. 104 is a view of the results of analysis showing the effect of head impact direction and corrugation direction on the HIC value.

In FIG. 103, the angle made by the direction of the corrugations and the head impact direction is defined. Also, the analysis results are shown in FIG. 104. From these Figures it can be seen that the head impact direction does not have much effect in terms of increasing or decreasing the HIC value. Specifically, regarding the characteristics of the corrugated inner panel, not merely is the HIC value fixed irrespective of inner head impact but also the HIC is fixed irrespective of the head impact direction.

In the case of an ordinary hood, the outer panel is curved and the position of the outer panel in the vertical direction on the side of the driver's seat is high. In addition, the length in the vehicle width direction is shorter than the length in the longitudinal direction. There is no doubt that the effect of these shapes influences the HIC value of the corrugated hood structure. It has already been confirmed that the HIC value tends to be lowered in the case where the direction of the corrugations is the vehicle width direction compared with the case where the direction of the corrugations is the longitudinal direction. It is believed that this is due to the fact that the impact energy absorption efficiency in regard to the head impact energy is increased because the bending rigidity of the corrugated area is higher, due to shortening of the length in the vehicle width direction compared with the length in the longitudinal direction.

It should be noted that, with a vehicle body panel structure comprising an inner panel and outer panel having a substantially corrugated cross-section wherein no double intersection takes place in the middle of the hood, there is no particular restriction regarding the direction of corrugation and the direction of impact i.e. these are arbitrary. However, from the results of analysis using the above rectangular flat sheet model, it is clear that, even if the direction of head impact and the direction of corrugation are arbitrary, a corrugated hood structure having excellent head impact-resistance can be achieved, that offers excellent pedestrian protection.

Figure 105:
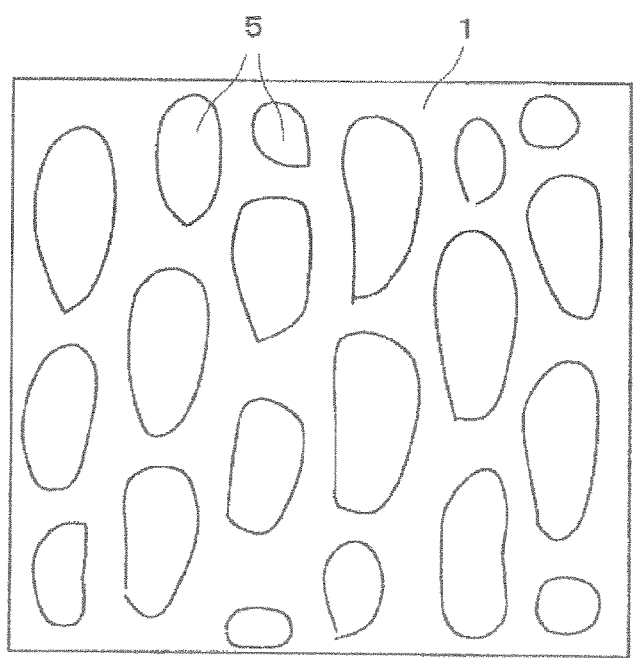
FIG. 105 is a view showing the inner panel, reinforcing inner panel or second reinforcing inner panel in which the corrugations are partially divided, in which the direction of the corrugations is substantially the longitudinal direction of the vehicle body.

Next, a vehicle body panel structure having a substantially corrugated cross-section shape in which the inner panel, reinforcing inner panel or second reinforcing inner panel are divided and wherein the direction of corrugation is in the vehicle width direction or is inclined to the vehicle width direction will be described. As described above, since it was confirmed that head impact-resistance can be ensured even though the direction of corrugation is arbitrary, the case where the corrugations are partially divided was studied. In the case where the corrugations are partially divided, the case where the direction of the corrugations is the axial direction, as shown in FIG. 105 is prior art.

Figure 106:
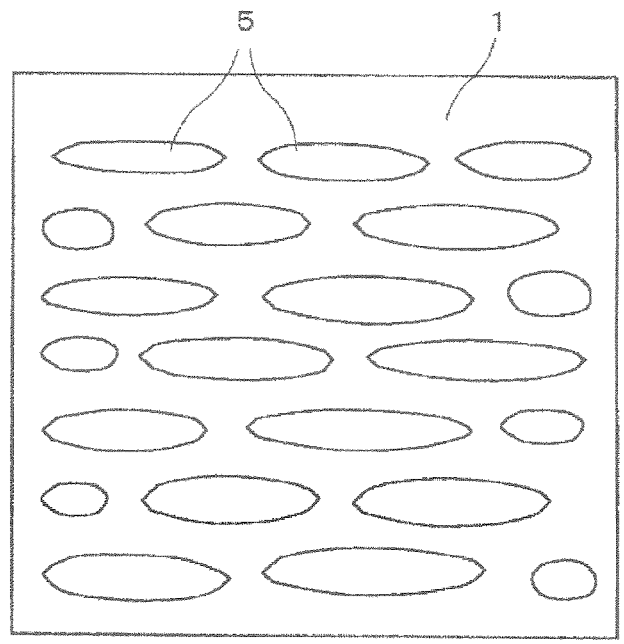
FIG. 106 is a view showing the inner panel, reinforcing inner panel or second reinforcing inner panel in which the corrugations are partially divided, in which the direction of the corrugations is substantially the width direction of the vehicle body.
Figure 107:
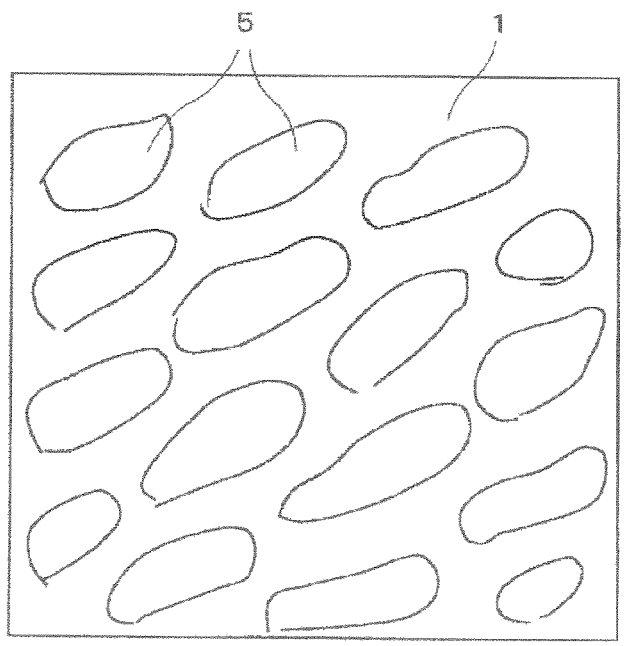
FIG. 107 is a view showing the inner panel, reinforcing inner panel or second reinforcing inner panel in which the corrugations are partially divided, in which the direction of the corrugations is substantially an inclined direction of the vehicle body.
Figure 108:
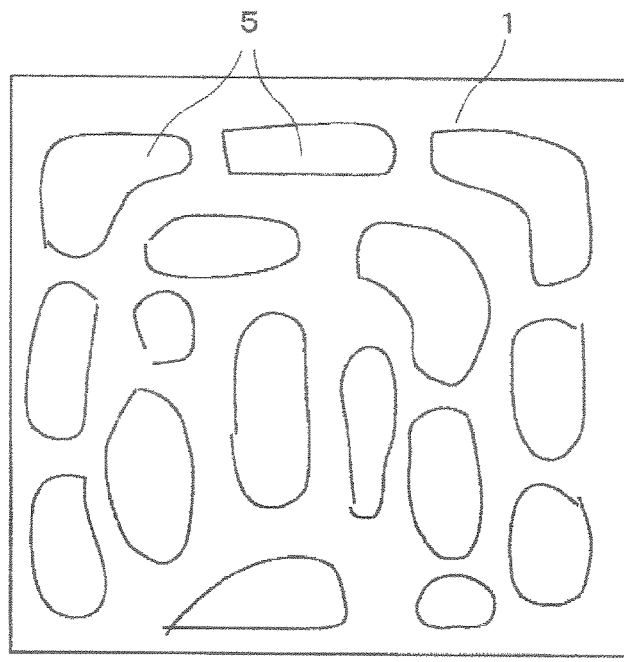
FIG. 108 is a view showing the inner panel, reinforcing inner panel or second reinforcing inner panel in which the corrugations are partially divided, in which the direction of the corrugations is an arbitrary direction of the vehicle body.
Figure 109:
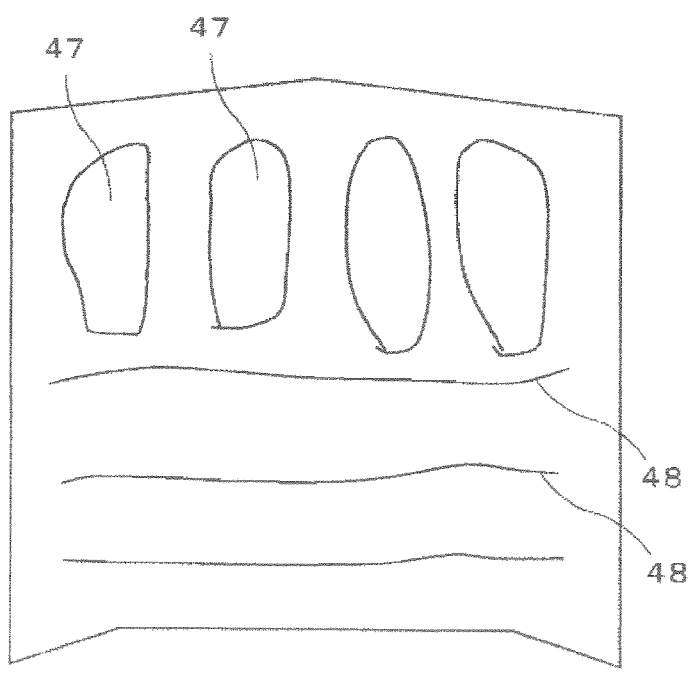
FIG. 109 is a view showing the inner panel, reinforcing inner panel or second reinforcing inner panel in which corrugations that are partially divided, and corrugations that are not divided are mixed, the direction of the corrugations being substantially the longitudinal direction of the vehicle body.
Figure 110:
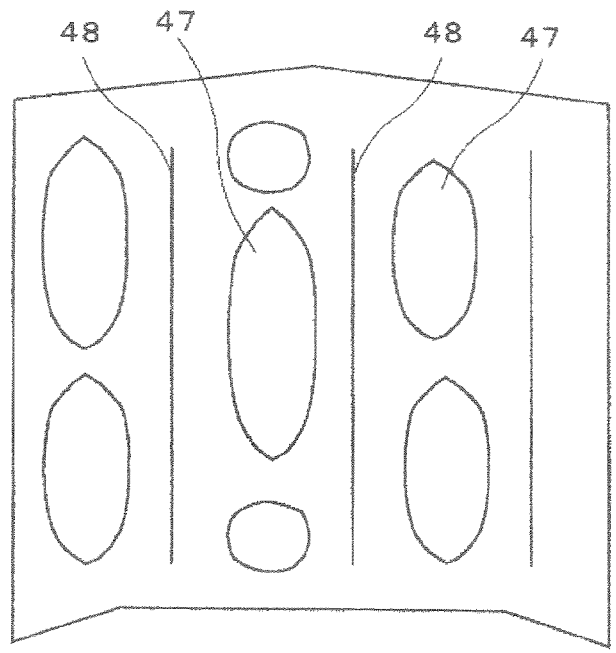
FIG. 110 is a view showing the inner panel, reinforcing inner panel or second reinforcing inner panel in which corrugations that are partially divided, and corrugations that are not divided are mixed, the direction of the corrugations being substantially the longitudinal direction of the vehicle body.
Figure 111:
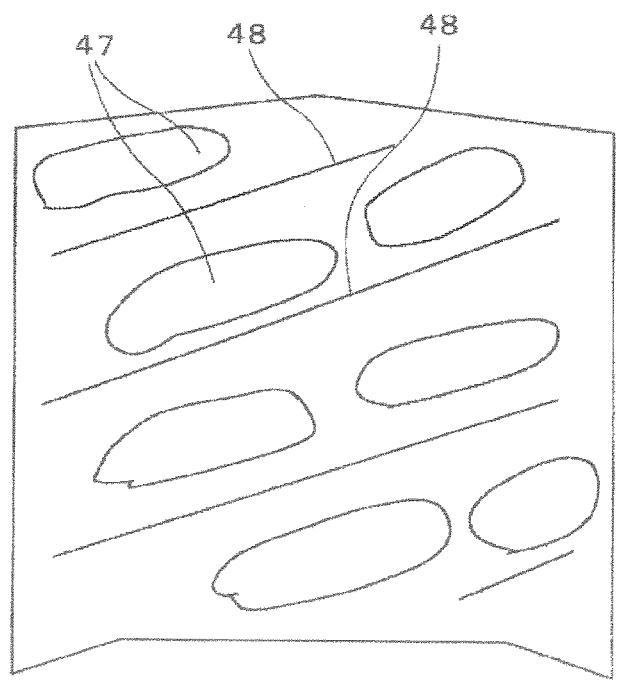
FIG. 111 is a view showing the inner panel, reinforcing inner panel or second reinforcing inner panel in which corrugations that are partially divided, and corrugations that are not divided are mixed, the direction of the corrugations being an inclined direction of the vehicle body.
Figure 112:
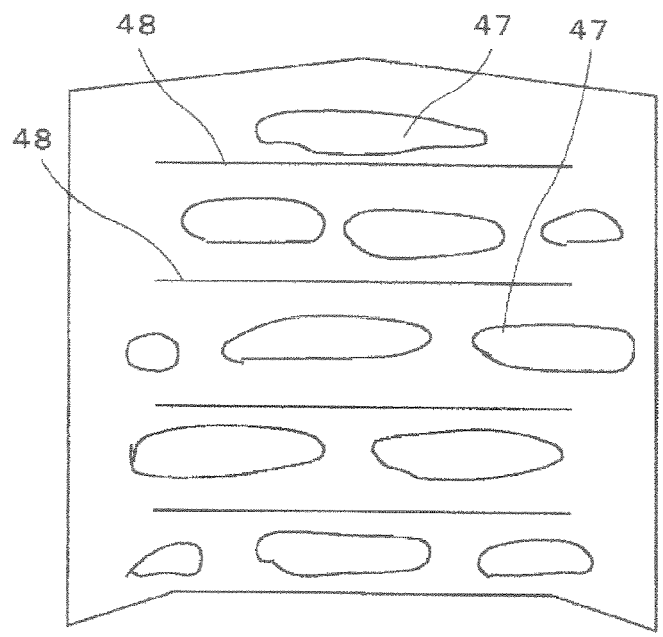
FIG. 112 is a view showing the inner panel, reinforcing inner panel or second reinforcing inner panel in which corrugations that are partially divided, and corrugations that are not divided are mixed, the direction of the corrugations being substantially the width direction of the vehicle body.
Figure 113:
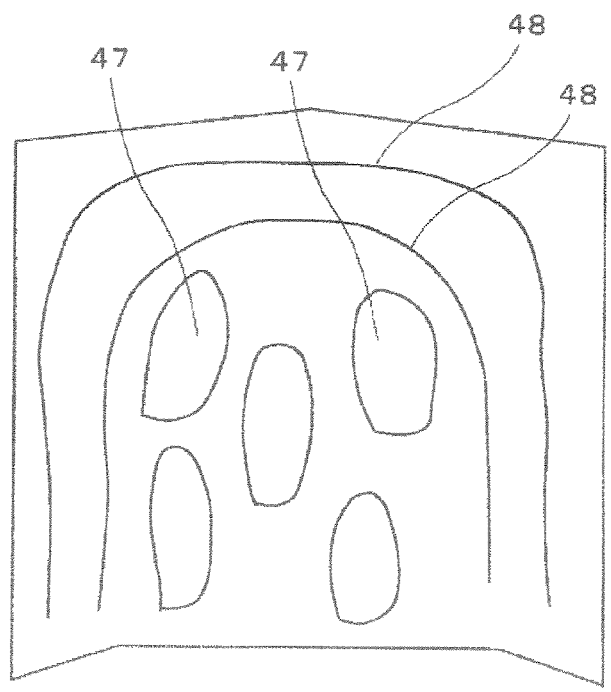
FIG. 113 is a view showing the inner panel, reinforcing inner panel or second reinforcing inner panel in which corrugations that are partially divided, and corrugations that are not divided are mixed, in the case where the direction of the corrugations changes in an arbitrary direction of the vehicle body.

It is therefore believed that head impact-resistance can be ensured in the same way even when the direction of the corrugations is in the vehicle width direction (transverse direction) or is an inclined direction. Embodiments are shown in FIG. 106, FIG. 107 and FIG. 108. Clearly, however, the HIC value is increased in the region where the division takes place in regard to head impact at such portions, since the local rigidity is lowered. It is preferable to suppress the lowering of wave height as far as possible by keeping the location of such division to as narrow a range as possible.

There is no particular restriction regarding the direction of the corrugations of the inner panel, reinforcing inner panel or second reinforcing inner panel of the vehicle body panel structure i.e. the direction of the corrugations is arbitrary, and a vehicle panel structure will be described having corrugations that are undivided and corrugations that are partially divided. FIG. 109 to 113 are views showing the shape of the inner panel of a vehicle body panel structure having corrugations that are undivided and corrugations that are partially divided. In the location of the division of the corrugations, the local rigidity is lowered, so the head impact-resistance is lowered. Consequently, preferably the portions where division takes place are kept to an extremely narrow range, or the wave height is suppressed as far as possible in these locations.

In the case of an inner panel of cross-section of substantially corrugated shape, better pedestrian protection performance is obtained with a transverse corrugated structure than with a longitudinal corrugated structure and pedestrian protection performance is better in the case of a double transverse corrugated structure than in a case of a single layer transverse corrugated structure. Consequently, the discoveries regarding the cross-sectional shape of the corrugations and configuration of distribution of the corrugations obtained with a longitudinal corrugated structure can be directly applied to a transverse corrugated structure in regard to sound absorption performance and pedestrian protection performance.

Specifically, in the case of a double wave longitudinal and corrugated structure, as shown in FIG. 43 to FIG. 46, in regard to sound absorption performance, wide bandwidth sound absorption performance can be implemented by making the wavelength undulating (FIG. 43), by making the waveform linear but not parallel (FIG. 44), or by making the cross-sectional structure of the corrugations asymmetrical as between left and right in respect of a single wavelength (FIG. 45, FIG. 46).

Figure 119:
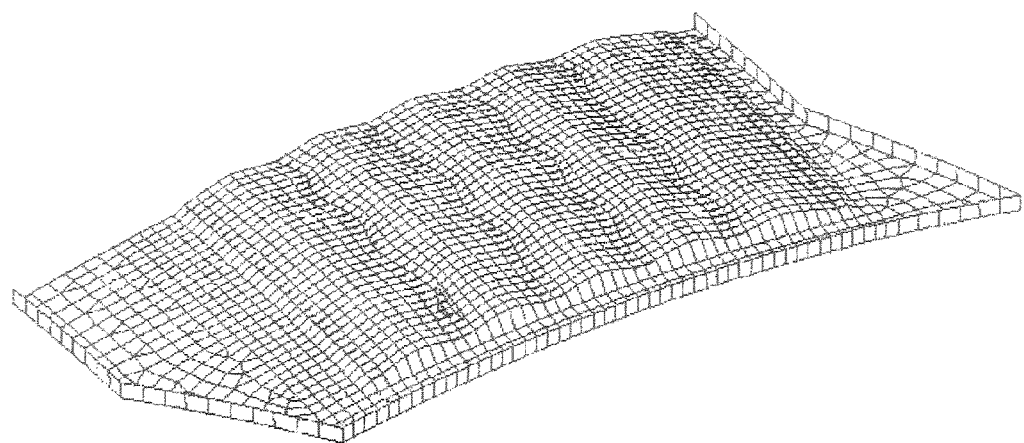
FIG. 119 is a perspective view showing an inner panel of a transverse corrugated double structure in which undulation is applied to the wavelength.
Figure 120:
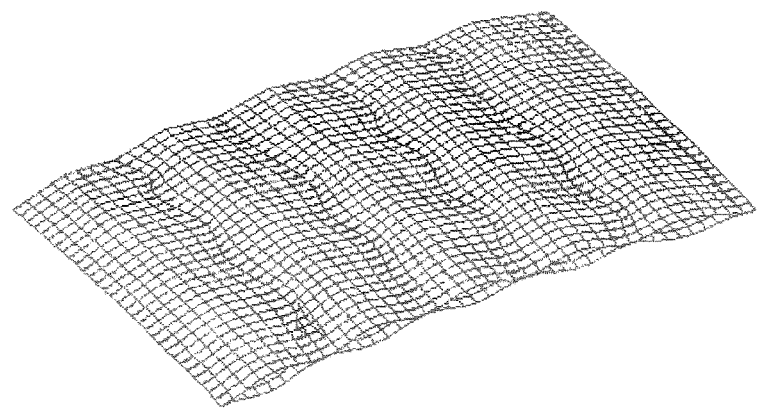
Figure 121:
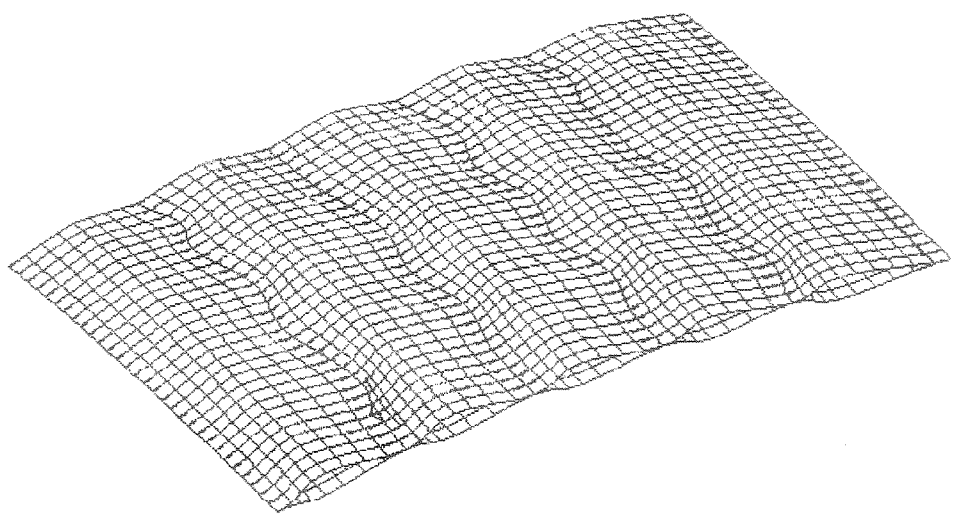
Figure 122:
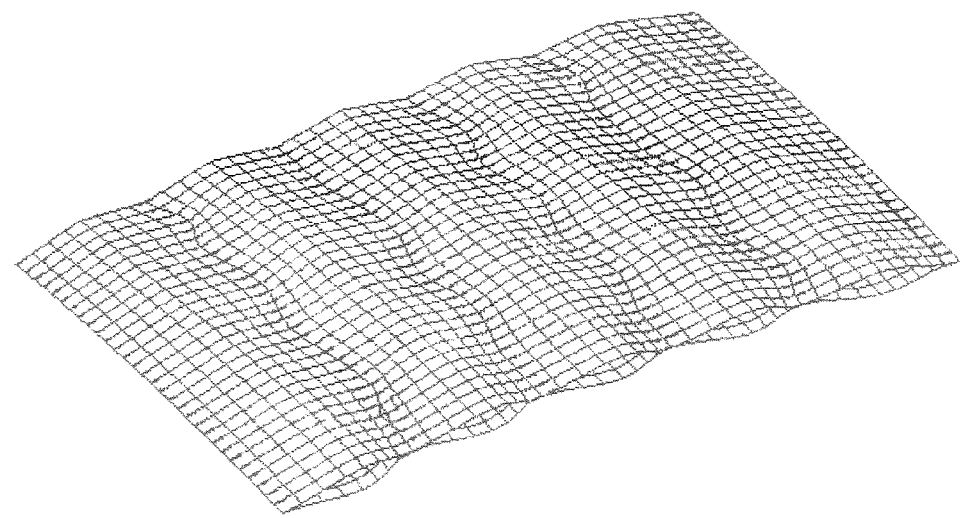

The same concept also applies in the case of a double transverse corrugation structure. Examples thereof are shown in FIG. 119, FIG. 120, FIG. 121 and FIG. 122. FIG. 119 and FIG. 120 are views showing an inner panel of double transverse corrugation structure in the case where the wavelength is undulated. FIG. 121 and FIG. 122 are views showing an inner panel of double transverse corrugation structure in the case where the wavelength of the cross-sectional structure of the corrugations is asymmetrical as between left and right. In the case of an inner panel of such a double transverse corrugation structure also, in regard to sound absorption performance, wide band sound absorption performance can be implemented. Also, the cross-sectional shapes shown in FIG. 6 to FIG. 13 can be applied to the single layer or double transverse corrugated structure.

Figure 123:
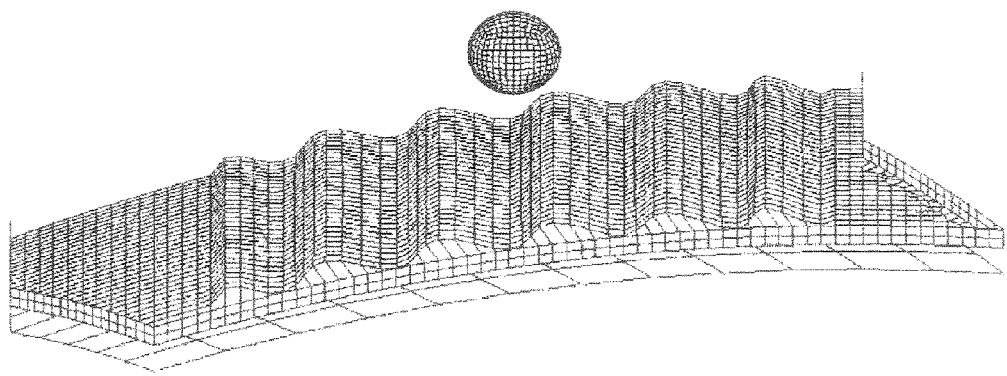

It should be noted that, even in the case of a single layer transverse corrugated structure, the wavelength of the cross-sectional structure of the corrugations may be left-right asymmetrical as shown in FIG. 123. If the asymmetry of the left and right forms is too great, although the sound absorption performance is improved, head impact-resistance is adversely affected and the HIC value is increased. Consequently, from the point of view of the HIC value, it is preferable to make the wavelength of the cross-sectional structure of the corrugations left/right symmetrical. This is because the energy absorption efficiency is better in the case of left/right symmetry. Also, although in the case of FIG. 123 a shape is adopted in which the vertex of the corrugations is distorted in the direction of the leading end of the vehicle body, the same benefits could be obtained with a shape in which the vertex of the corrugations is distorted on the side of the driver's seat.

Next the case of corrugations other than longitudinal corrugations and transverse corrugations will be described. This case referred to above of a single layer corrugated structure or double corrugated structure with corrugations other than longitudinal corrugations or transverse corrugations is the same as the case of longitudinal corrugations in regard to the cross-sectional shape of the corrugations and the distribution of the corrugations. The wide band sound absorption performance can be improved by altering the left and right wavelengths in a single wavelength or by applying undulations or inclination to the distribution of the corrugations.

INDUSTRIAL APPLICABILITY

The present invention is useful as a vehicle body panel member of for example a vehicle body hood, roof, door or trunk lid of an automobile.

The invention claimed is:

1. A vehicle body panel structure capable of minimizing the injury to the head of a pedestrian striking the vehicle body panel, comprising an outer panel, an inner panel arranged on the inside face of this outer panel, and a reinforcing inner panel further arranged on the inside face of this inner panel,
   wherein said inner panel and reinforcing inner panel respectively have a plurality of elongated concavities and convexities, wherein said elongated concavities and convexities define a corrugated shape in a cross-section in the longitudinal direction of the vehicle body, the elongation of said elongated concavities and convexities being in a direction outside of said cross section, and
   wherein said panels are joined so as to provide a closed cross-section formed by said inner panel and reinforcing inner panel below a joint of said outer panel and inner panel and so as to provide a closed cross-section formed by said outer panel and inner panel above a joint of said inner panel and reinforcing inner panel,
   wherein the cross-sectional corrugated shape of said inner panel or reinforcing inner panel is such as to satisfy $0.5 < p/d < 2.8$ and $0.05 < (h1+h2)/d < 0.35$, where the wavelength of the corrugations is p, the wave height of said inner panel is h1, the wave height of the reinforcing inner panel is h2 and the outer diameter of a pedestrian's head is d.

2. The vehicle body panel structure according to claim 1, wherein said structure is assembled with the vehicle body such that the direction in which the cross-section of the concavities/convexities of said inner panel and reinforcing inner panel has a corrugated shape coincides with the width direction or longitudinal direction of the vehicle body.

3. The vehicle body panel structure according to claim 1, wherein the cross-sectional shape of said concavities/convexities is spline-shaped.

4. The vehicle body panel structure according to claim 1, wherein one of said outer panel, inner panel and reinforcing inner panel is made of aluminum alloy or steel.

5. The vehicle body panel structure according to claim 1, wherein said inner panel and outer panel are joined by a flexible coupling.

* * * * *